Aug. 13, 1957  L. M. KEEFE  2,802,473
COIN CONTROL AND CHANGE MAKER
Filed May 4, 1951  28 Sheets-Sheet 3

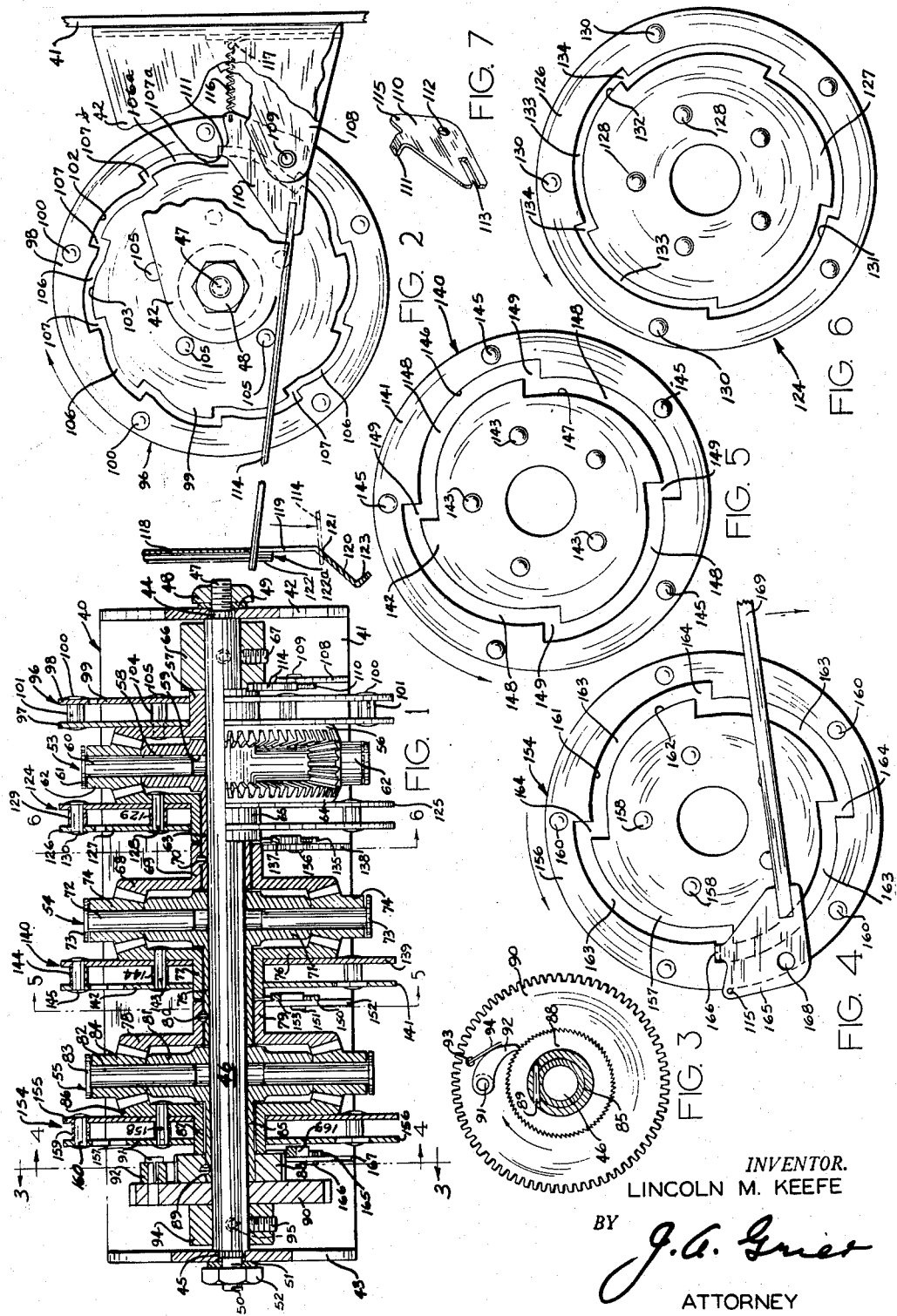
Aug. 13, 1957 — L. M. KEEFE — 2,802,473
COIN CONTROL AND CHANGE MAKER
Filed May 4, 1951 — 28 Sheets-Sheet 1
INVENTOR.
LINCOLN M. KEEFE
BY J. A. Grier
ATTORNEY

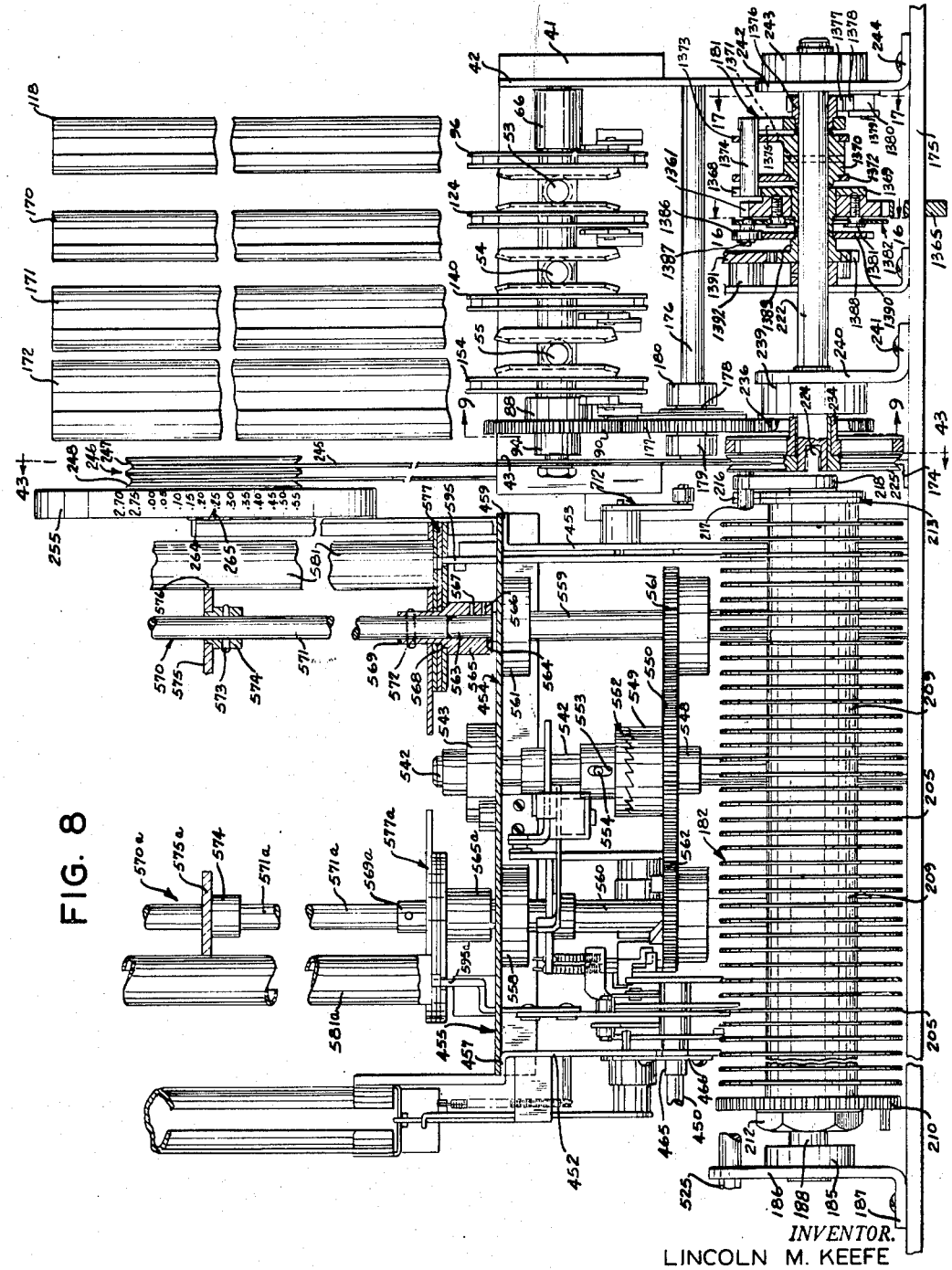

INVENTOR.
LINCOLN M. KEEFE
BY *J. A. Grier*
ATTORNEY

Aug. 13, 1957 L. M. KEEFE 2,802,473
COIN CONTROL AND CHANGE MAKER
Filed May 4, 1951 28 Sheets-Sheet 4
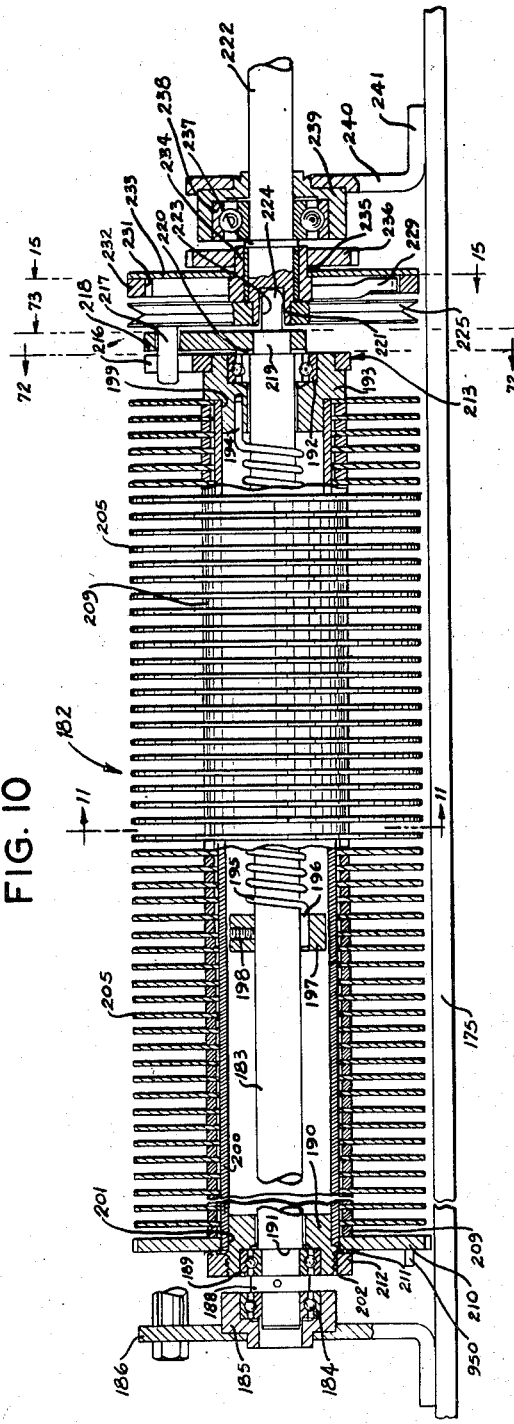
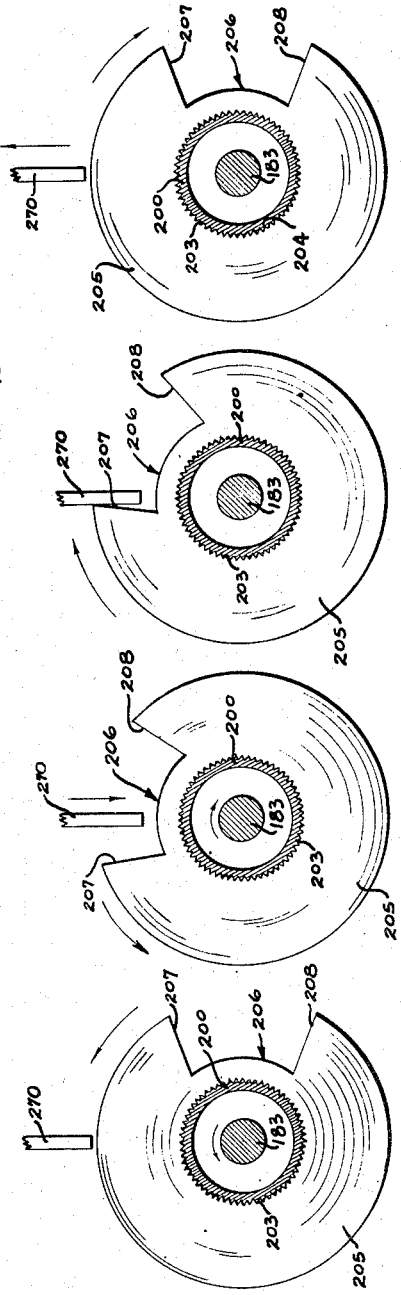
INVENTOR.
LINCOLN M. KEEFE
BY
ATTORNEY

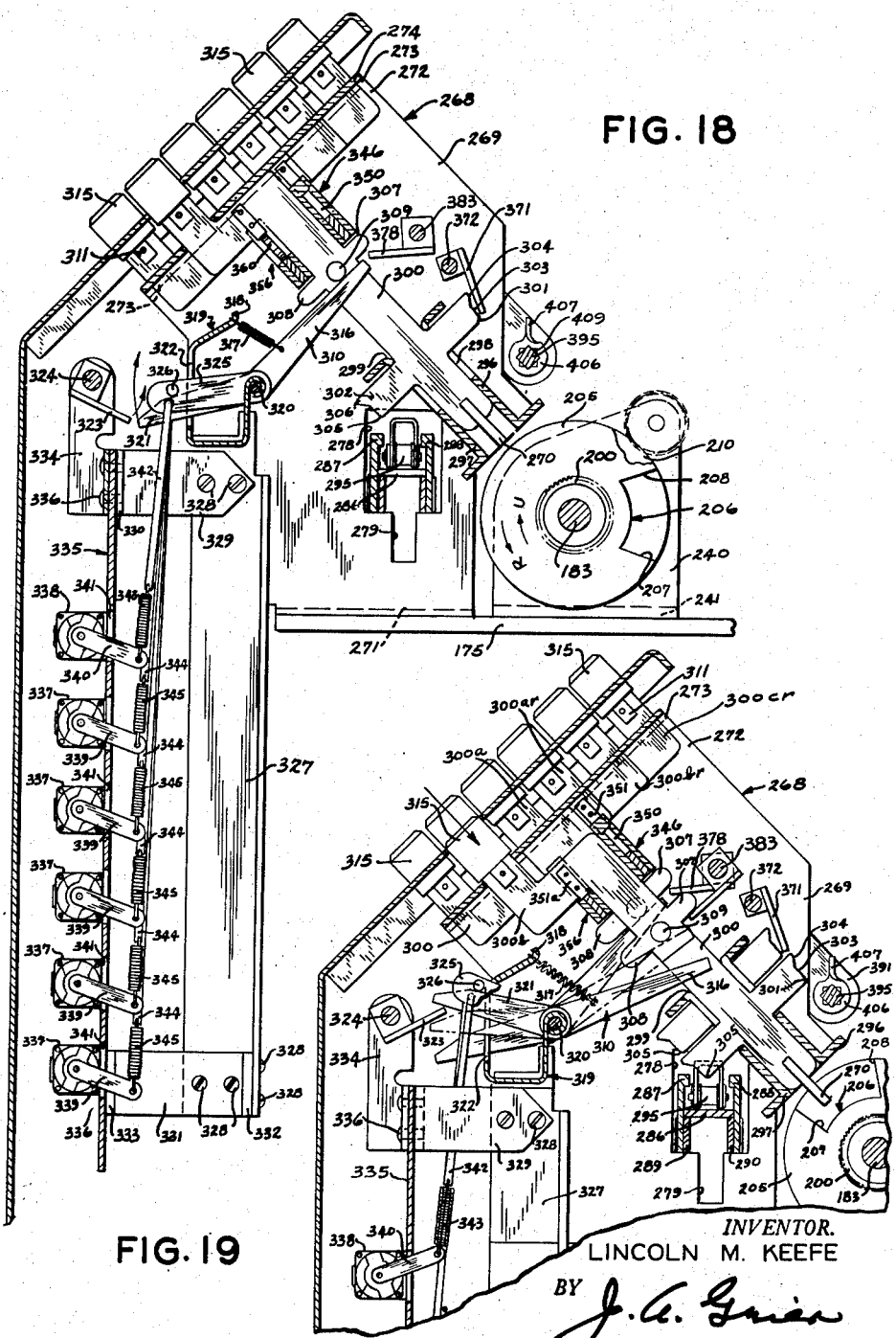

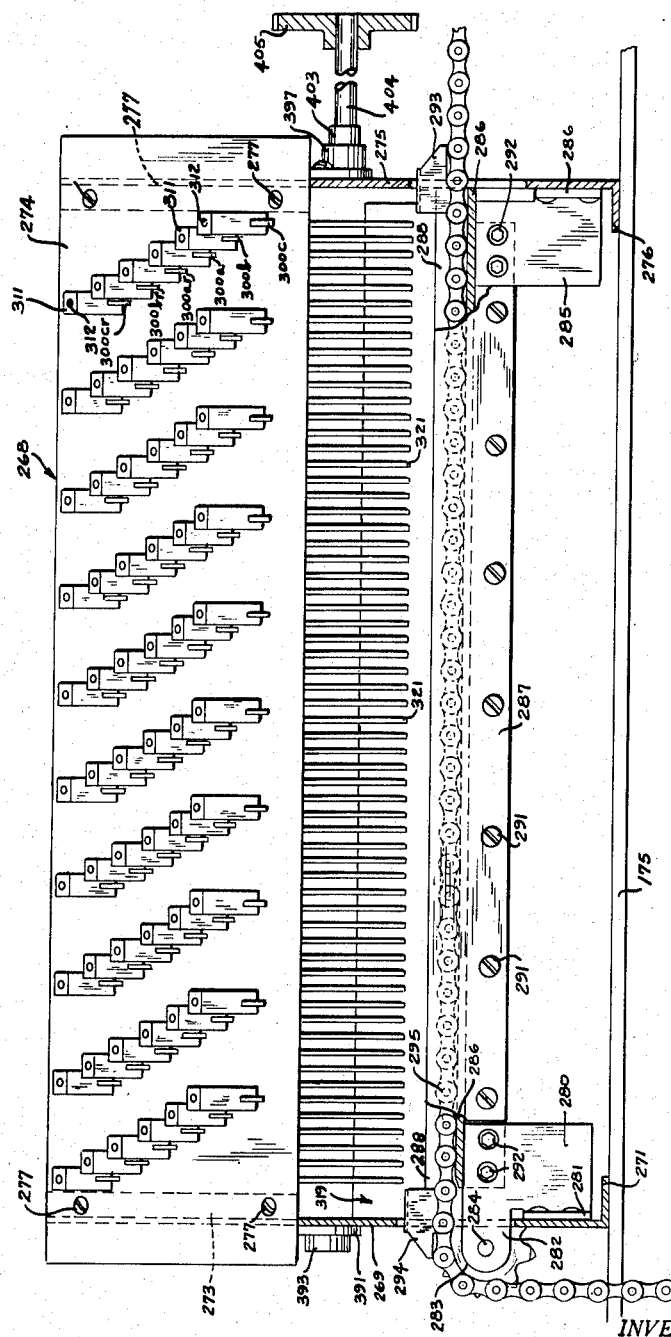

Aug. 13, 1957  L. M. KEEFE  2,802,473
COIN CONTROL AND CHANGE MAKER
Filed May 4, 1951  28 Sheets-Sheet 7

INVENTOR.
LINCOLN M. KEEFE
BY
ATTORNEY

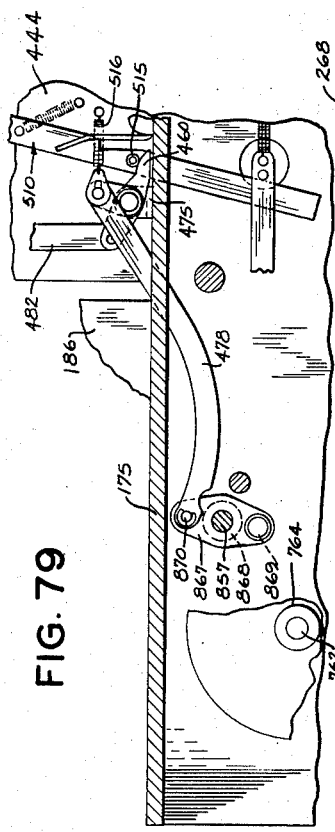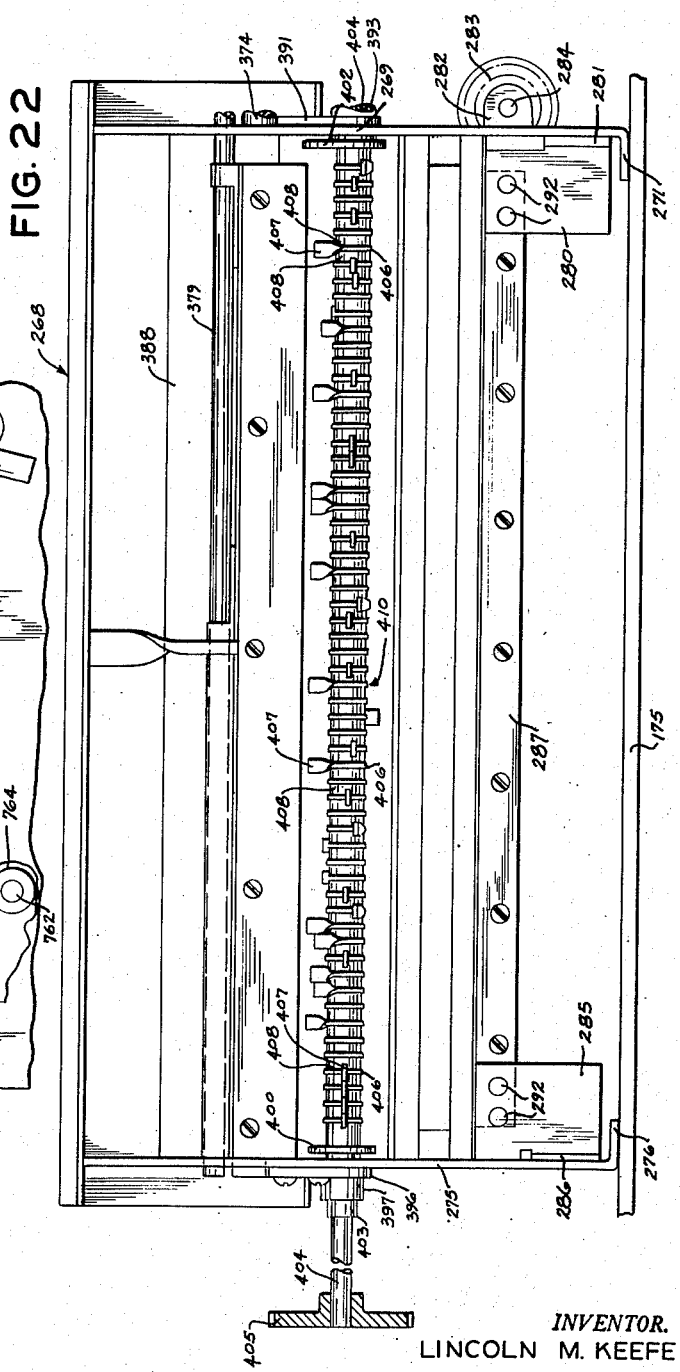

Aug. 13, 1957 L. M. KEEFE 2,802,473
COIN CONTROL AND CHANGE MAKER
Filed May 4, 1951 28 Sheets-Sheet 9
FIG. 25 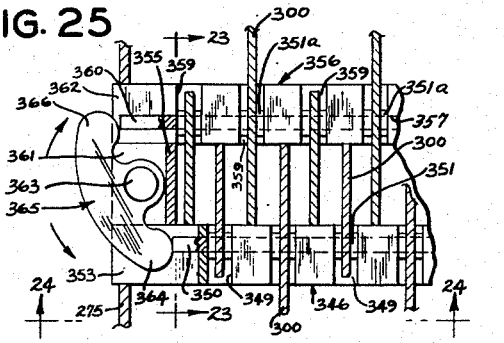 FIG. 26 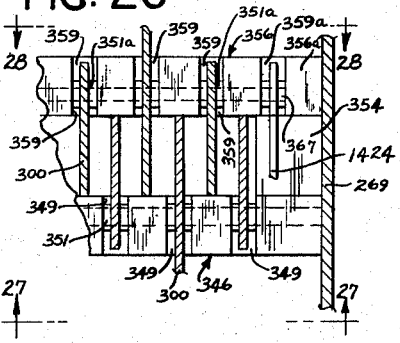
FIG. 24
FIG. 27
FIG. 23 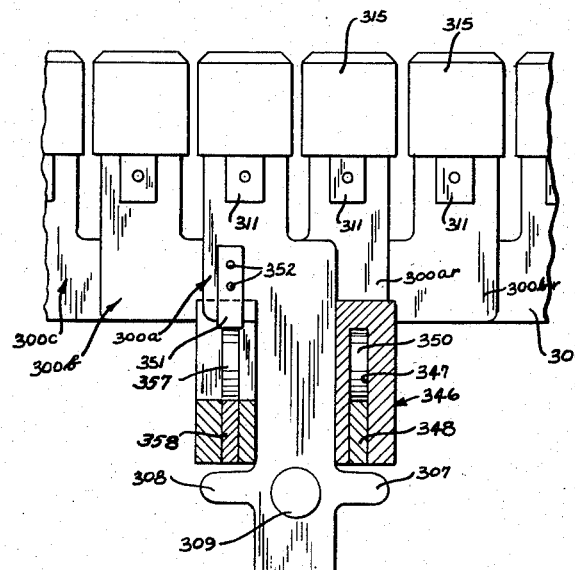 FIG. 28
INVENTOR.
LINCOLN M. KEEFE
BY
ATTORNEY

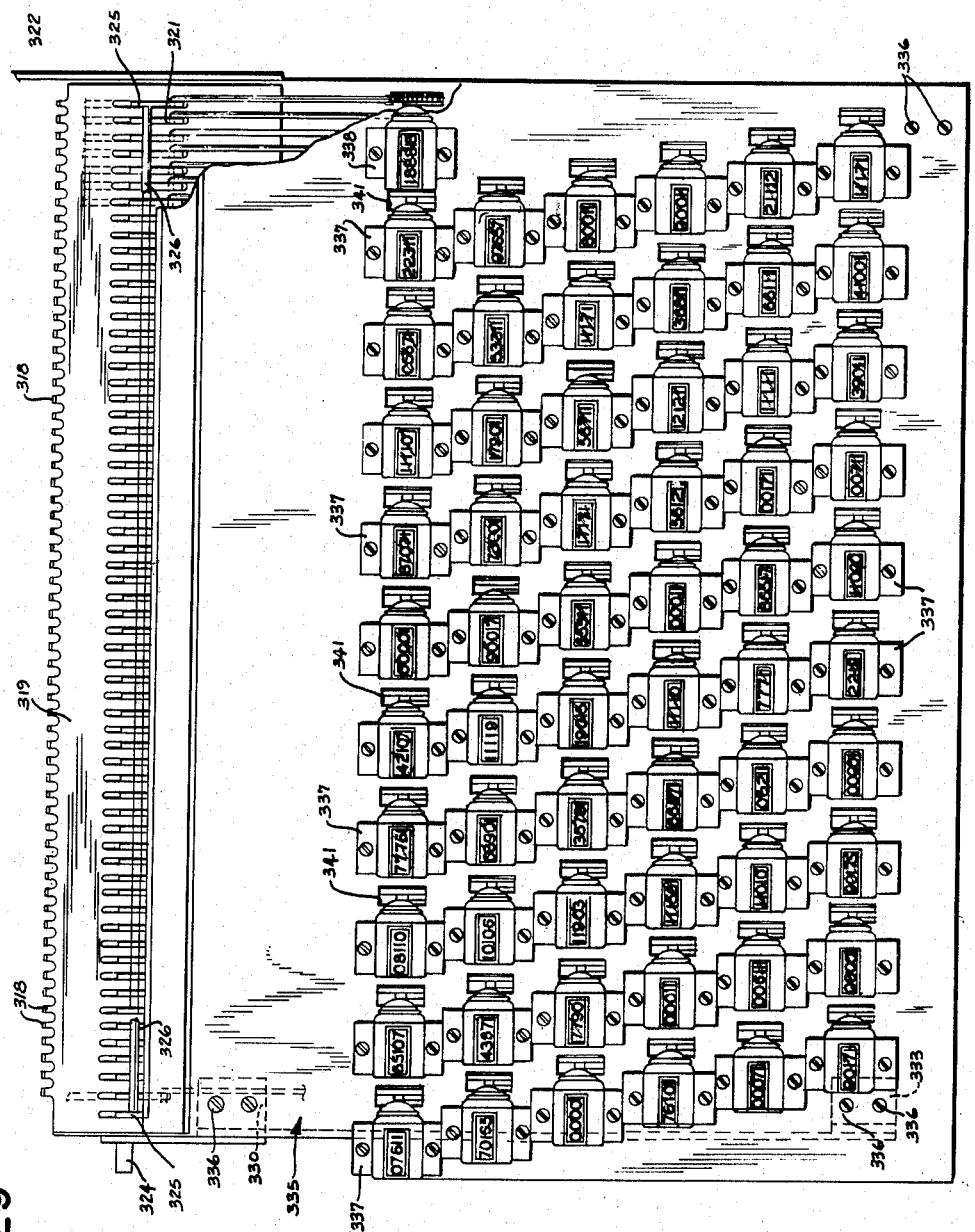

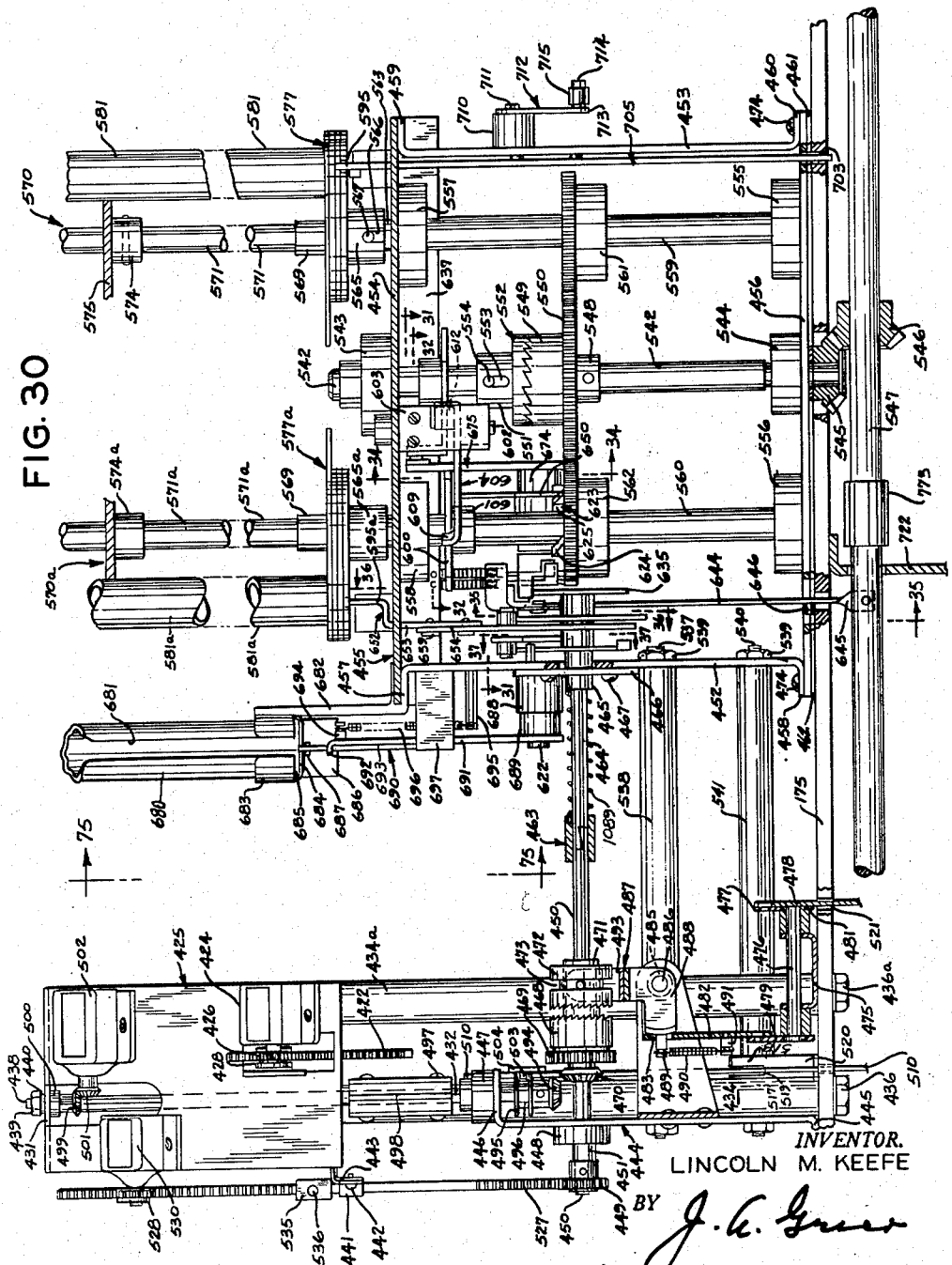

Aug. 13, 1957      L. M. KEEFE      2,802,473
COIN CONTROL AND CHANGE MAKER
Filed May 4, 1951      28 Sheets-Sheet 12
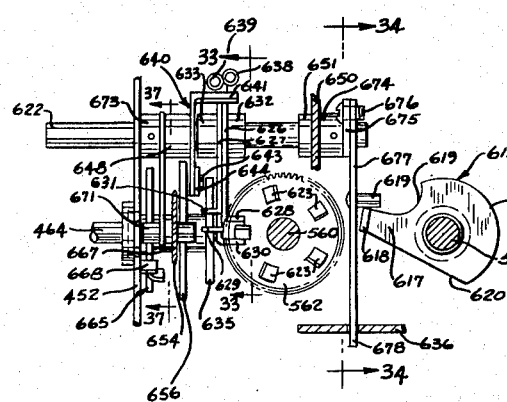
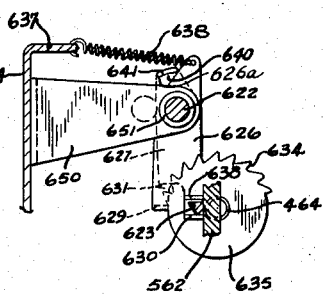
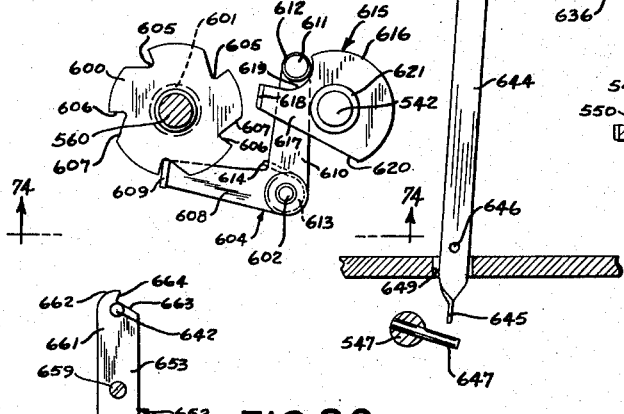
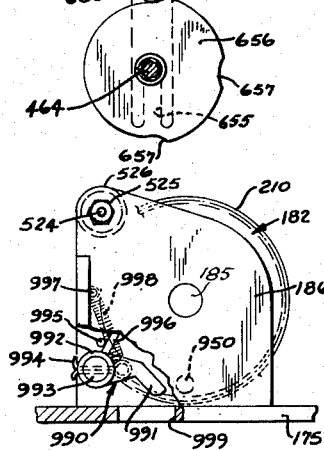
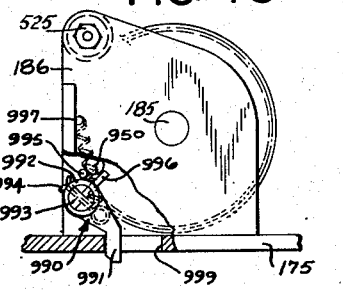
INVENTOR.
LINCOLN M. KEEFE
BY *J. C. Grier*
ATTORNEY Aug. 13, 1957 L. M. KEEFE 2,802,473
COIN CONTROL AND CHANGE MAKER
Filed May 4, 1951 28 Sheets-Sheet 13
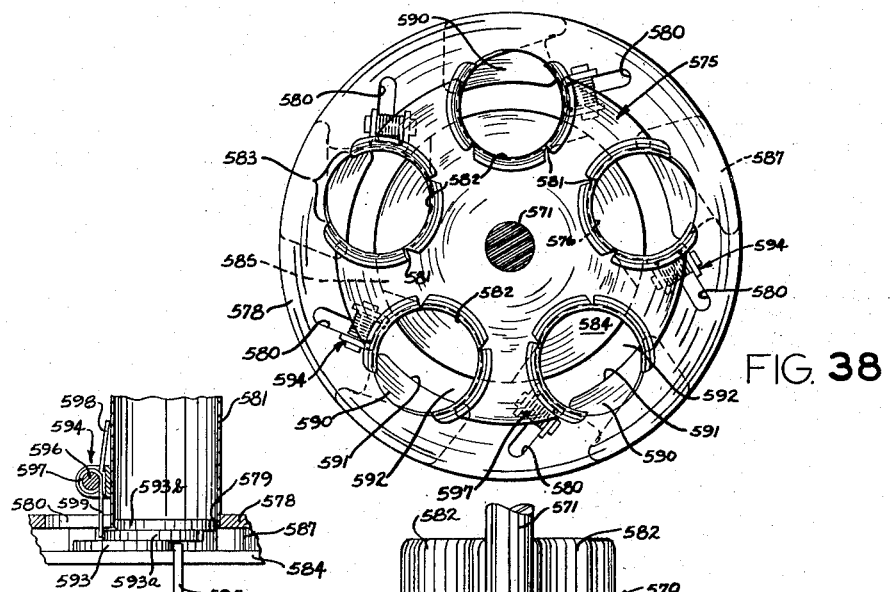
FIG. 38
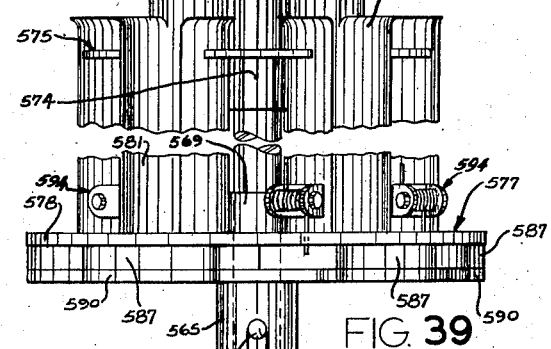
FIG. 42
FIG. 39
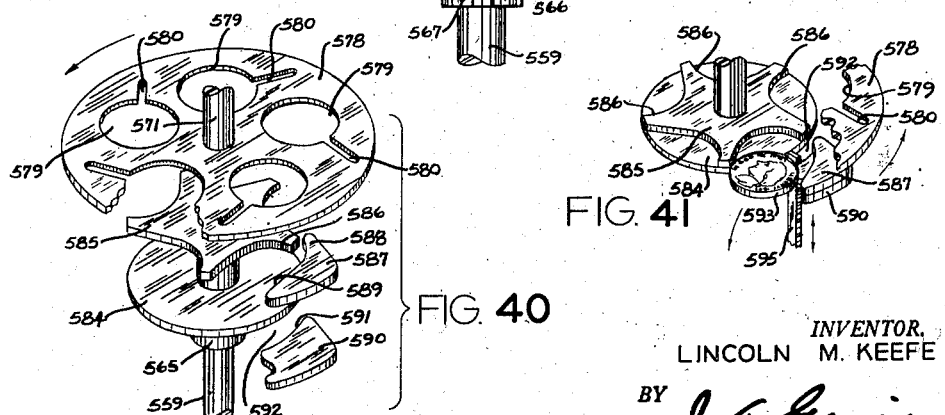
FIG. 40
FIG. 41
INVENTOR.
LINCOLN M. KEEFE
BY
*J. G. Grier*
ATTORNEY Aug. 13, 1957  L. M. KEEFE  2,802,473
COIN CONTROL AND CHANGE MAKER
Filed May 4, 1951  28 Sheets-Sheet 14

INVENTOR.
LINCOLN M. KEEFE
BY
*J. A. Grier*
ATTORNEY

Aug. 13, 1957     L. M. KEEFE     2,802,473
COIN CONTROL AND CHANGE MAKER
Filed May 4, 1951     28 Sheets-Sheet 15
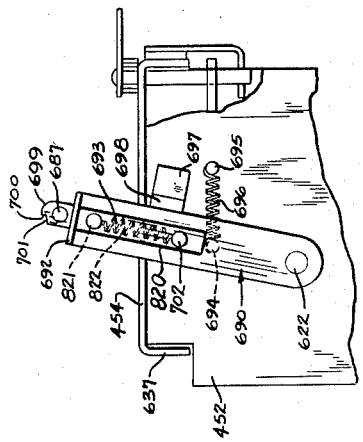
FIG. 75
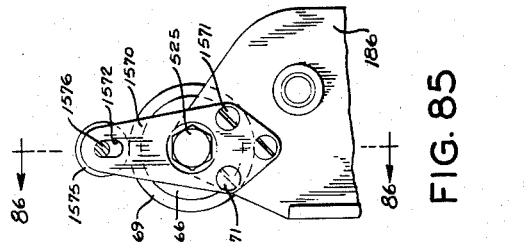
FIG. 85
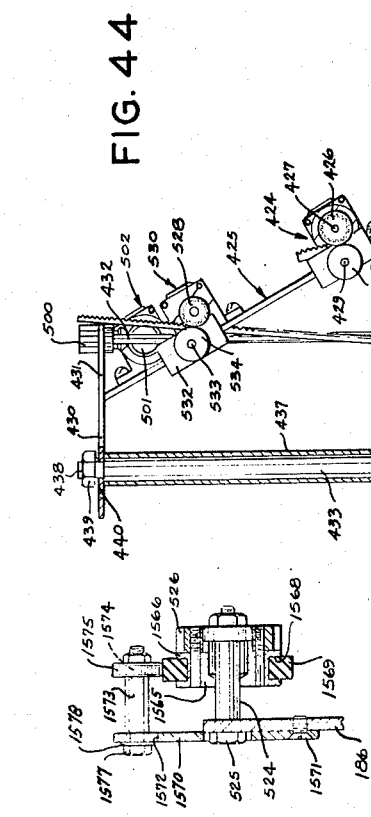
FIG. 44
FIG. 86
INVENTOR.
LINCOLN M. KEEFE
BY *J. A. Grier*
ATTORNEY Aug. 13, 1957 L. M. KEEFE 2,802,473
COIN CONTROL AND CHANGE MAKER
Filed May 4, 1951 28 Sheets-Sheet 17
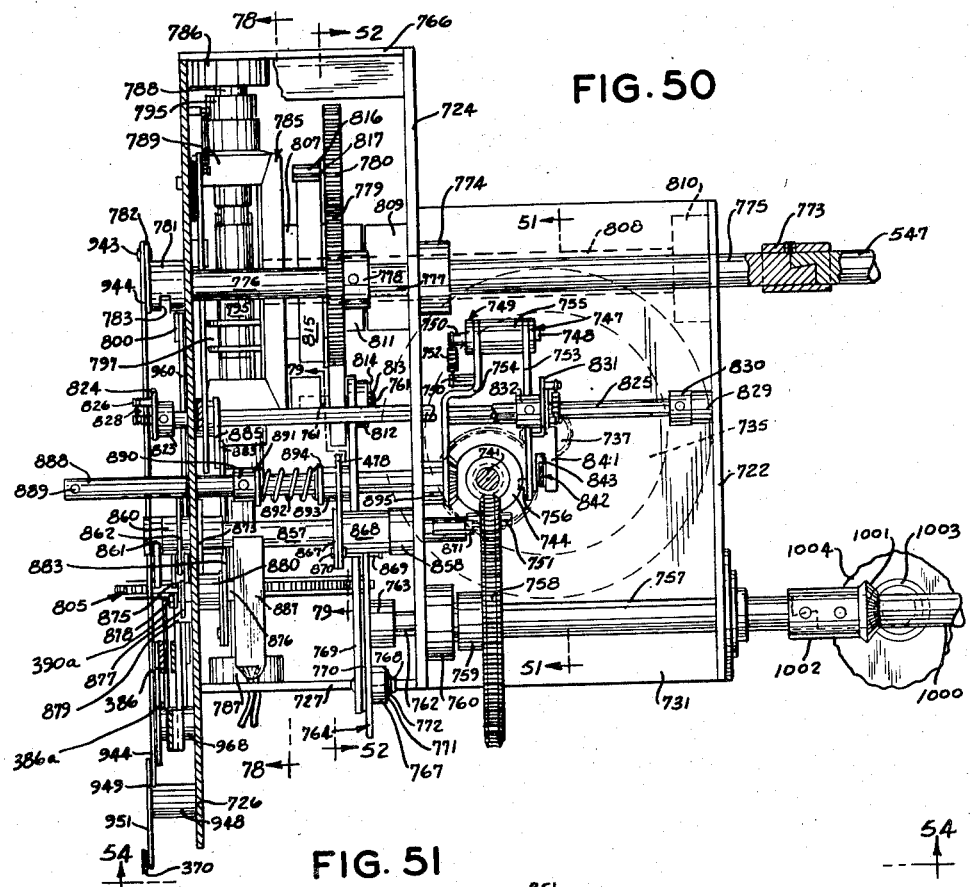
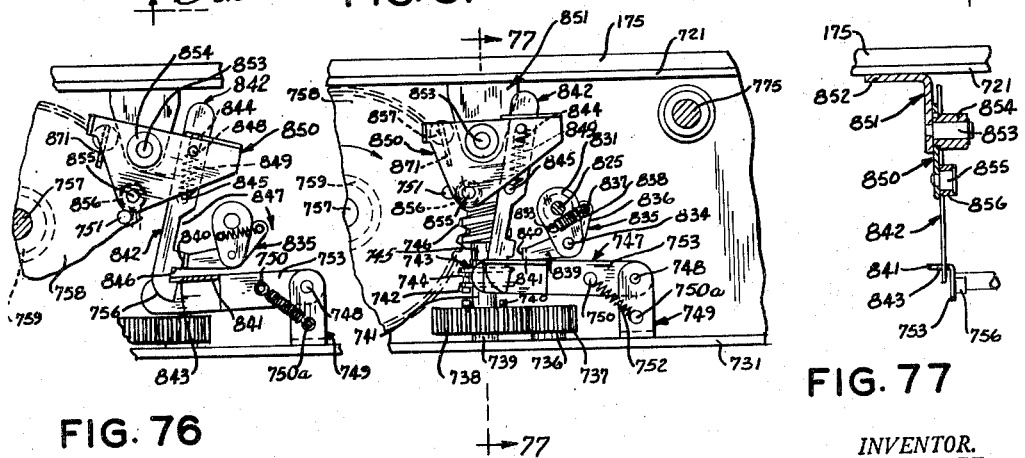
INVENTOR.
LINCOLN M. KEEFE
BY
ATTORNEY Aug. 13, 1957    L. M. KEEFE    2,802,473
COIN CONTROL AND CHANGE MAKER
Filed May 4, 1951    28 Sheets-Sheet 18

INVENTOR.
LINCOLN M. KEEFE
BY
ATTORNEY

Aug. 13, 1957 — L. M. KEEFE — 2,802,473
COIN CONTROL AND CHANGE MAKER
Filed May 4, 1951 — 28 Sheets-Sheet 19

INVENTOR.
LINCOLN M. KEEFE
BY
ATTORNEY

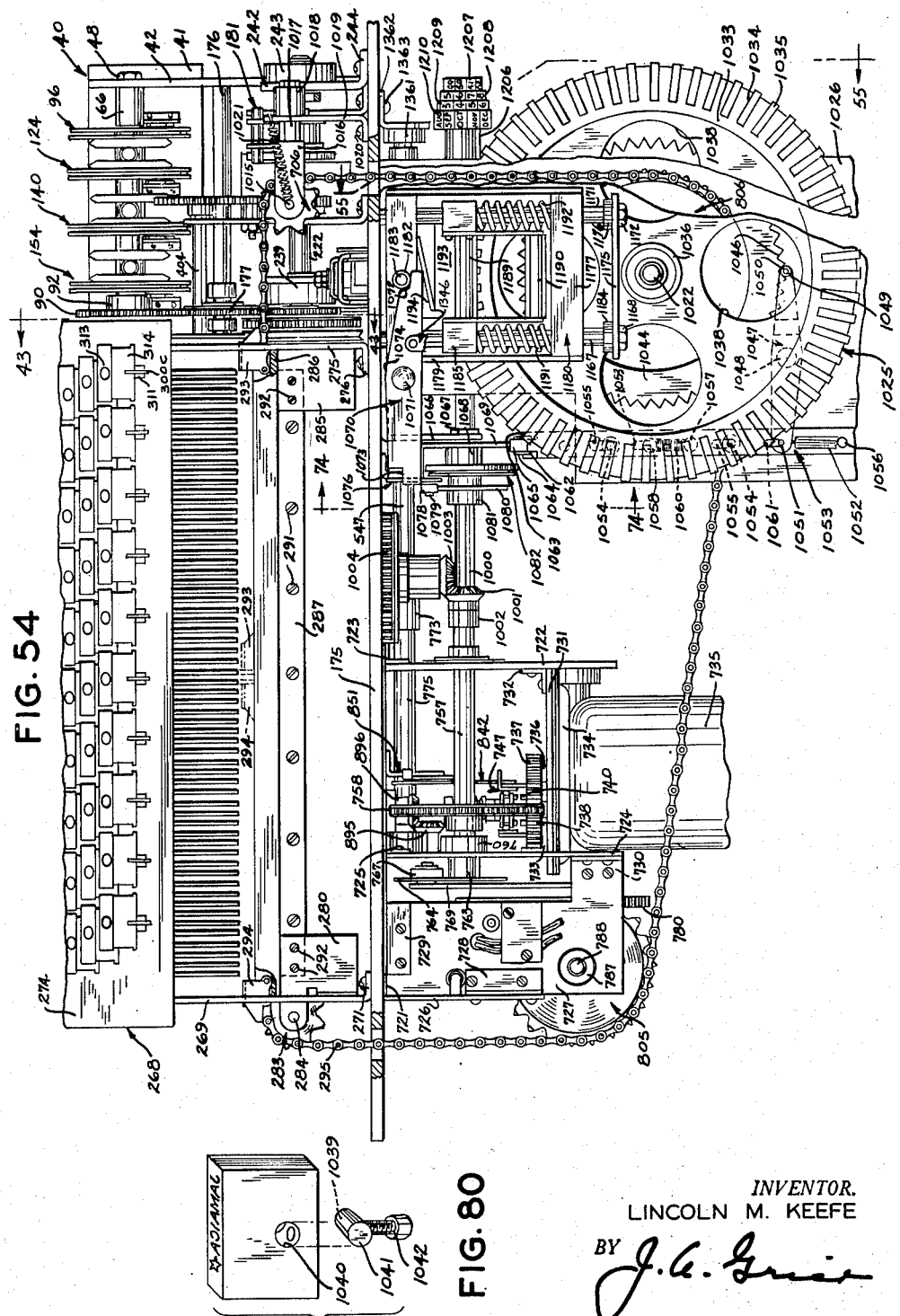

Aug. 13, 1957 L. M. KEEFE 2,802,473
COIN CONTROL AND CHANGE MAKER
Filed May 4, 1951 28 Sheets-Sheet 21
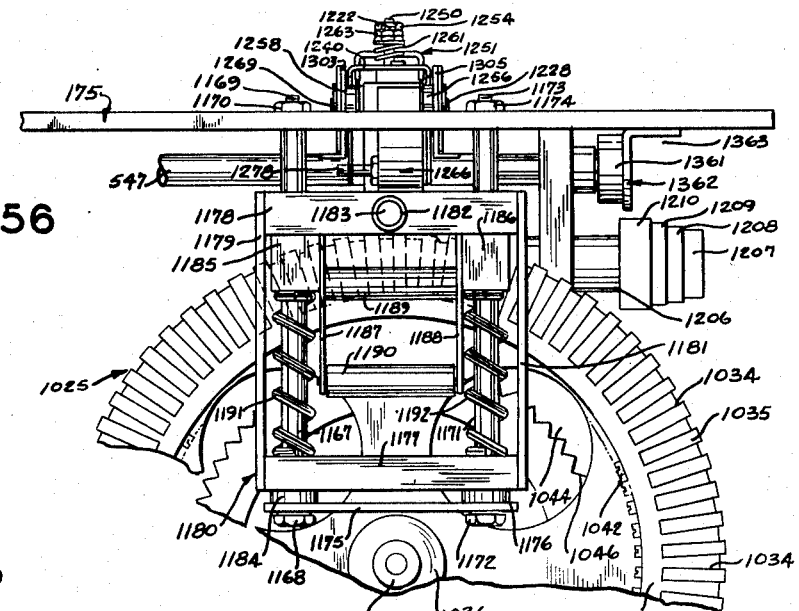
FIG. 56
FIG. 55
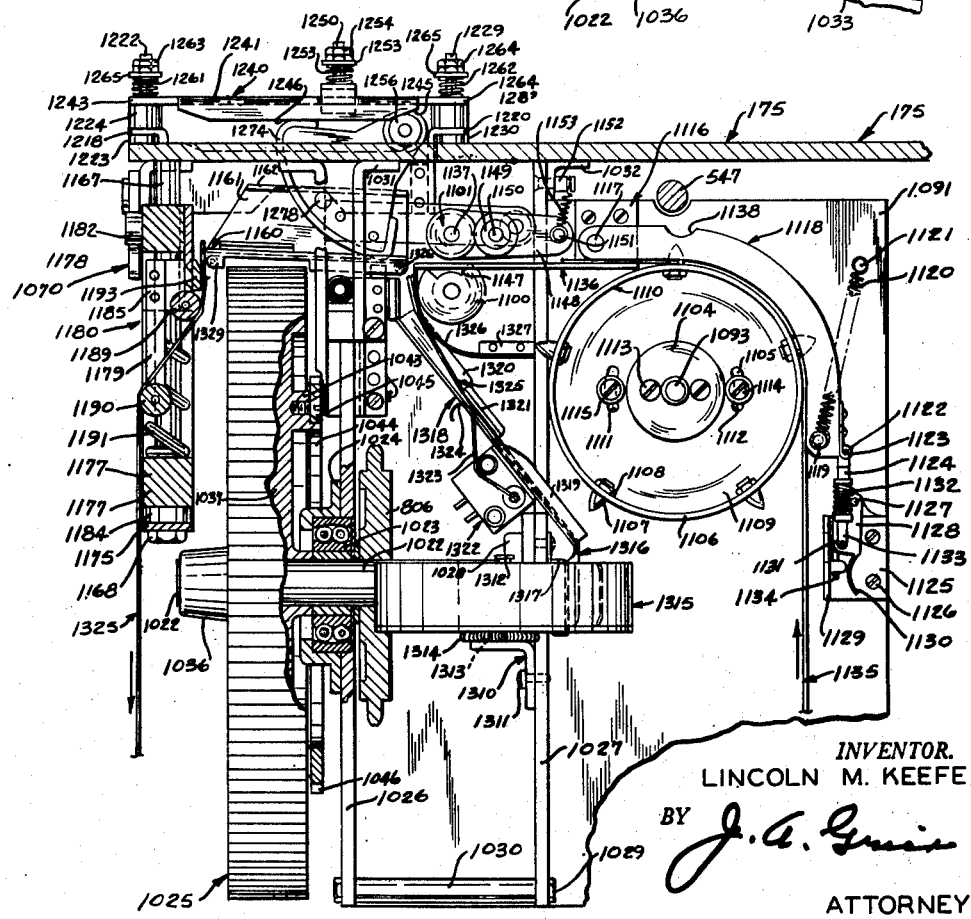
INVENTOR.
LINCOLN M. KEEFE
BY
ATTORNEY Aug. 13, 1957 L. M. KEEFE 2,802,473
COIN CONTROL AND CHANGE MAKER
Filed May 4, 1951 28 Sheets-Sheet 22

INVENTOR.
LINCOLN M. KEEFE
BY
ATTORNEY

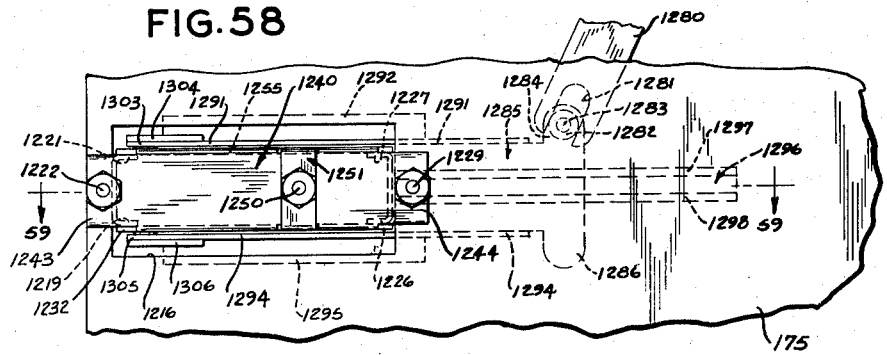
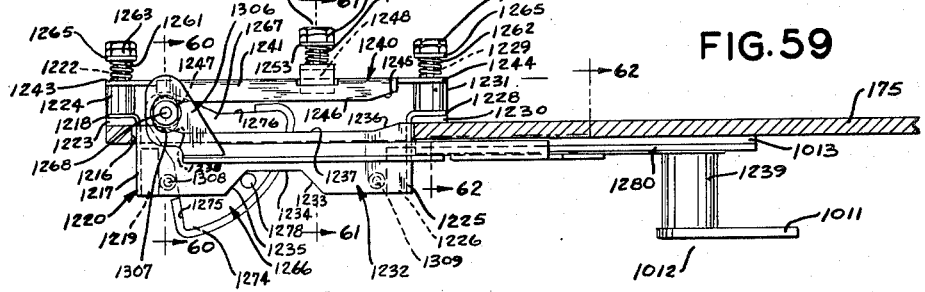
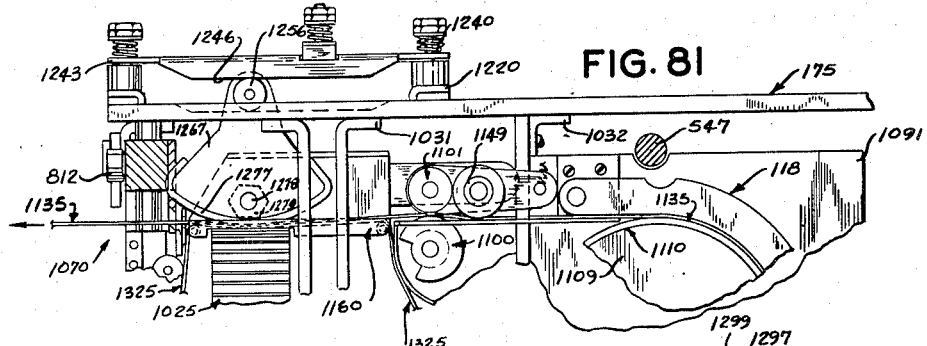

Aug. 13, 1957 L. M. KEEFE 2,802,473
COIN CONTROL AND CHANGE MAKER
Filed May 4, 1951 28 Sheets-Sheet 24

INVENTOR.
LINCOLN M. KEEFE
BY J. A. Grier
ATTORNEY

Aug. 13, 1957  L. M. KEEFE  2,802,473
COIN CONTROL AND CHANGE MAKER
Filed May 4, 1951  28 Sheets-Sheet 25
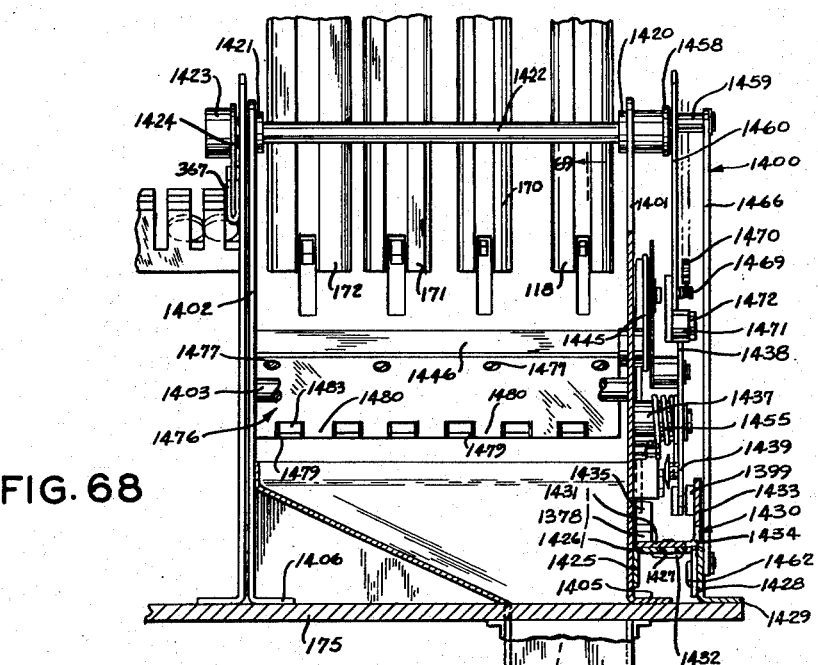
FIG. 68
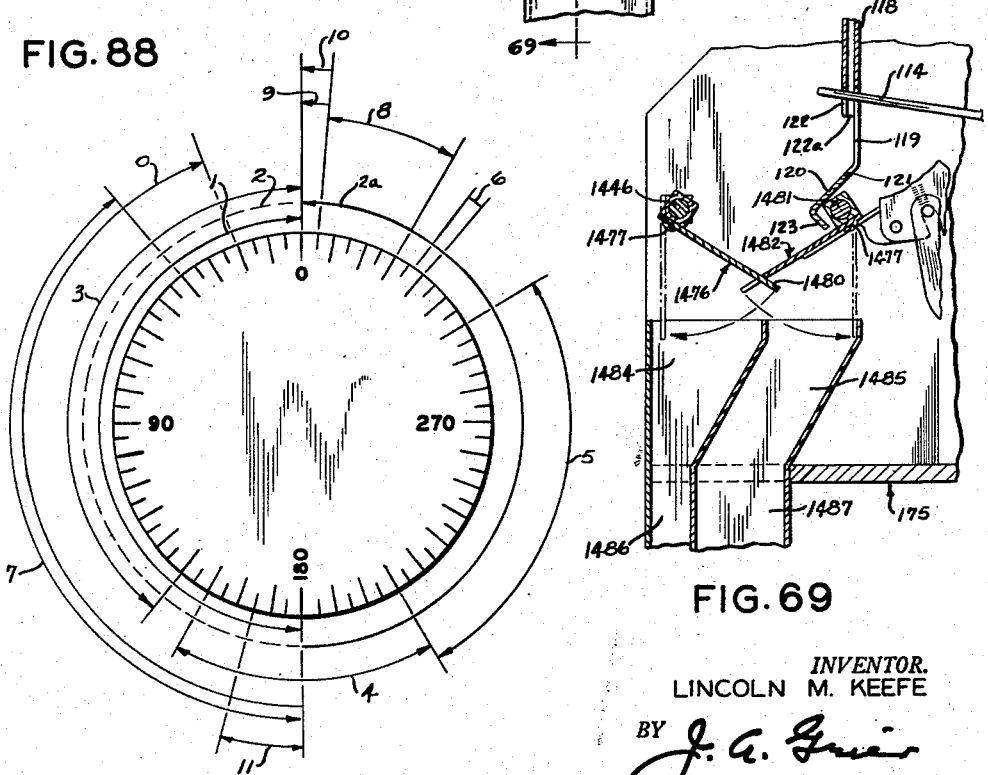
FIG. 88
FIG. 69
INVENTOR.
LINCOLN M. KEEFE
BY *J. A. Grier*
ATTORNEY Aug. 13, 1957 — L. M. KEEFE — 2,802,473
COIN CONTROL AND CHANGE MAKER
Filed May 4, 1951 — 28 Sheets-Sheet 27
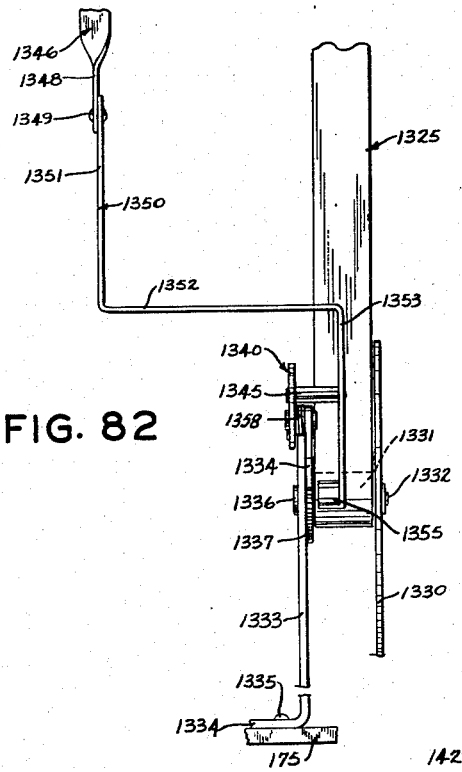
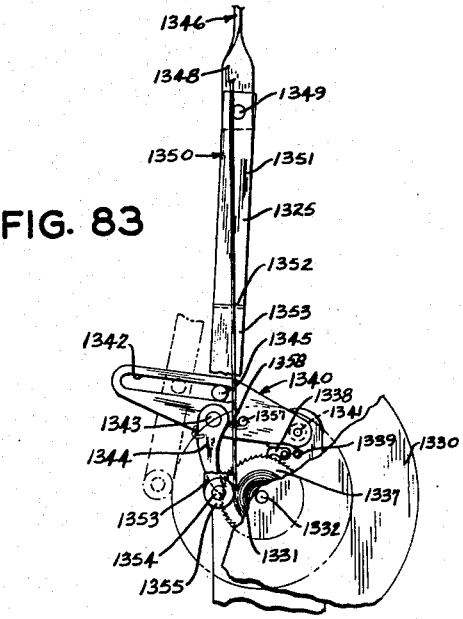
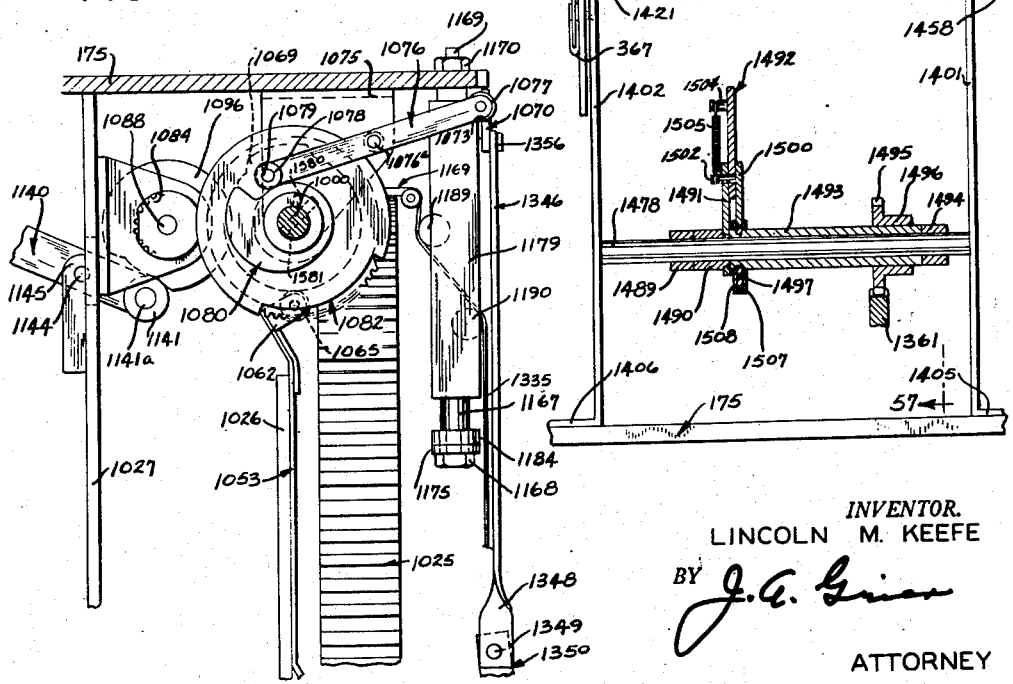
INVENTOR.
LINCOLN M. KEEFE
ATTORNEY Aug. 13, 1957  L. M. KEEFE  2,802,473
COIN CONTROL AND CHANGE MAKER Filed May 4, 1951  28 Sheets-Sheet 28

INVENTOR.
LINCOLN M. KEEFE
BY
ATTORNEY

United States Patent Office 2,802,473
Patented Aug. 13, 1957

2,802,473

COIN CONTROL AND CHANGE MAKER

Lincoln M. Keefe, Woodside, N. Y., assignor to Richard I. N. Weingart, Long Island City, N. Y.

Application May 4, 1951, Serial No. 224,541

9 Claims. (Cl. 133—2)

This invention relates to improvements in vending machines and has for an object the provision, in a vending machine, of a coin counter which accepts one or more coins of different denominations, integrates the values of the coins accepted and sets up a credit in the machine representing the total value of the coins.

Another object of the invention is the provision of a coin counter which accepts coins of three or more denominations, each coin actuating a different escapement in accordance with its value, individual means with and moved by said escapements, other means interconnected with said individual means for totalizing the values represented by the actuated escapements, and means moved by said other means for setting up a credit representing the total value of the coins involved.

A further object of the invention is the provision of a coin counter which accepts a plurality of coins of different denominations, one actuating member being provided for each denomination, a series of planetary movements, each of which is common to an actuating member for a given denomination and a higher denominations, so that the total value of all the coins of different denominations involved is integrated serially via said planetary movements, and means moved by the last of said movements in said series for setting up a credit representing said total value.

Another object of the invention is the provision of a coin counter which accepts coins of a plurality of different denominations, individual actuating members for each denomination, mechanism conjointly controlled by said actuating members whereby the latter effect polar movements of the mechanism which are additive, and means operatively connected to said mechanism for setting up a credit equal to the values of the coins accepted.

Yet another object of the invention is the provision of a coin counter which accepts coins of a plurality of different denominations, individual actuating means for each denomination, multi-stage mechanism, each stage being controlled by a different one of said actuating means, and rotary means operatively connected to said mechanism and rotatively advanced thereby in definite relation to the total of the values of the coins accepted, thereby setting up a credit representing said total.

Another object of the invention is the provision of a coin counter which accepts coins of a plurality of different denominations, a series of escapement devices, one for each denomination, gearing interconnecting said devices, each of said devices including a pivoted escapement pawl and an actuating lever, individual chute means for guiding said coins to their individual levers and causing the latter to be actuated by the impact of said coins, credit set up means operatively connected to said series and moved additively in correspondence with the value of each coin actuating its escapement, thereby setting up a credit against which a purchase may be made.

Another object of the invention is the provision of compound mechanism and gear means to be rotated thereby, means constantly urging said mechanism in a predetermined direction, a plurality of escapement devices in said mechanism each actuated by a coin of a different denomination for rotating said gear means angularly about its axis a number of degrees corresponding to and representing the total value of all coins involved, a plurality of elements moved by said gear means and each representing different values of articles to be dispensed, selector means for selecting a desired one of said elements to effect the delivery of an article of a given price, change-making mechanism for delivering, to the purchaser, change equal to the difference between said price and the positional value of the element selected (if any difference exists), and means controlled by the selected element for effecting the delivery of the selected article.

Yet another object of the invention is the provision of a coin counter which accepts a plurality of coins of different denominations, one individual escapement device being provided for and adapted to be actuated by coins of each denomination, and integrating mechanism interconnecting all said escapement devices for totalizing the values of all of said coins up to a predetermined amount.

Another object of the invention is the provision of a device having a coin counter in combination with means movable thereby to set up credits representing the total value of the coins counted, means cooperating with said credit means for dispensing an article, and means for rendering said device inoperative when the value of the total number of coins counted exceeds a predetermined amount.

A further object of the invention is the provision in a vending machine for vending items of different prices, of a coin counter means cooperating therewith for setting up a credit representing the total value of the coins accepted, selector means cooperating with said last means, each selector means representing a different price value and change making means for returning change, if any, to the vendee equal to the difference between the price represented by the selector means and the total value of the coins accepted.

Still another object of the invention is the provision, in a vending machine or the like, of a plurality of selector keys, of different price values, a plurality of locks normally preventing said keys from being depressed, coin counting means adapted to accept coins of a plurality of different denominations, means controlled by said coin counting means for progressively unlocking said locks and, consequently, freeing said keys as the total value of the coins accepted progressively equals or exceeds the values of the prices represented by said keys, change making means for returning change to the vendee representing the difference between the total value of the coins accepted and the price value of a key which has been depressed.

A further object of the invention is the provision, in a vending machine, of coin mechanism to count the coins placed in said machine during each operation thereof and to set up a credit in the machine representing the values of the coins accepted, change making means in said machine in cooperative relation to the credit set-up means, a bank of selector buttons in cooperation with the latter, each button representing a different price or value and means between said change making means and the credit set-up means for delivering to the vendee change equal to the difference between the credit set up and the value of the selector button which has been depressed.

Yet another object of the invention is the provision in a coin controlled vending machine, of change making means which includes a plurality of turrets each carrying a plurality of stacks of coins, the coins in one turret being different in value from the coins in another, means to rotate said turrets and individual pickers for each turret adapted to be positioned to peel off coins from the bottoms of each of the stacks in the turret as the latter is being rotated, and means controlled by the difference between the sum of the coins accepted by said machine and the value of an article being vended for positioning said pickers.

Yet another object of the invention is the provision, in a change maker, of change making means for delivering coins of one value and coins of another value which is a multiple of said first value and means under control of both said last means for insuring the delivery of a coin of said multiple value whenever the value of the change to be delivered is equal to or greater than said multiple value.

Other objects and advantages of the invention will be apparent to those skilled in the art upon a study of this specification and the accompanying drawings.

Referring to the drawings, which are given by way of example to illustrate the invention:

Figure 1 is an elevation, partly in section, of the coin counter, as seen along the line 1—1 of Figure 2;

Figure 2 is an end elevation of the coin counter and showing the nickel escapement mechanism, as seen from the right end of Figure 1;

Figure 3 is an elevation of the main gear and its ratchet, taken along the line 3—3 of Figure 1;

Figure 4 is an elevation of the half-dollar escapement wheel, as seen along the line 4—4 of Figure 1;

Figure 5 is an elevation of the quarter-dollar escapement wheel, as seen along the line 5—5 of Figure 1;

Figure 6 is an elevation of the dime escapement wheel, as seen along the line 6—6 of Figure 1;

Figure 7 is a perspective view of a form of pawl plate such as employed in cooperation with all of the escapement wheels;

Figure 8 is an elevational view showing the relation of the coin counter to a positionable member, to be moved in accordance with the value of the coins counted, said positionable member being in the form of a rotatable drum, termed herein "locking drum";

Figure 10 is a view, partly in section, showing certain features of the locking drum;

Figure 11 is a view showing the normal relation of a selector key plunger with respect to a given locking drum disc, the latter being moved in the direction it moves in accordance with the value of the coins counted;

Figure 15:
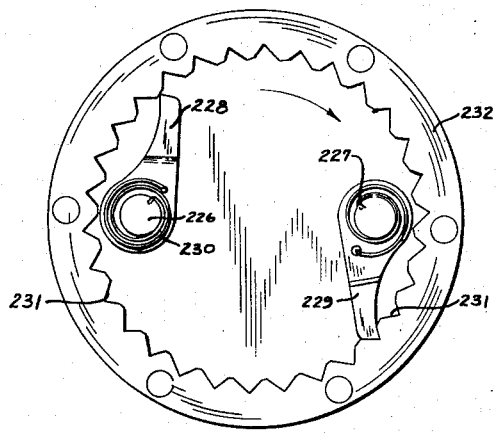
Figure 16:
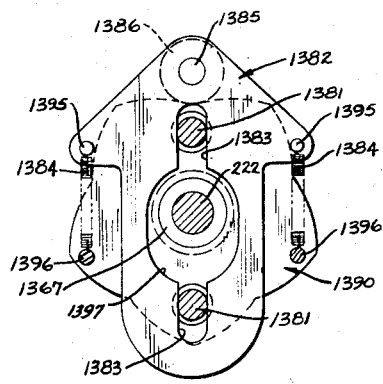
Figure 17:
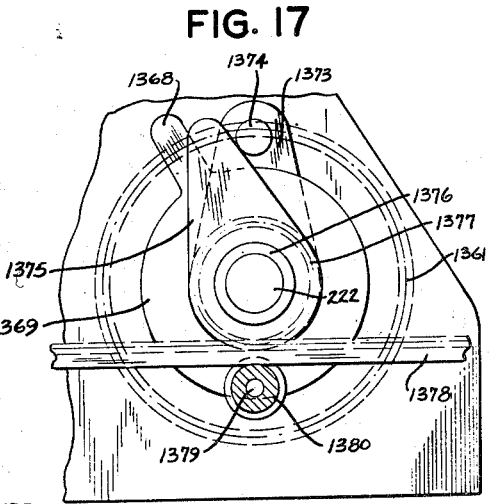
Figure 21:
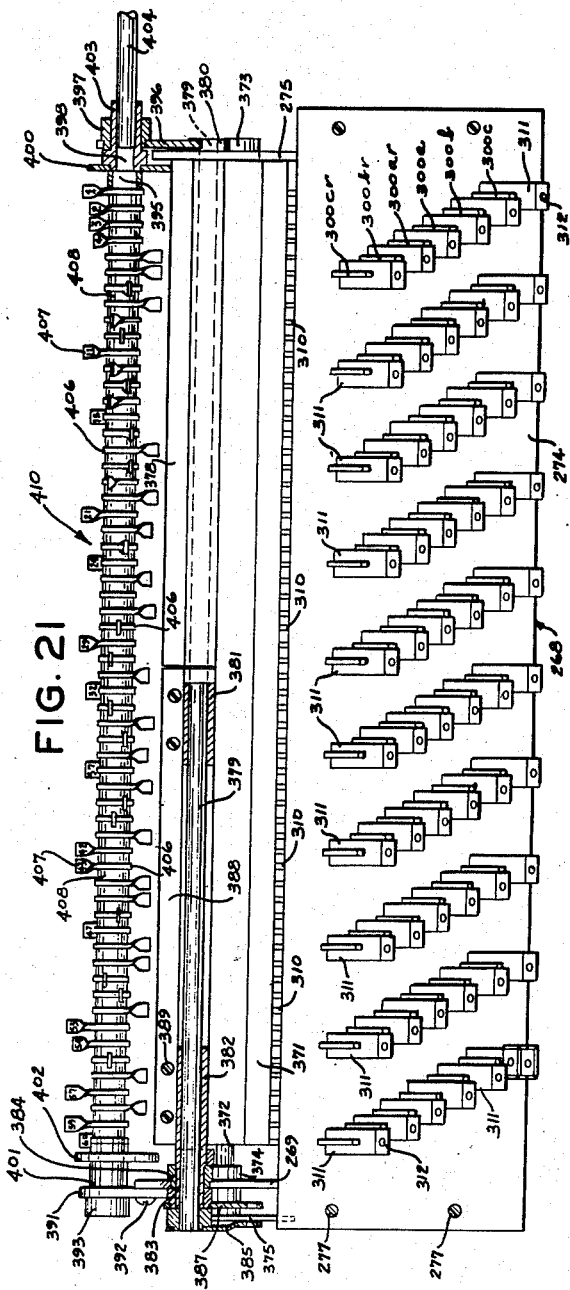

Figure 12 is a view similar to Figure 11, except that coins, to a value greater than the amount represented by the disc, have been accepted and counted, and the selector key plunger can enter the cut-out portion of the disc, the space between the edge of the cut-out and the adjacent surface of the plunger representing the amount of change to be delivered to the vendee along with a ticket for the destination represented by the selected key;

Figure 13 is a view similar to Figure 11, wherein the locking drum has moved backwards a distance sufficient to bring the adjacent edge of the cut-out into contact with the plunger, for the purpose of setting up the value of the change to be delivered with the ticket;

Figure 14 is a view similar to Figure 13, except that the plunger has been withdrawn and the drum is reset to its normal position;

Figure 15 is a view of a pawl and ratchet arrangement, as seen along the line 15—15 of Figures 8 and 10;

Figure 16 is an elevation, partly in section, taken along the line 16—16 of Figure 8;

Figure 17 is an elevation taken along the line 17—17 of Figure 8 showing a portion of the locking drum reset mechanism;

Figure 18 is an elevation, partly in section, showing the relation between a bank of selector keys and the locking drum and also showing a bank of counters and means carried by the selector keys for actuating said counters;

Figure 19 is a view similar to Figure 18 except that one of the keys of the bank has been depressed, and its plunger end extends into the cut-out portion of one of the locking drum discs;

Figure 20 is a front elevation showing a bank of selector keys, the supports therefor, and a control member for the ticket printing mechanism which is arrested by a depressed key;

Figure 21 is a plan view of the key bank shown in Figure 20 which also shows certain bails and which also shows one of the elements for determining the number of pennies to be given in change.

Figure 45:
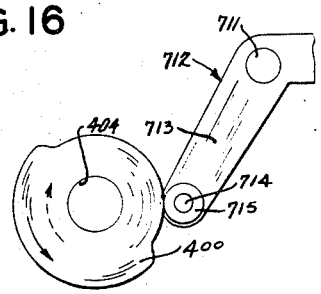
Figure 74:
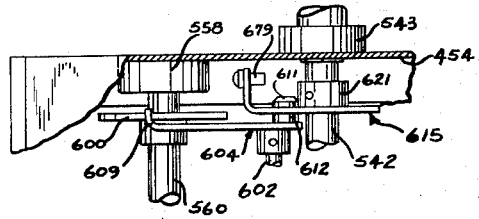
Figure 9:
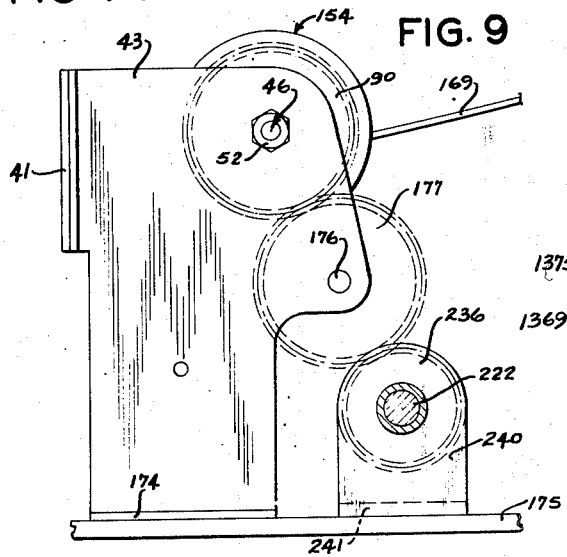
Figure 9 is an elevational view of a train of gears between the coin counter and the locking drum for rotating the locking drum in accordance with the value of the coins counted, said view being taken along the line 9—9 of Figure 8.
Figure 78:
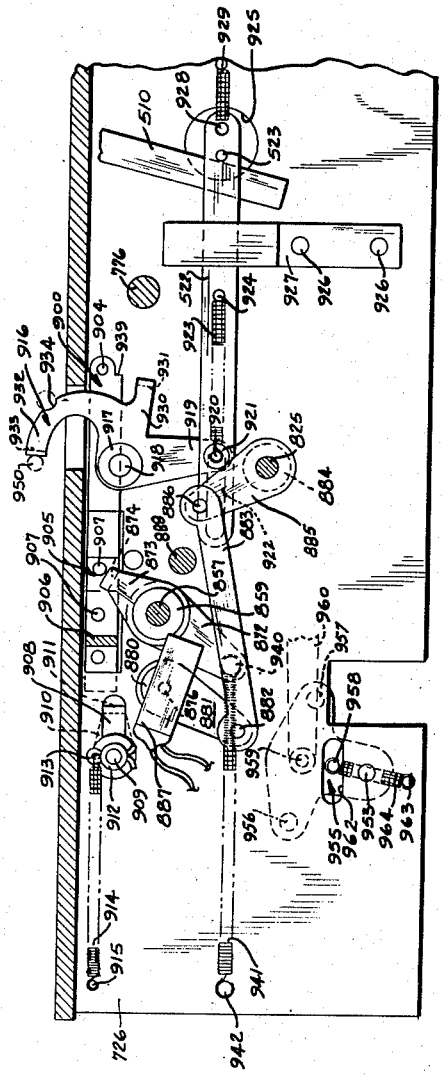
Figure 43:
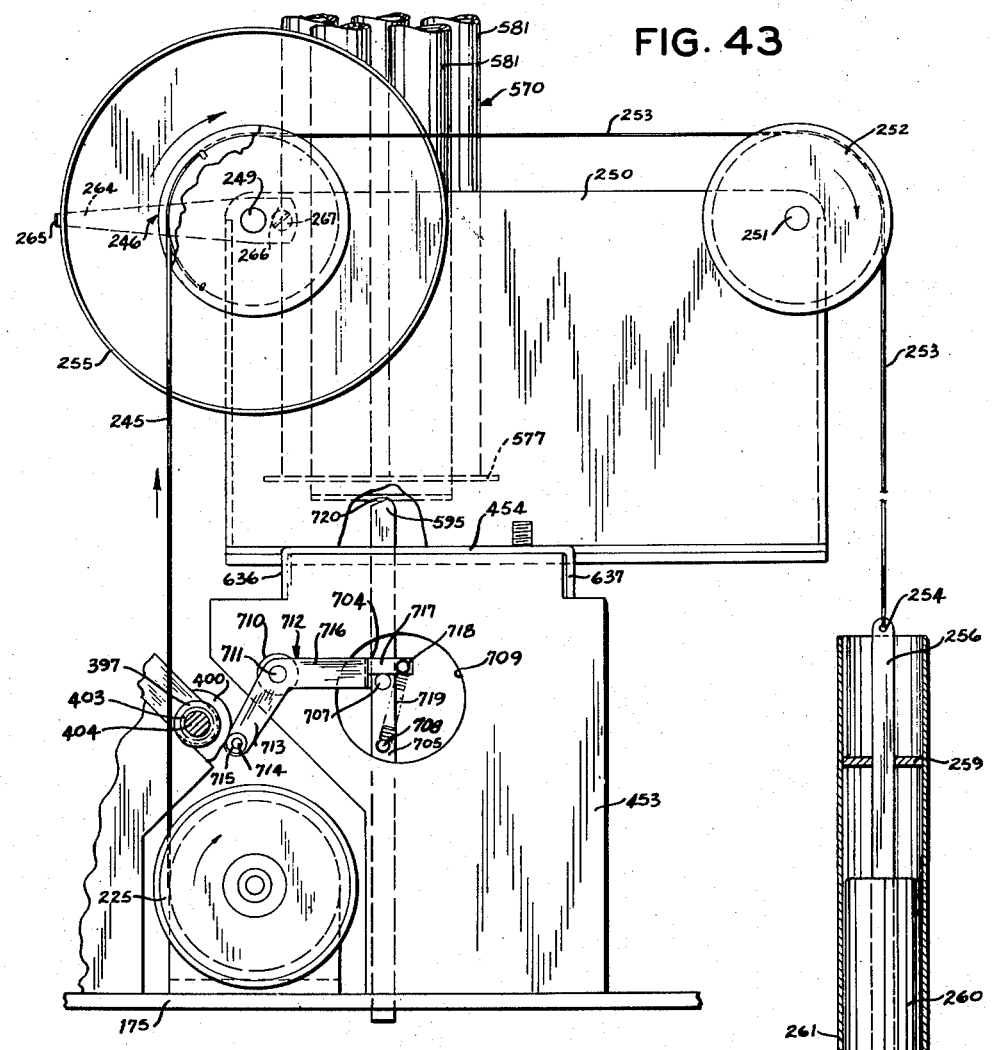
Figure 72:
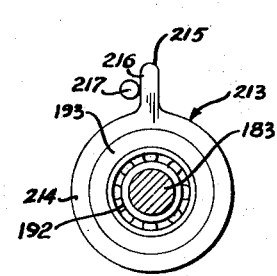
Figure 73:
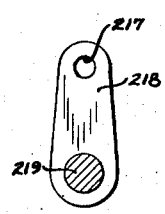
Figure 49:
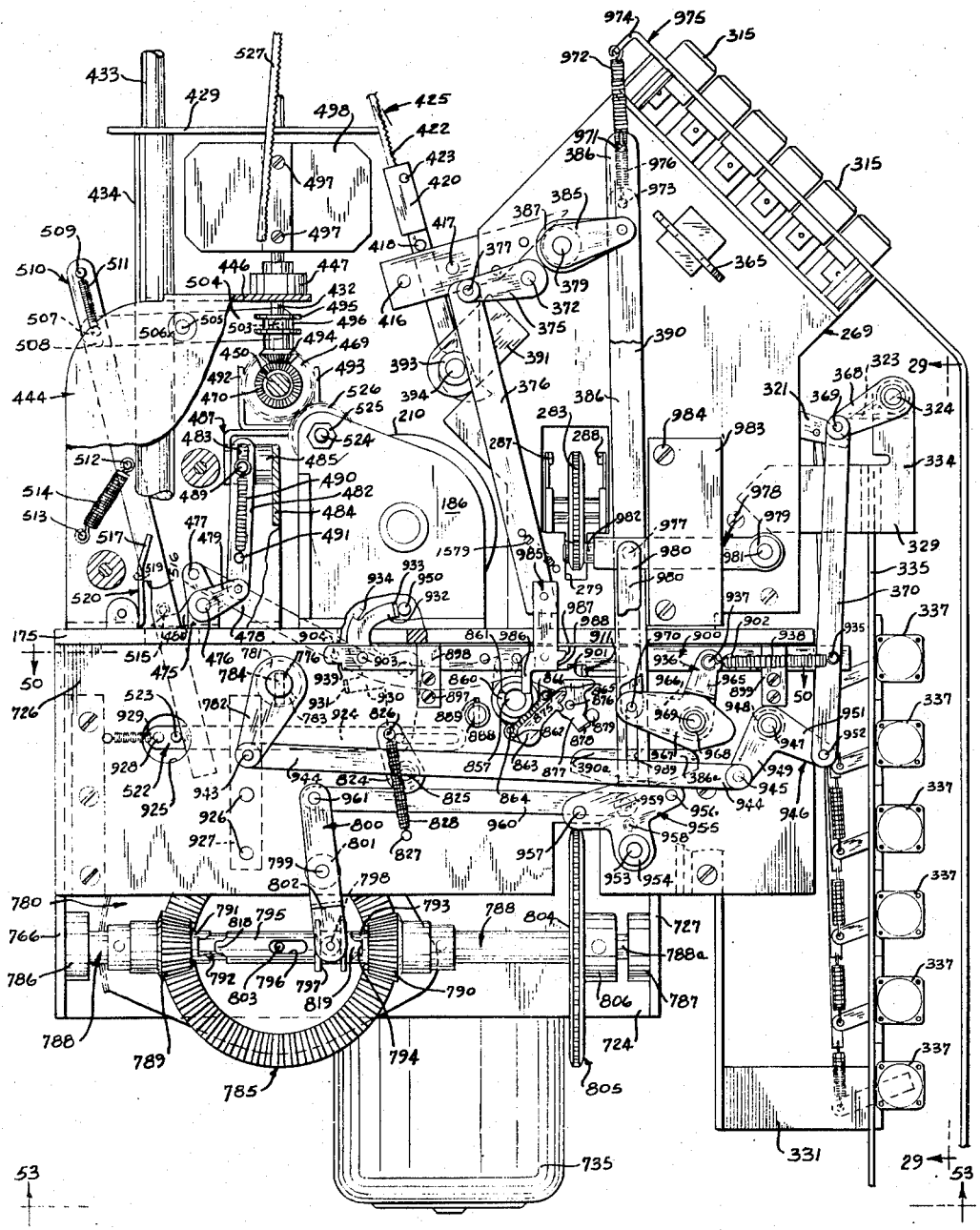
Figure 52:
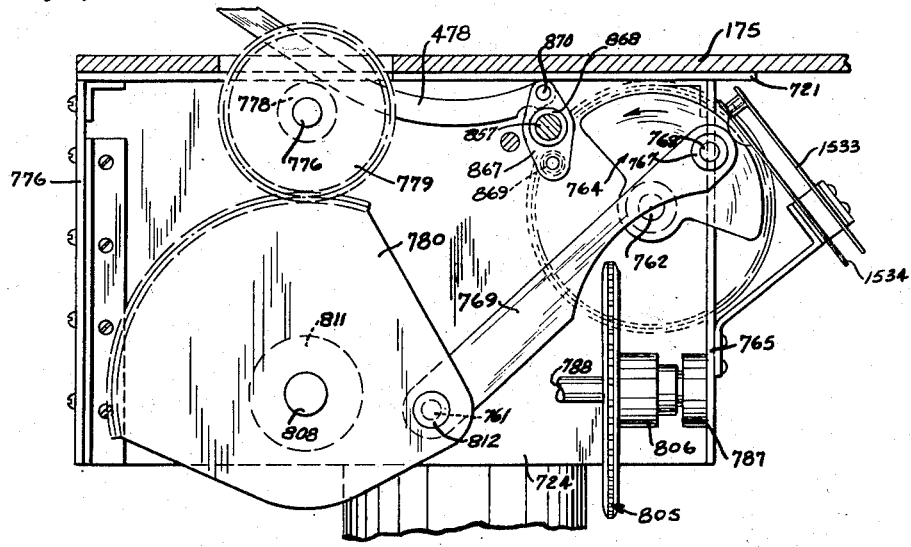
Figure 87:
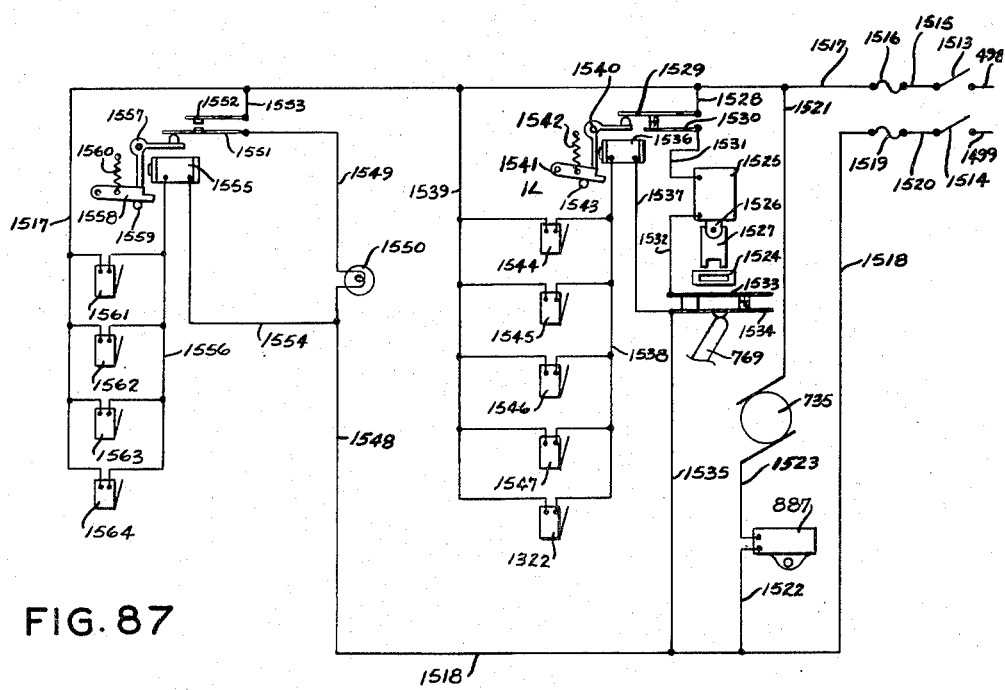
Figure 53:
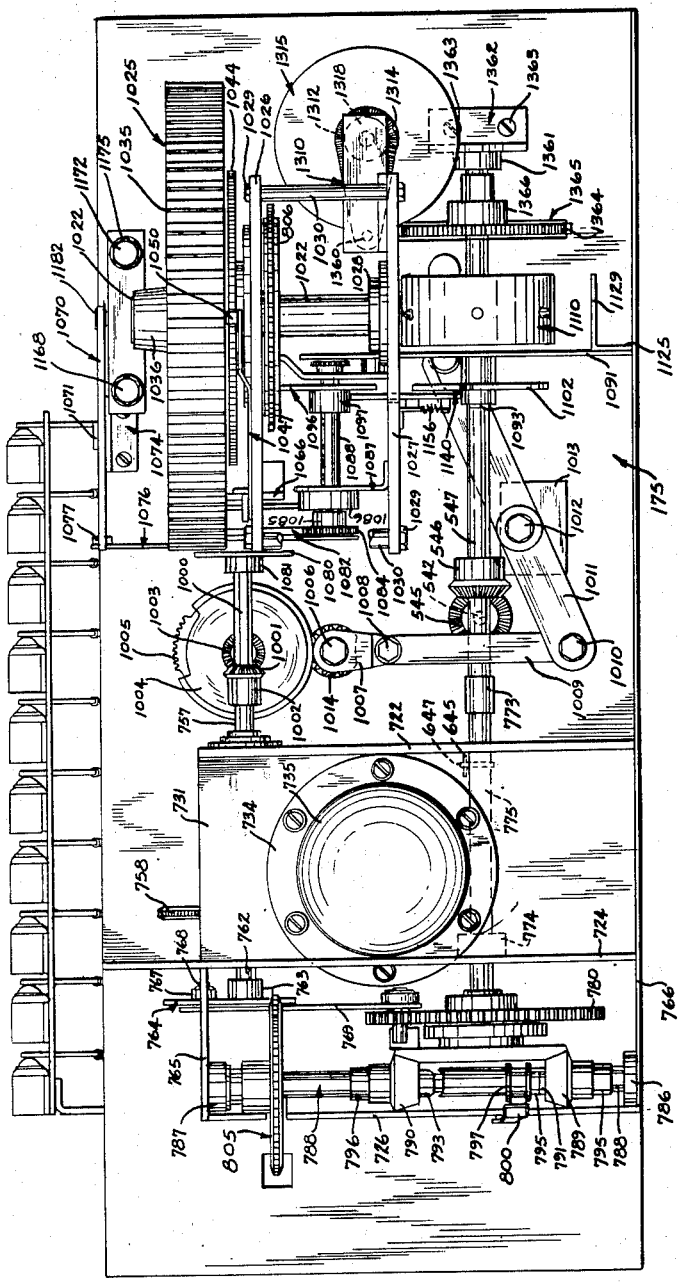
Figure 57:
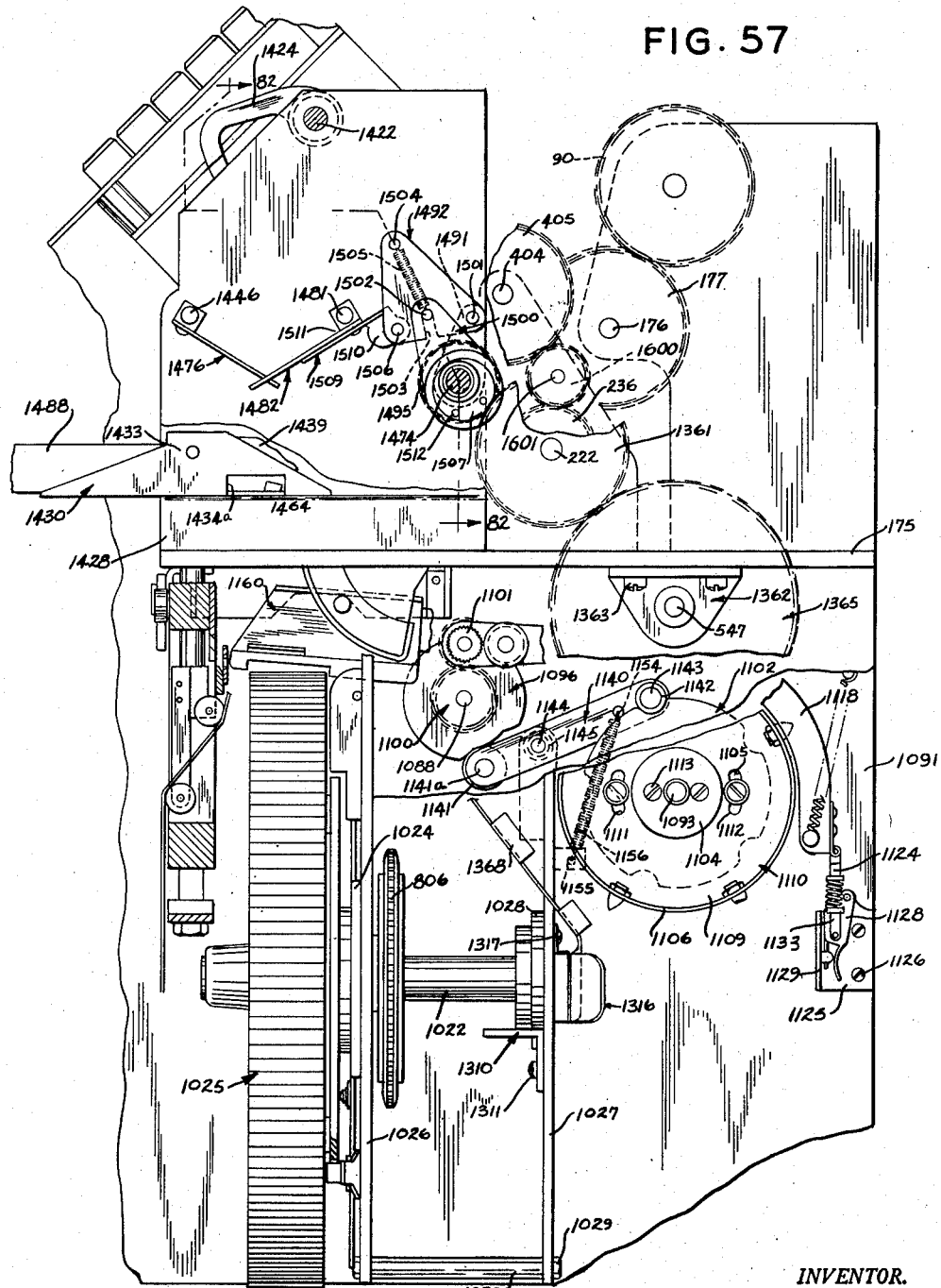
Figure 63:
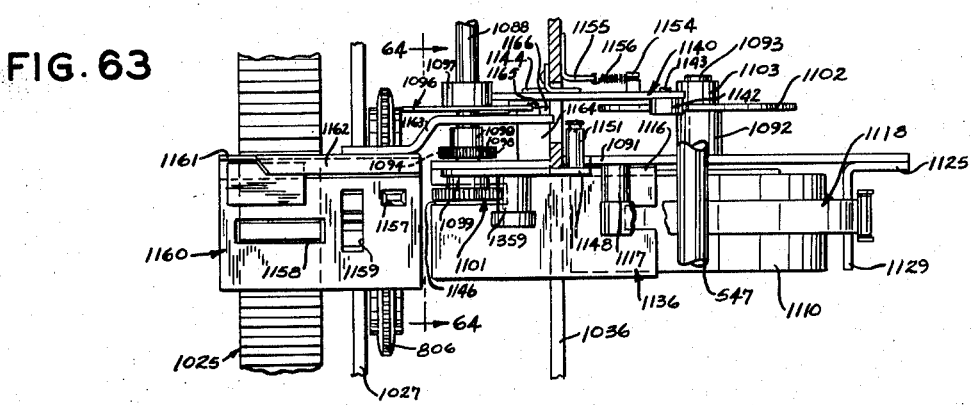
Figure 65:
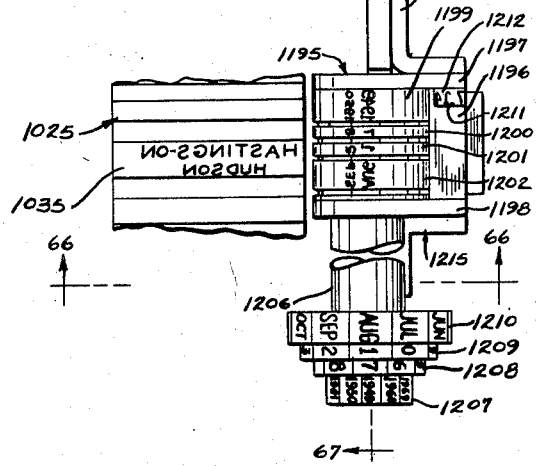
Figure 64:
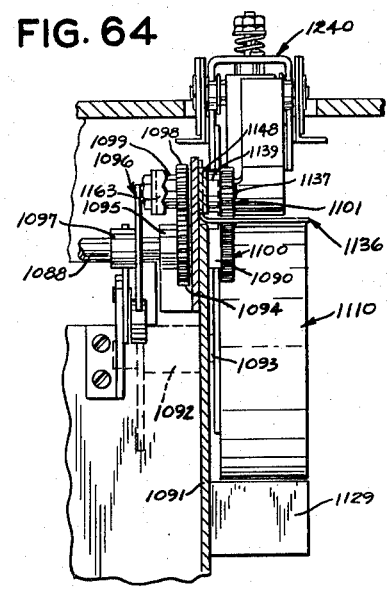
Figure 66:
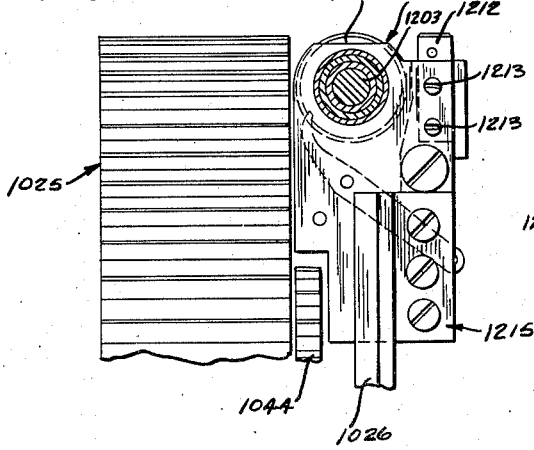
Figure 67:
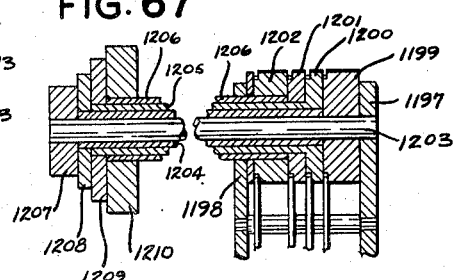
Figure 70:
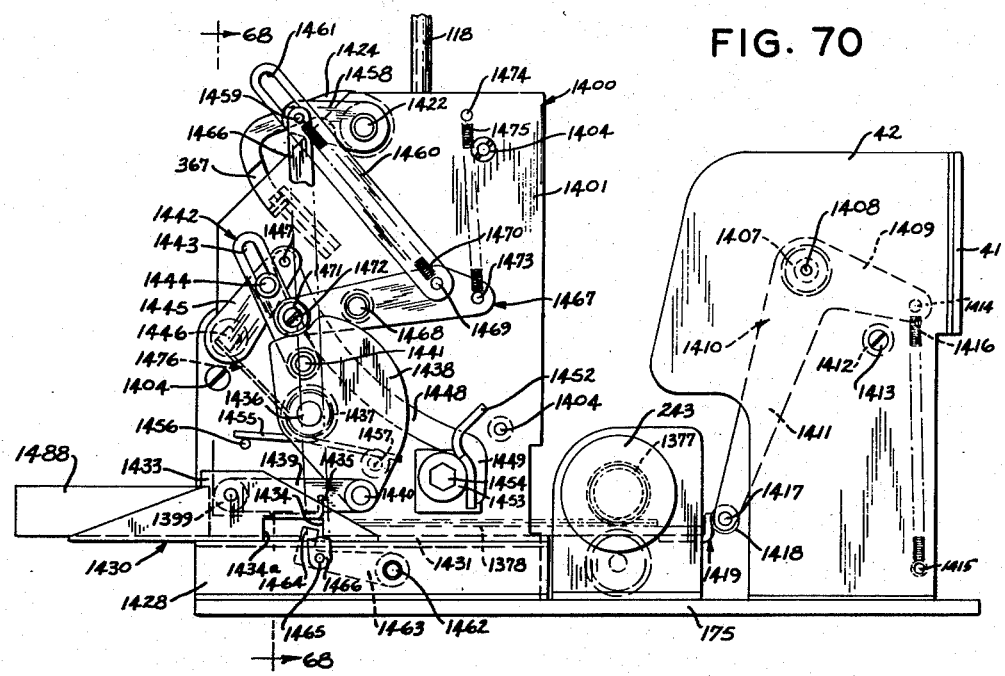
Figure 71:
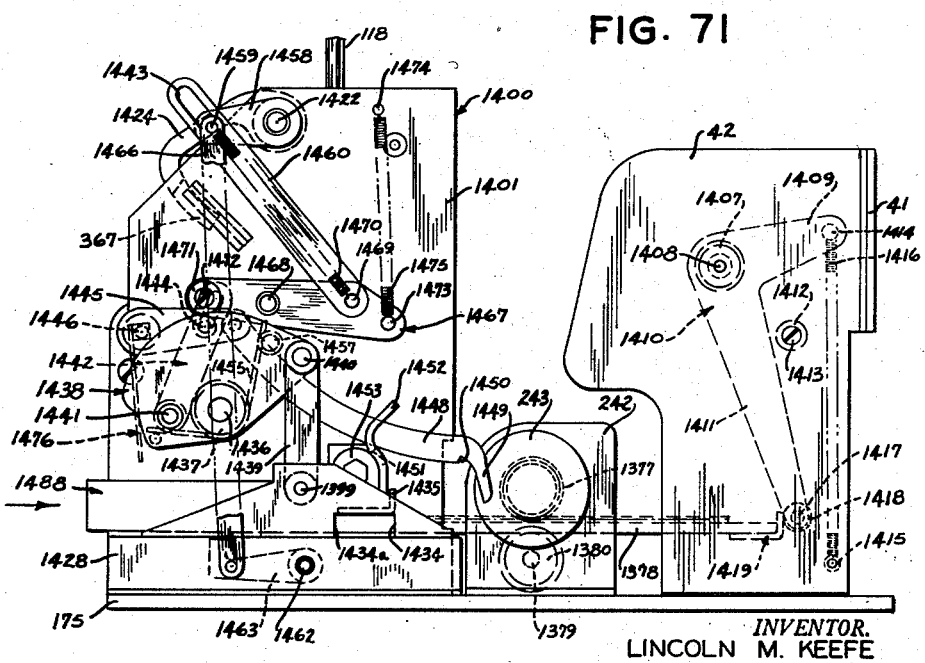
Figure 89:
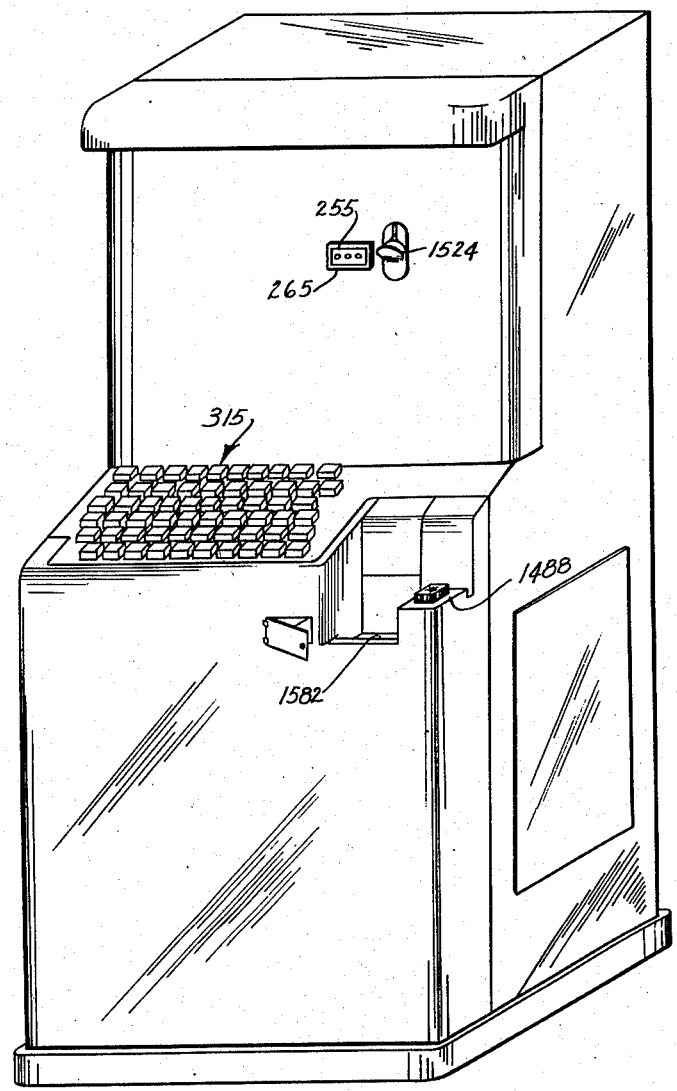

Figure 22 is a rear elevation of the key bank shown in Figures 20 and 21;

Figure 23 is a view showing the key bank of Figure 18 enlarged and showing a cross-section of the lockout chain;

Figure 24 is a fragmentary view of the lockout chain at one end of the key bank showing in elevation a locking member connecting the portion of the lockout chain on one side of the key stems to the portion of the lockout chain on the other side of the key stems;

Figure 25 is a view, partly in section, taken along the line 25—25 of Figure 24;

Figure 26 is a view similar to Figure 25, except that it shows the opposite or barrier end of the lockout chain;

Figure 27 is an elevation taken along the line 27—27 of Figure 26;

Figure 28 is an elevation, taken along the line 28—28 of Figure 26;

Figure 29 is a front elevation of the counter panel for indicating the numbers of tickets sold to each destination and the total tickets sold and showing means for actuating the counters thereon;

Figure 30 is an elevational view of the change carrying turrets, driving mechanism therefor, and certain other counters and means for operating the same;

Figure 31 is a plan view of certain of the mechanism taken along the line 31—31 of Figure 30;

Figure 32 is a plan view taken along the line 32—32 of Figure 30;

Figure 33 is an elevation taken along the line 33—33 of Figure 31;

Figure 34 is an elevation taken along the line 34—34 of Figure 30;

Figure 35 is an elevational view taken along the line 35—35 of Figure 30;

Figure 36 is an elevation of the nickel picker cooperating with the nickel change turret, as seen along the line 36—36 of Figure 30;

Figure 37 is an elevation taken along the line 37—37 of Figure 30;

Figure 38 is a plan view of the penny turret;

Figure 39 is an elevation of the turret shown in Figure 38;

Figure 40 is an exploded view of certain of the elements of the turret shown in Figure 39;

Figure 41 is a fragmentary view showing a picker ejecting a coin from the turret;

Figure 42 is a sectional elevation showing a coin being ejected;

Figure 43 is an elevational view taken along the line 43—43 of Figure 8 or Figure 54;

Figure 44 is a left end elevation showing the relation of several cooperating elements of the machine;

Figure 45 is an enlarged view of the cam for raising and lowering the cents picker;

Figure 46 is a left end elevation, partly broken away, of the locking drum, showing the locking drum in its normal position and showing a locking dog for locking up the machine when an amount of money greater than a predetermined amount is placed in the machine;

Figure 47 is a view similar to Figure 46, except that the drum has been rotated to a position as a result of the insertion of said predetermined amount;

Figure 48 is a view similar to Figure 47, except that a greater amount has been placed in the machine and the locking drum is locked, and thereby the machine has been disabled;

Figure 49 is an elevational view similar to Figure 44, except that a control section is provided below the main supporting plate, and interconnection between various elements are shown;

Figure 50 is a view of the control section as seen along the line 50—50 of Figure 49;

Figure 51 is a view taken along the line 51—51 of Figure 50;

Figure 52 is an elevation taken along the line 52—52 of Figure 50;

Figure 53 is a view taken below the main support plate looking upwardly and showing the bottom of the control section and mechanism for setting the printing wheel to print a station name corresponding to the name on the key selected;

Figure 54 is a front elevation of the machine showing mechanism for setting the printing wheel to print a station name corresponding to the name on the key selected;

Figure 55 is a right side elevation of the printing mechanism taken along the line 55—55 of Figure 54;

Figure 56 is a fragmentary view of the upper portion of the printing wheel and showing the knife for severing a printed ticket from a strip;

Figure 57 is an elevation, partly broken away, and showing mechanism for feeding tickets to the printing wheel and other details;

Figure 58 is a plan view of the mechanism for effecting printing operations;

Figure 59 is an elevation, partly in section, taken along the line 59—59 of Figure 58;

Figure 60 is a sectional elevation taken along the line 60—60 of Figure 59;

Figure 61 is a sectional elevation taken along the line 61—61 of Figure 59;

Figure 62 is a sectional elevation taken along the line 62—62 of Figure 59;

Figure 63 is a plan view showing other details of the ticket feed and the relation between the station name, the date, and code character;

Figure 64 is an elevation, partly in section, taken along the line 64—64 of Figure 63;

Figure 65 is a plan view of the registered type of the printing wheel and its relation to the date printer;

Figure 66 is a fragmentary view taken along the line 66—66 of Figure 65;

Figure 67 is a sectional elevation taken along the line 67—67 of Figure 65;

Figure 68 is a front elevation of the coin return mechanism showing the chutes for the accepted coins, the receptacle in which the accepted coins are lodged, and the discharge passages for the coins and controls therefor;

Figure 69 is a sectional elevation taken along the line 69—69 of Figure 68;

Figure 70 is an end elevation of the coin return mechanism with the elements thereof in their normal positions;

Figure 71 is a view similar to Figure 70, except that the elements are positioned to effect the return of the coins to the vendee;

Figure 72 is an elevation taken along the line 72—72 of Figure 10;

Figure 73 is an elevation taken along the line 73—73 of Figure 32;

Figure 74 is a detail view of the shear actuator taken along the line 74—74 of Figure 32;

Figure 75 is an elevation taken along the line 75—75 of Figure 30;

Figure 76 is a view similar to Figure 51, showing some of the elements in other positions to illustrate a certain action;

Figure 77 is a sectional elevation taken along the line 77—77 in Figure 51;

Figure 78 is an elevation taken along the line 78—78 in Figure 50;

Figure 79 is a fragmentary view taken along the line 79—79 of Figure 50;

Figure 80 is an exploded view showing one method of detachably securing the type slugs in the printing wheel;

Figure 81 is a view showing the path of the ticket stock past the printing elements and through the shearing means;

Figure 82 is a view of the carbon paper strip feed;

Figure 83 is a side elevation of the carbon paper strip feed;

Figure 84 is an elevation, partly in section, showing details of the money dumping mechanism;

Figure 85 is an elevational view of the damping means to minimize the rebounding of the locking drum as it comes to rest at the end of its reset cycle;

Figure 86 is an end elevation of the damping means shown in Figure 84;

Figure 87 is a circuit diagram of the electrical circuits in the machine;

Figure 88 is a polar diagram showing the various actions occurring in the machine during different phases of the machine cycle; and Figure 89 is a perspective view of the machine showing the location of the selector keys, the coin return, the cup into which the ticket and change or the returned money is deposited, and showing the coin slot and the device indicating the amount of money accepted by the machine.

*Coin counting mechanism*

Referring to Figures 1 to 7 inclusive, the coin counting mechanism, generally designated by the numeral 40, includes a vertical base 41 having end standards 42 and 43 with aligned holes therein to accommodate portions 44 and 45 of a shaft 46. These portions are of reduced diameter so that adjacent to each, the main portion 46 forms a shoulder. Extending from the portion 44 is a threaded portion 47 which is engaged by a nut 48, with a washer 49 between it and the standard 42, so that by means of the nut, the shaft may be fixedly mounted in the standard 42.

Extending from the shaft portion 45 is a threaded portion 50 which carries a washer 51 and a nut 52 for fixedly mounting the other end of the shaft in the standard 43.

Journaled on the shaft 46 are three planetary movements generally designated by the numerals 53, 54 and 55.

The planetary movement 53 includes a beveled gear 56 having a hub 57, which is journaled on the shaft 46. A spider 58 has a plurality of radial holes 59, each of which accommodates a stud shaft 60 having a head 61 thereon. Journaled on each stud shaft 60 is a beveled pinion 62, and these beveled pinions mesh with the beveled gear 64. The gear 64 has a hub 65 which is journaled on the tubular extension 63 of the spider.

A tubular boss 66 is secured on the shaft 46 by means of set screws 67 to provide a shoulder against which the right end of the hub 57 bears.

The planetary movement 54 includes a beveled gear 68 having a hub 69 which is fixed to the tubular extension 63 in any suitable manner, for example, by means of a taper pin 70. A spider 71, which is substantially identical to the spider 58, has radial holes therein which carry stud shafts 72, having heads 73, and upon which are journaled beveled pinions 74 meshing with the beveled gear 68.

The spider 71 has a tubular extension 75, and a beveled gear 76, meshing with the beveled pinions 74, has hub 77 journaled on the tubular extension 75.

The planetary movement 55 includes a beveled gear 78 having a hub 79 which is fixed to the tubular extension 75 by means of a taper pin 80. A spider 81, which is substantially identical with the spiders 58 and 71, has radial holes therein which carry stud shafts 82 having heads 83, and upon which are journaled beveled pinions 84 meshing with the beveled gear 78. The spider 81 has a tubular extension 85, and a beveled gear 86, meshing with the pinions 84, has a hub 87 journaled on said extension 85.

A ratchet wheel 88 is fixed on the tubular extension 85 in any suitable manner, for example, by means of a taper pin 89. Abutting the ratchet wheel 88 is a spur gear 90 which has a bearing hole therein journaled on the shaft 46. A shouldered screw 91 mounted on the gear 90, with its axis parallel to the axis of the shaft 46, has a pawl 92 journaled thereon. A stud 93, mounted on the gear 90, carries a spring 94a which urges the pawl into engagement with the ratchet wheel 88. A tubular boss 94 is secured on the shaft 46 by means of set screws 95 to provide a shoulder against which the left face of the spur gear 90 bears.

From the above description it will be seen that the gear 90 will be moved by any of the differentials 53, 54, 55, moving singly or combinationally. Now, for moving at least some elements of the differentials, I provide what might be termed escapements to be actuated by the impact of coins passing down their respective chutes.

Nickel escapement

The nickel escapement wheel, generally designated by the numeral 96, Figure 2, is formed of a plain disc 97, having a central hole therein forming a press fit on the hub 57 of the beveled gear 56, and an annulus 98 has its outer diameter equal to the outer diameter of the disc 97 and is mounted thereon in spaced parallel relation thereto by means of a plurality of rivets 100 passing through aligned holes in the disc and the annulus. A spacer sleeve 101 is positioned on each rivet, between said disc and said annulus.

The inner periphery 102 of the annulus, conjointly with the outer periphery 103 of a smaller disc 99, forms a follow cam which will presently be described.

The disc 99 has a central hole therein which fits on the hub 57, and it is held in equal parallel spaced relation to the disc 97 by spacer sleeves 104 which are identical with the sleeves 101. These sleeves are of course positioned between the two discs on the shanks of rivets 105, each passing through aligned holes in the discs and in the web of the beveled gear 56, between the teeth thereof and its hub 57. Thus the nickel escapement wheel 96 is fixedly secured on the beveled gear 56.

The follow cam, defined by the peripheries 102 and 103 consists of ten grooves 106 with "lands" 107 therebetween. Each groove 106 has a first extremity which is a shorter distance, radially from the axis of the escapement wheel, than its second extremity, as seen in Figure 2, and between each extremity and the extremity of its neighboring groove is a "land" 107. Each land is a radial groove of the same width forming a continuation between each first extremity and the second extremity of the next adjacent or neighboring groove.

A bracket 108 is secured to the base plate 41, adjacent to the excapement wheel 96, in any suitable manner, and this bracket carries a stud 109 upon which an escapement pawl plate 110 is supported. The escapement pawl plate is also shown in Figure 7. It has: an ear or pawl 111 which extends into the follow cam grooves 106, 107; a bearing hole 112 which is journaled on the stud 109; a slot 113 into which a reed-like lever 114 is secured; and it has a hole 115 therein to which one end of a spring 116 is attached. The other end of the spring is attached to a suitable eye 117 on the bracket 108, so that the pawl plate is urged in a clockwise direction, as seen in Figure 2, with the pawl 111 in contact with the follow cam surface 102 and against a leading land surface (107) due to the fact that the escapement wheel 96 is constantly urged in a clockwise direction by means to be presently described. The spring 116 also urges the lever 114 upwardly.

Coin counting operation

The reed-like lever 114 extends through a vertical slot 119 formed in the nickel coin chute 118. The lower end of this chute has an angular portion 120 which in turn has a 90° tab portion 123. The lower end 121 of the slot 119 forms a limit for the downward movement of the lever 114. The chute 118 has a vertical slot 122 in alignment with the slot 119, through which the left end of the lever 114 extends, and a cut-out portion 122a is provided through which the nickel may pass out of the chute.

As a nickel passes down the chute 118, Figure 2, it strikes the lever 114, and by impact causes it to move down to the point where it is arrested by the edge 121, at which the nickel is forced out of the chute through the opening 122a by the angular portion 120. The lever 114, in moving from the position shown in solid lines to the position shown in dot-dash lines, swings the pawl plate in a counter-clockwise direction, disengaging the pawl 111 from the land 107a.

Since the nickel escapement wheel 96 is urged in a clockwise direction, as pointed out above, the groove section 106a traverses the pawl 111, and since the spring 116 is, by this time, urging the pawl outwardly, the escapement wheel is arrested when the land 107b encounters the pawl 111. Thus, each nickel passing down the chute 118 causes the escapement wheel to advance one-tenth of a revolution, since the latter has ten lands in its follow cam, and this effects the advancement of the beveled gear 56 through an angle of 36°. This advancement is transmitted to the spur gear 90 as follows: from the beveled gear 56 via the pinions 62 to the spider 58, thence via the extension 63 of the spider to the beveled gear 68, via the pinions 74 to the spider 71, thence via the extension 75 of the spider 71 to the beveled gear 78, via the pinions 84 to the spider 81 via the extension 85 and thence via the ratchet 88 and the pawl 92 to the gear 90. Other gearing between the gear 90 and a positionable member for moving the latter, in accordance with the value of the coins accepted, will be presently described.

Dime escapement mechanism

The disc escapement mechanism includes a dime escapement wheel 124, formed of a plain disc 125 and an annulus 126 and a smaller disc 127. The plain disc 125 has a central hole therein which fits on the hub 65 of the beveled gear 64. The smaller disc 127 also has a central hole which fits on the hub 65, and these discs are secured on to the beveled gear 64 by means of a plurality of rivets 128 passing through aligned holes in the gear, the disc 125 and the disc 127, a spacer sleeve 129 being positioned on each rivet between the discs for holding them in spaced parallel relation. The annulus 126 is secured in concentric relation to the disc 125 by means of a plurality of rivets 130 passing through aligned holes in the disc and in the annulus, spacer sleeves 129 being positioned on each rivet between the annulus and the disc 125.

An end elevation of the disc escapement wheel is shown in Figure 6. The inner periphery of the annulus 126 and the outer periphery of the disc 127 are shaped to conjointly form a continuous follow cam having five curved camming portions 133 with lands 134 therebetween, each land being in the form of a radial slot joined by the adjacent camming portions 133, and the lands being 72 degrees apart (⅕ of 360°).

Cooperating with the dime escapement wheel 124 is a pawl plate 135, which is like the pawl plate 110. The pawl plate 135 has an ear or pawl (not shown) engaging the follow cam. The pawl plate is journaled on a stud 136, on a bracket 138, and carries a lever 137, which is similar to the lever 114 and which is urged in the same direction as lever 114 by a spring like the spring 116. A chute 170 for dimes, seen in Figures 8 and 68, and similar to the chute 118, is provided, and the lever 137 is so related to this chute that the impact of each dime thereagainst allows the escapement wheel 124 to advance 72 degrees (from one land to the next) in the direction of the arrow. This advance is imparted to the gear 90 as follows (referring to Figure 1): via the beveled gear 64 to the pinions 62 and to the spider 58, thence via the extension 63 of the spider 58 to the beveled gear 68; thence via the pinions 74 to the spider 71; then via the extension 75 of the spider 71 to the beveled gear 78, via pinions 84 to the spider 81, and thence via the extension 85 of the latter and via the ratchet 88 and pawl 92 to the spur gear 90.

Quarter (25¢) escapement mechanism

The quarter escapement mechanism includes a quarter escapement wheel 140, formed of a plain disc 139, Figures 1 and 5, and an annulus 141 and a smaller disc 142. The discs 139 and 142 both have central holes therein which fit on the hub 77 of the beveled gear 76, and these discs are secured on to the gear 77 in spaced relation by means of a plurality of rivets 143 passing through aligned holes in the web of the gear and in both discs, a spacer sleeve 144 being positioned on each rivet between the discs for defining and maintaining said spaced relation. The annulus 141 is secured in spaced concentric relation to the disc 139 by means of a plurality of rivets 145 passing through aligned holes formed in the disc and the annulus, a spacer sleeve 144 being positioned on each rivet between the annulus and the disc 139. The inner periphery 146 of the annulus 141 and the outer periphery 147 of the disc 142 are shaped to conjointly form a continuous follow cam having four curved camming portions 148 with lands 149 therebetween, each land being in the form of a radial slot joined by the adjacent camming portions, said last lands being 90 degrees apart (¼ of 360°).

Cooperating with the quarter escapement wheel 140 is a pawl plate 150, which is like the pawl plate 110 shown in Figures 2 and 7. The pawl plate 150 has an ear or pawl (not shown) engaging the follow cam between the peripheries 146 and 147. The pawl plate 150 is journaled on a stud 151 on a bracket 152 mounted on the base 41. The pawl plate carries a lever 153 which is similar to, and which is urged in the same direction as, the lever 114 by a spring (not shown) like the spring 116. A chute 171 for quarters, seen in Figures 8 and 68, and similar to chute 118 in Figure 2, is provided, and the lever 153 is related to this chute as the lever 114 is to chute 118, so that the impact of each quarter against the lever 153 allows the escapement wheel 140 to advance 90 degrees (from one land to the next) in the direction of the arrow. This advance is imparted to the spur gear 90 as follows (referring to Figure 1): via the beveled gear 76 and the pinions 74 to the spider 71, then via the extension 75 of the spider 71 to the beveled gear 78, then via pinions 84 to the spider 81, and thence via the extension 85 of the latter and via the ratchet wheel 88 and the pawl 92 to the spur gear 90.

Half-dollar (50¢) escapement mechanism

The half-dollar escapement mechanism includes an escapement wheel 154, formed of a plain disc 155, Figures 1 and 4, an annulus 156, and a smaller disc 157. The discs 155 and 157 both have central holes therein which fit on the hub 87 of the beveled gear 86, and these discs are secured on the gear 86 in spaced relation by means of a plurality of rivets 158 passing through aligned holes in the web of gear 86 and in both discs, a spacer sleeve 159 being positioned on each rivet between said discs for defining and maintaining said spaced relation. The annulus 156 is secured in spaced concentric relation to the disc 155 by means of a plurality of rivets 160 passing through aligned holes in the annulus and the disc 155, a spacer sleeve 159 being positioned on each rivet between the annulus and the disc. The inner periphery 161 of the annulus 156 and the outer periphery 162 of the smaller disc 157 are shaped to conjointly form a continuous follow cam having four curved camming portions 163 with lands 164 therebetween, each land being in the form of a short radial slot joined by the adjacent camming portions 163, and being 90 degrees apart (¼ of 360°).

Cooperating with the half-dollar escapement wheel 154 is a pawl plate 165, having a pawl 166 thereon engaging the follow cam, the pawl plate 165 is like the pawl plate 110 shown in Figures 2 and 7, and it has a bearing hole 168 journaled on a stud 166 carried by a bracket 167 mounted on the base 41. A spring (not shown), like the spring 116, has one end engaging a hole 115 in the pawl plate 165 and the other end secured to a fixed point (like the eye 117 in Figure 2) for urging the pawl plate 165 in a counter-clockwise direction, as seen in Figure 4. This pawl plate carries a lever 169. A chute 172 for the half-dollar coins, shown in Figures 8 and 68, and similar to chute 118 in Figure 2, is provided, and the lever 169 is related to said chute as the lever 114 is to the chute 118, so that the impact of each half-dollar coin upon the lever 169 allows the escapement wheel 154 to advance 90 degrees—from one land 164 to the next, in the direction of the arrow. This advance is imparted to the spur gear 90 as follows (referring to Figure 1): via the beveled gear 86 and the pinions 84 to the spider 81, and thence via the extension 85 of the latter and via the ratchet wheel 88 and the pawl 92 to the spur gear 90.

Referring now to Figure 8, the right end standard 42 and the left end standard 43, extend downwardly to and are secured on a main base plate 175 by means of screws passing through a horizontally extending foot portion 174 of the standard 43, and by screws passing through a like foot portion not shown of the standard 42.

Mounted in aligned holes in the standards 42 and 43, and parallel to the shaft 46, is a shaft 176, and a spur gear 177 has a double hub 178 engaging ball bearings 179 and 180 carried on shaft 176.

Locking drum (positionable member)

My positionable member, which in the present embodiment of the invention I term locking drum 182, has in axial alignment therewith a resetting device 181. The locking drum 182 (Figures 8 and 10 to 14 inclusive) has a central shaft 183 which has a ball bearing 184 on the left end thereof. The outer race of this bearing is pressed into a socket 185 carried by a standard 186, having a horizontal foot 187 secured on the base plate 175 by means of screws (not shown).

The shaft 183 has a spacer 188 secured thereto, adjacent to the ball bearing 184, and against which a second ball bearing 189 is positioned. An annulus 190 has a cavity therein into which the bearing 189 is pressed. This bearing also presses against a shoulder 191 formed on the shaft. The right end of the shaft 183 has the inner race of a ball bearing 192 pressed on to it. The outer race is pressed into a counterbore in an annulus 193. The central passage through the annulus 193 is journaled on the shaft, near the right end thereof.

The annulus 193 has an axial hole therein to accommodate one end 194 of a spring 195, which embraces the shaft 183. The other end 196 extends into an axial hole formed in a disc member 197, which is secured to the shaft by means of a set screw 198.

The annulus 193 has a portion 199 of reduced diameter to which one end of a tube 200 is secured. Likewise, the annulus 190 has a portion 201 of reduced diameter to which the other end of the tube 200 is secured. The annulus 190 also has a threaded portion 202. The tube 200 has on its exterior surface a plurality of axial teeth 203 extending from end to end thereon. In the embodiment shown there are sixty teeth, forty-eight pitch cut with a 90 degrees cutter.

A series of discs 205 carried on the locking drum represents the destinations to be selected by the vendees. These discs are all identical, each having a central hole 204 therein having sixty teeth which mate with the teeth 203 on the tube 200, and each having a cut-away sector defined by a depressed surface 206 bounded by straight edges 207 and 208. For purposes of this description the cut-away sectors will be termed "cut-out 206." The edge 207 may be considered the reference point, and this edge is inclined with respect to an imaginary radial line extending from the periphery to the center, so that an interposer (to be presently described) only encounters the outer extremity of this edge (207) out near the periphery. The edge 208 is inclined oppositely.

Assuming that the machine is to issue tickets for sixty different destinations, sixty of the discs 205 are positioned on the tube 200. The right end disc (Figure 10) abuts the shoulder on the annulus 193, and between this disc and its neighbor is a spacer ring 209, the same order of discs and spacer rings being employed throughout the length of the tube 200 so that the spacing between the discs is uniform. After the sixtieth or last disc on the left end is positioned on the tube 200, another spacer ring 209 is positioned thereon, and a spur gear 210 is put on in abutting relation. A washer 211 is placed in contact with the gear, then a nut 212, engaging the threads 202 on the annulus 190, is tightened to secure the entire assembly.

In assembling the discs 205 on the locking drum, they are positioned thereon with the reference points (207) arranged in accordance with the prices of the tickets, preferably with the lowest price on the right end and the highest price on the left end, so that the cut-outs 206 collectively form an open helix about the drum.

The outer end of the annulus 193 has a shoulder upon which is secured a dog 213. This dog, as can be seen in Figure 72, includes a ring portion 214 and a radial arm portion 215, the edge 216 of which is normally urged into contact with a stud 217 extending through an arm 218, shown in Figure 73. The discs 205 are therefore set on the tube 200 with their reference points 207 price positioned relative to the edge 216.

The shaft 183 has, near its right end, a portion 219 of reduced diameter upon which is secured the arm 218 with a washer 220 between it and the shoulder thus formed.

The reset shaft 222 has a portion 221 of reduced diameter on its left end (Figure 10) and has a socket 223 extending into it from said left end. Positioned in this socket is an extension 224 of the shaft 183. This extension is ball shaped near its extremity and is undercut toward the shoulder between it and the portion 219, thus the ball shaped portion contacts the walls of the socket, and alignment of the shafts 183 and 222 is abetted.

Secured on the portion 221 is a pulley which has an axial hole therein into which the right end of the stud 217 extends, thereby operatively connecting the pulley 225 with the shaft 183. The pulley carries shouldered studs 226 and 227, Figure 15, upon which pawls 228 and 229 respectively are journaled. Springs, such as the spring 230, are provided on each stud for urging the pawls outwardly into engagement with ratchet teeth 231 formed on the inner periphery of a ring 232. The ring has a disc-like web 233 riveted thereto which is secured on a bushing 234 journaled on the shaft 222. The bushing also has secured thereon, a spur gear 236, a spacer washer 235 being provided between the gear and the web 233. The bushing 234 is maintained in definite relation with the pulley 225 by means of a snap ring 237 engaging a groove formed in the shaft 222.

In contact with the snap ring 237 is the inner race of a ball bearing 238, the outer race of which is mounted in a socket member 239 carried on a standard 240, the foot 241 of which is secured on the main base plate 175.

Spaced apart from the standard 240 is a standard 242 which carries member 243 containing a ball bearing like the ball bearing 238 and having an inner race supporting the right end of the shaft 222. The standard 242 has a foot 244 which is secured to the main base plate 175.

*Means for urging the coin counter and the locking drum rotatively in a counting directory*

The pulley 225, Figures 8 and 43, has one end of a cable 245 connected thereto in embracing relation. A second grooved pulley 246 having a groove 247 and a second groove 248 therein is journaled on a stud shaft 249 carried on a supporting bracket 250 mounted on a turret to be presently described. Secured to the pulley 246 is a drum 255 carrying on its periphery graduations from .00 to 2.75. The bracket 250 also carries a stud shaft 251 spaced apart from and in horizontal alignment with the shaft 249. A pulley 252 is journaled on this shaft and has a groove therein in alignment with the groove 248.

The other end of the cable 245, mentioned above, is connected to the groove 247 of the pulley 246 so that, as the latter is moved clockwise, as seen in Figure 43, the locking drum 182 (Figure 8) is moved in the same direction. For urging the pulley 246 in said direction, a second cable 253 has one end connected to the groove 248 of pulley 246, and the cable passes over the grooved pulley 252 and has its other end connected to an eye 254 formed in the upper end of a bar 256. A head 257 on the lower end of this bar has the lower end of a helical spring 258 abutting it, and a weight element 260 freely movable on the bar rests on the upper end of the spring. The bar, weight, and spring extend into a tubular receptacle 261 mounted on a suitable support 262 in the machine. The lower end of the tubular receptacle has holes 263 therein for the entry and escape of air as the weight element moves up and down. A disc 259 on the bar 256 is spaced apart from the weight element 260 and forms an upper limit for the movement of the latter on the bar 256.

*Indicating the value of coins accepted*

A bracket 264 having a pointer 265 on its extremity overlying the graduations on the periphery of the drum 255 is pivotally carried on the stud shaft 249 and has an arcuate slot 266 therein through which the shank of a screw 267 extends and threadedly engages a hole in the main bracket 250. By loosening the screw 267, the pointer 265 may be set in registration with the graduations. Normally the pointer 265 points to .00, and as coins, passing down any of the chutes 118, 170, 171 and 172 are "counted" by the coin counter, the gear 90, the gear 177, and the gear 236 rotate under the urge of the weight element 260. The drum 255 indicates the value of the coins counted, and this is visible to the vendee.

*Selection of a wanted destination*

The locking drum 182 also rotates in accordance with the value of the coins counted, since its shaft 183 is directly connected to the pulley 225 through the stud 217 and the arm 218 fixed on the shaft, and the pulley, through the pawl and ratchet arrangement carrying gear 236, are positive in the direction they are urged by the weight element 260.

Referring to Figure 11, the locking drum is in its normal or reset position, and an interposer 270 of a selector key, if pushed downwardly, would encounter the periphery of the disc 205 representing a destination. Now, as coins are accepted and are counted by the coin counter, the locking drum 182, and consequently the disc 205, is rotated in the direction of the arrow in Figure 11. As this occurs, the reference point 207 on the disc approaches the interposer. If an amount equal to the cost of the ticket is counted, the point 207 would stop when it arrived at a position where it would just clear the left edge of the interposer 270. In this event, the machine would not give out any change, as will hereinafter be explained. In Figure 12, the disc is shown in a position where the amount of money counted is greater than the cost of the ticket—so when the selector key for that destination is depressed, the interposer enters the cut out 206 and the machine can issue a ticket for the selected destination, as will be clearly explained herein, and during the cycle the disc 205 moves in the opposite direction from the position shown in Figure 12 to the position shown in Figure 13. The amount of movement of the reference point 207 to contact the interposer determines the change to be delivered with the ticket, and mechanism to be described integrates that movement into the delivery of coins constituting the correct change. Figure 14 shows the disc returning to its reset position.

*Selector key bank*

The selector key bank 268 forms a unitary structure which may be bodily assembled into or removed from the machine. This structure is shown in Figures 20, 21 and 22. In Figure 54, its relation to other elements of the machine is shown, as seen from the front. In Figures 44 and 49, end elevations of this structure and its relation to other elements of the machine may be seen, while sectional elevations Figures 18 and 19 show the relation between the selector keys, the discs of the locking drum and other features.

The selector key bank 268 has a left vertical end plate 269 with an inturned foot portion 271. The upper end 272 of this end plate is angular with respect to the vertical axis, as the keyboard is to be inclined, and an inturned flange 273 thereon has secured thereto by means of screws, a top plate 274 through which the key stems, to be presently described, extend.

A second or right vertical end plate 275 has an inturned foot portion 276 adapted to be secured to the main base plate 175. The upper end of this end plate is also angular and has an inturned flange 277 to which the top plate 274 is secured by means of screws.

The end plates 269 and 275 have aligned rectangular holes 278 and rectangular holes 279 communicating therewith (Figure 18). A block member 280 has flanges 281 secured to the end plate 269 and a projection thereof 282 extends through the rectangular hole 278. This projection is slotted to accommodate a sprocket 283 and this sprocket is journaled on a shaft 284 positioned in aligned holes in the slotted projection. A block member 285 has flanges 286 secured to the end plate 275 and has a central slot therein. A chain support channel 286 extends from a point, where it clears the sprocket 283, adjacent to end plate 269, to contact the other end plate 275. Along each edge of the channel 286 are overhanging flanged rails 287 and 288, which are secured to the flanges 289 and 290 of the channel, respectively, by means of screws 291. The channel 286 is secured to the blocks 280 and 285 by means of screws 292. The purpose of the channel 286 with the overhanging rails is to provide a positive track for a chain 295 carrying a right hand engaging member 293 and a left hand engaging member 294, the functions of which will be explained herein.

A pair of opposed channels 296 and 297 are secured to the end plates 269 and 275 and have the adjacent faces of their main webs in spaced parallel relation and the axis of the space between them is 90° with respect to the plane of the top plate 274. The main webs have a plurality of aligned slots 298 and 299, respectively, therein.

A plurality of key stems 300 are reciprocally carried between the channels 296 and 297 as follows: Each key stem has a lateral tab 301 which extends into a different slot 298 in the channel 296. Each key stem also has a like lateral tab 302, in alignment with the tab 301 and extending in the opposite direction and into a slot 299 in the channel 297. The extremity of the tab 301 has a right angled portion 303 and an angular portion 304. The extremity of the tab 302 has corresponding portions 305 and 306.

The key stems also have aligned oppositely extending lateral tabs 307 and 308 which are spaced apart, lengthwise of the stem, from the tabs 301 and 302. Secured to the stem 300 between the tabs 307 and 308 is a stud 309 which actuates a lever 310 when the key on said lever is depressed. Since there are six selector keys in each group, and 10 groups making a total of 60 selections, the key stems per se are made with the two pairs of opposed tabs and are consequently reversible. Now, with six keys in each group and with the stems reversible, it is only necessary to make three forms of keys to make up the entire keyboard. In Figure 19 the key stem 300 has an offset extension 300a, which has the smallest amount of offset. Now take one with the same amount of offset and turn it over, and it assumes the position 300ar (300a reversed). The next greater amount of offset is shown in Figure 19 at 300b. Now, when a key like 300b is turned over, it assumes the possition 300br (300b reversed). At 300c the greatest amount of offset for the extension is shown, and when a key like this is turned over, it assumes the position 300cr (300c reversed).

Secured on each key, for example by riveting or welding, is a stem 311, and each stem carries a tapped hole 312 (as seen in Figure 20). Secured on each stem by means of a screw 313 engaging tapped hole 312, is a stamped hollow rectangular springy member 314, as seen in Figure 54. Mounted on each member 314 is a hollow rectangular button member 315, Figures 18 and 19, bearing the name of the station to which the key corresponds.

Returning to the levers 310, Figure 18, these are really bell-cranks, each having an arm 316 held in contact with the stud 309 of its associated key stem 300 by means of a spring 317, one end of which is connected to the arm 316 and the other end of which is connected to a serration on the serrated edge 318 of a guide member 319. The levers 310 are all journaled on a shaft 320 supported in the guide member. Each lever has a second arm 321, and all of these arms extend through a different one of a series of vertical slots 322 in the guide member 319. At the extremities, each of the levers 321 is beveled and they are all normally disposed along a line adjacent to the edge of a bail 323 carried on a bail shaft 324. Each lever is provided with a hole near its beveled end, the function of which will be presently described.

The guide member 319 is secured to and supported by the end plates 269 and 275.

A lever 325 has a bearing hole in one end which is journaled on the shaft 320 at one end of the array of bell cranks 310 and a second like lever 325 has a hole therein journalled on the shaft 320 at the other end of the array of bell cranks 310. The two levers 325 have aligned holes therein near the other ends thereof, and secured in these holes, and thereby tying the levers together, is a rod 326 which rests on the upper surfaces of all of the arms 321 of the bell cranks, so that as any arm in said array is raised, it in turn raises the rod 326 and the levers 325 supporting it, and the function of this will presently be explained.

*Counter panel*

Depending from the left end plate 269, Figure 18, is an angle iron support 327, and secured thereto by means of screws such as screws 328 is a bracket member 329 having a right angled tab 330. Secured to the lower end of the support 327 is a U-shaped bracket 331 having legs 332 and 333. The legs 332 is secured to this support 327 by means of screws 328. An extension 334 of the bracket 329 carries a bearing (not shown) in which the bail shaft 324 is journaled. The right end plate has a depending angle iron support like 327, and this support carries members like 329 and 331 and also an extension like 334, in which the other end of the bail shaft 324 is journaled.

A panel 335, Figure 29, is secured to these tabs and legs by means of screws 336. This panel has mounted thereon sixty counters 337 arranged ten in each of six rows, each row being displaced with respect to its neighbor. Since the machine has 60 keys, each representing a different destination, I provide one counter 337 for each destination, so that at any time the number of tickets sold for each specific station can be read off. Another counter 338 is also provided for counting the total of all tickets sold for any and all destinations. Each one of the counters 337 is provided with an actuating lever 339, and although the lever on the total counter 338 is like the others, it is designated by the numeral 340 to simplify this explanation. Adjacent to each lever, the panel has a rectangular hole 341 therein, through which the lever extends.

Referring also to Figure 18, the arm 325 has a hole therein to which one end of a pull rod 342 is connected. The other end of the pull rod is connected to one end of a spring 343 and the lower end of the spring is connected to a suitable hole near the outer end of the lever 340. Whenever any key 315 is depressed to select the destination, the lever 321 corresponding to the key raises the rod 326 and consequently the levers 325. This causes the pull rod to pull the counter lever 340 to move upwardly, thereby actuating the total counter 338. In case the lever 340 gets stuck or too hard to move, the spring 343 will stretch and prevent breakage or other damage.

Each of the other counters 337 is connected to a different lever 321 by means of a similar pull-rod-spring arrangement. As seen, for example, in Figure 18, the lever 339 of each counter is connected to its corresponding lever 321 by means of a pull rod 344 and a spring 345 in series therewith.

*Lockout chain*

In most vending and dispensing devices where the vendee selects by means of keys or other means, some form of "lockout chain" is provided to prevent another key or other selector from affecting the machine in any way after a selection has already been made. My lockout chain is shown in Figures 18, 19, and 25 to 28 inclusive. Referring to said figures, a bar 346 has a longitudinal slot 347 formed therein, and a member 348 forming a closure for the slot, defines a passage in which a plurality of discs 350 are positioned. A plurality of lateral slots 349 are formed in the bar 346, each communicating with said passage. Each slot is in alignment with a plunger 351 on a different key stem 300. Each plunger 351 is formed by securing a U-shaped metal member onto 300 by means of two escutcheon pins 352. The end of the bar 346 has a horizontal slot 353 formed therein and communicating with the passage in the bar.

The end plate 269 has a metallic block 354 secured to its inner face, in any suitable manner, and the axis of block 354 is parallel to the axes of the key stems 300. Secured to the opposite end plate 275 and in alignment with the block 354 is a similar block 355. The bar 346 is secured to faces of the blocks 354 and 355 in any suitable manner, and it will be noted in Figure 27 that the edge of the last lateral slot 349 in the right end thereof is exactly the diameter of a disc 350 from the adjacent surface of the end plate 269.

A second bar 356 has a longitudinal slot 357 formed therein, and a member 358 forming a closure for the slot, defines a passage in which a plurality of discs 360 are positioned. A plurality of lateral slots 359 are formed in the bar 356, each communicating with said passage. Each slot is in alignment with a plunger 351a on a different key stem 300. These plungers are identical with the plungers 351 described above, except that they are oppositely disposed on their key stems and are in alignment with the slots 359 in the bar 356.

One end of bar 356 is secured to the opposite face of the block 354; and the other end is secured to the opposite face of the block 355, so that one bar lies adjacent to the edges of the row of key stems 300, and the other bar lies adjacent to the opposite edges of said row, as may be clearly seen in Figure 23. The end portion 356a of the bar 356, between the last slot 359 and the end plate 269, is left solid as seen in Figure 26 and it forms a solid barrier at one end of the chain. The barrier at the other end of the chain is the portion of the end plate 269 which abuts the right end of the bar 346, also seen in Figure 26.

The horizontal slot 353 in the bar 346, coincides with a corresponding slot 361 in the block 355, Figures 24 and 25, and a corresponding slot 362 in the bar 356 matches the slot 361, so that collectively they form a continuous passage. The block 355 has a vertical hole therein to accommodate a shaft 363 upon which a link member 365 is journaled. The link member has a rounded lobe 364 which contacts the left end disc 350 in the channel in bar 346 and a rounded lobe 366 which contacts the left end disc 360 in the channel in bar 356, thus the link member connects the two series of discs in their respective channels to form the lockout chain. The relation of the discs 350, the link member 365 and the discs 360 is such that when one plunger 351, or one plunger 351a, enters between adjacent discs 350, or between adjacent discs 360, it is impossible for any other plunger to enter between the discs in either bar.

The end vertical slot 359a in the bar 356 is provided to receive a plunger 367 carried by one element of a coin return mechanism to be presently described in connection with Figures 68, 69, 70 and 71. When the vendee presses a coin return button to get his money back, before a vending operation, the plunger 367 enters the slot 359a, and consequently none of the plungers 351 or 351a on the selector keys can enter the lockout chain, so that it is impossible for the vendee to cheat the machine by getting his money back and a ticket free, or by pushing a key for a low priced ticket to get the cycle started and suddenly pressing a higher priced key. There are other safeguards in the machine which will presently be described.

Referring to Figures 18 to 21, and 44, the bail shaft 324 has secured on its outer end a crank arm 368 which is pivotally connected, as seen in Figure 44, by means of a clevis pin 369 to a bar 370, which is in turn connected to control mechanism to be presently described.

A bail 371 is carried on a bail shaft 372 which is journaled in bearings 373, in end plate 275, and 374 in end plate 269. The shaft 372 extends through the bearing 374 and has secured thereon a crank arm 375 (Figure 21). The crank arm is pivotally connected to a bar 376 by means of a clevis pin 377 (Figure 44). The bail 371 functions to swing above the lateral tab 301 of a depressed key to prevent it from returning to its normal position until the end of a machine cycle.

A bail 378 has a shaft 379, one end of which is journaled in a bushing 380 in the end plate 275, and the other end is journaled in a sleeve 381, and a second sleeve 382 (Figure 21). The sleeve 382 is stepped and has a portion 383 journaled in a bushing 384 fixed in the end plate 269. The shaft 379 extends beyond the left end of the sleeve 382 and has secured thereon a crank arm 385 to which a bar 386 is pivotally connected as shown in Figures 44 and 49. The sleeve portion 383 projects beyond the left end of the bushing 374 and has, secured to its outer end, a crank arm 387.

A bail 388 is secured to the sleeve 381 and to the sleeve 392 by means of screws 389, and normally the bails 378 and 388 are in alignment as seen in Figure 18. The crank arm 387 has pivotally connected to it a bar 390.

In the embodiment of the invention herein disclosed, it has been described that the machine prints and delivers tickets for sixty different destinations. This means that a printing wheel (to be presently described) carries sixty different type set-ups and this printing wheel is rotated, in accordance with the selection made, to bring the type set-up of the destination selected into registration with the ticket, so that printing may be effected during the operating cycle of the machine. Now, since the printing wheel is of considerable weight, it is desirable to move it the least distance possible in order to avoid excessive momentum. For this reason the control mechanism, to be presently described, is so arranged that when any key 315 in the first group of thirty keys, controlled by the bail 378, is depressed, the printing wheel (which is moved by the chain 295) rotates in one direction; and when any key in the second group of thirty (thirty-one through sixty) controlled by the bail 388, is depressed, the printing wheel rotates in the opposite direction. This means that the rotation of the printing is from a few degrees to a maximum of about one-half revolution.

Secured to the end plate 269 (Figures 21 and 44) is a plate member 391 in any suitable manner, as, for example, by means of screws 392. The plate member carries a bearing bushing 393 into which the round end portion 394 of a shaft 395 is journaled. A second plate member 396 is similarly secured on the end plate 275 and carries a bearing bushing 397 in axial alignment with the bushing 393. The shaft has a round portion 398 on its other end, to which is keyed a hub 399 carrying a cam 400. The hub has a shank portion 403 of reduced diameter journaled in the bearing 397. The shaft 395 has secured on its left end (Figure 21) the hub 401 of a cam 402. On the shaft 395 is positioned a plurality of discs 406, each having a tab extension 407 with a spacer washer 408 between each disc, so that the tabs 407 each is in cooperative relation with a lateral tab 301 of a different key stem 300. There are sixty discs 406 with tab extensions 407 thereon, numbered from one to sixty and they are positioned on the shaft in that order from left to right.

Each disc 406 has a hole 409 therein in the form of an eight-pointed star, and since these fit on a square shaft, each disc has eight possible positions thereon, and the position thereon determines the number of cents to be given in change. The entire assembly of shaft, cams, discs and tabs is referred to hereinafter as "the cents sensing device 410."

Detachably mounted in and keyed to the interior bore of the bushing extension 403 is a shaft 404 which in turn has a spur gear 405 keyed on the other end thereof. The spur gear 405 meshes with a gear in the locking drum resetting device 181 which will presently be described.

Secured on the end plate 269 by means of screws 412 is a plate member 411 which is slotted to form a reciprocal mounting for a bar 413, and which carries rollers 414 and 415 on shafts 416 and 417, respectively, to reduce the friction and yet to more positively guide the bar 413. The bar has a stop pin 418 to limit its downward motion. A roller 420, journaled on a stud shaft 419 is in cooperative relation with and is reciprocated by the cam 402. The upper end of the bar 413 carries a socket member 421 in which a rack member 422 is mounted and secured therein by means of a screw 423.

Panel for money counters

A money counter panel 425 carries a counter 424 having a gear flanged 426 on its shaft 427 which meshes with the teeth of the rack 422. A free roller 428 on a stub shaft 429 maintains the rack in mesh with the gear 426. The counting is effected, in the counter 424, when the gear 426 rotates in one direction, and does not count when rotated in the opposite direction. The money counter panel 425, which is preferably formed of metal, has formed integral therewith a base horizontal extension 440 and an upper horizontal extension 430. Continuous with and extending forwardly from the extension 430 is a plate extension 431 which carries a bearing bushing 500 for the upper end of a shaft 432 (Figures 44 and 30).

The portions 430 and 440 have aligned holes therein to accommodate the portions 433, 433a of vertical rods 434, 434a, which are smaller in diameter than said rods and form shoulders, such as the shoulder 435, upon which the horizontal extension 440 rests. The rods 434 and 434a, respectively, are mounted on the main base 175 by means of bolts 436 and 436a passing through suitable clearance holes in said base and screwed into the ends of the respective rods. Positioned on the portion 433 of the rod 434 is a sleeve 437 against which the extension 430 rests. The upper end 438 or 433 is threaded to accommodate a nut 439, and a washer is positioned between the nut and the upper surface of the extension 430, so that when the nut is tightened a rigid mounting of the panel and its extensions is effected. The extensions of the panel are also mounted on a like extension of the rod 434a in a like manner.

The extension 440 has a depending tab 443 on one side thereof, to which a guide block 441 is secured by means of screws 442.

An end plate 444 has a foot portion 445 secured on the main base 175, and has a right angled top extension 446 carrying a bearing bushing 447 in which the shaft 432, near its lower end, is journaled. The end plate 444 also carries a ball bearing 448 in which one end of a shaft 450 is carried. Secured on the outer end of shaft 450 is a gear 449 with a spacer sleeve 451 between it and the bearing 448.

Spaced apart, on the main plate 175, from the end plate 444, is an end plate 452 of a turret frame 455. This frame includes a second end plate 453 spaced apart from the end plate 452, a top plate 454, and a bottom plate 456. The end plate 452 has a top flange 457 secured to the top plate and a bottom flange 458 secured to the bottom plate. Likewise, the second end plate 453 has top and bottom flanges 459 and 460 secured to said top and bottom plates respectively. The frame 455 is mounted on the main base 175 with spacer strips 461 and 462 therebetween by means of screws 474 passing through the bottom flanges, the bottom plate and said strips.

In axial alignment with the shaft 450, is a shaft 464 which is connected to the shaft 450 by means of a separable coupling 463. The shaft 464 is journaled in a bearing bushing 465 carried in a plate 466, spanning a clearance hole in the end plate and secured thereon by screws 467. The right end of shaft 464, as seen in Figure 30, carries elements which will be presently described.

Journaled on the shaft 450 is a clutch member 468 having clutch teeth on the right face thereof (Figure 30). Fixed on the clutch member 468 is a gear 469 and secured on the hub of this gear is a beveled gear 470. A square block member 471 is secured to the shaft 450 and its left end abuts the clutch member 468. A second clutch member 472 has a square hole therein which forms a working fit on the block member 471, and has an external groove 473 formed therein.

Mounted on the base 175 is a U-shaped bracket 475 having aligned holes therein, in which a shaft 476 is journaled. Keyed on the right end of the shaft 476 (Figure 30) is the hub of a crank arm 477, and a clevis pin in this crank arm pivotally connects it to a bar 478 having a stop pin 481 thereon. Keyed on the other end of the shaft 476 is the hub of a crank 479. Formed integral with the crank 479 is a tail 480. Pivotally connected to the crank 479 (by means of a pivot pin) is a bar 482 having a slot 483 near its upper end. (See Figure 49 also.)

Mounted on the end plate 444 is a bracket 484 carrying a bearing boss 485 in which a shaft 486, carried by a yoke member 487, is journaled. The yoke member has a lateral extension 488 which carries a stud 489 extending through the slot 483. A spring 490, connected to the stud 489 and to a post 491 on the bar 482, urges the stud 489 to the lower end of the slot 483. The yoke has spaced arms 492 and 493 carrying opposed studs engaging the external groove 473.

The shaft 432 has slidably keyed thereto a beveled gear 494 which is adapted to cooperate with the beveled gear 470. The hub of the gear 494 has an enlarged portion 495 with an external groove 496 formed therein. The shaft 432 has secured thereto, by means of screws 497, a vane 498. Keyed to the shaft 432 and having its hub abutting the bearing bushing 500 is a beveled gear 499.

Secured on the panel 425 is a counter 502 which counts the money accepted and delivered into the coin box. The counter 502 has secured on its shaft a beveled gear 501 which meshes with the gear 499. A lever 504 having a stud 503 engaging the groove 496 (Figure 30) has a shaft 505 (Figure 49) journaled in a bushing 506 mounted in the end plate 444. The lever 504 carries a stud 507 in its left end which stud extends through an elongated slot 508 in a bar 510. This bar has a stud 509 thereon near its upper end, and a spring 511 connected to the studs 507 and 509 urges the stud 507 to the upper end of the slot 508. The bar 510 carries also a stud 512, and spaced apart therefrom a stud 515 which is normally in contact with the tail 480 of the crank 479. A stud 513 is carried by the end plate 444, and a spring 514 connected to the stud 513 and the stud 512 constantly urges the bar 510 downwardly and maintains the stud 515 in engagement with the tail 480.

The bar 510 has a notch 516 in the left edge thereof (Figure 49) and when the bar is in its normal position, the two legs 517 and 518 of a bifurcated bracket 520 straddle the bar above the notch 516. The bracket 520 is secured on the main plate 175.

When the bar 478, which extends through a slot 521 in the main plate, is moved downwardly (in a manner to be presently described) the clutch member 472 is brought into engagement with the clutch member 468. At the same time, the crank 479 is moved clockwise as seen in Figure 49, thereby causing the tail 480 to move the stud 515, and the bar 510 upwardly. The spring 514 is urging the bar 510 toward the left, so that as the bar is raised the notch 516 in the bar engages and hooks into the crotch 519 of the bracket 520 and remains so hooked until it is reset. The bar, via the stud 507, moves the lever 504 clockwise about the fulcrum 505, and the lever, via its stud 503, shifts the beveled gear 494 into mesh with the gear 470. During a rest period of the cycle, a bar 522 carrying a stud 523, to be presently described, is moved to the right, thereby the stud 523 moves the bar 510 counter clockwise about stud 507 as a fulcrum and disengages the notch 516 from the crotch 519 and the bar returns to its normal position under the urge of spring 514.

The locking drum end plate 186 has a shouldered stud 524 secured thereto by a nut 525 and this stud has journaled thereon a gear 526 which meshes with the gear 210, on the locking drum, and with the gear 469, so that the movement of the locking drum is imparted to the clutch member 468.

A rack 527 has its teeth in mesh with the gear 469 and in mesh with a flanged gear 528 carried on the shaft of a counter 530 which counts the change given out in quarters and nickels. The rack passes through the guide block 441 and it is held into engagement with the gear 449 by means of a free roller 529 carried on a stud 531 on the end plate 444. A bracket 532, secured on the panel 425 carries a stud 533, upon which a free roller 534 is journaled, and this free roller backs up the rack 527 and keeps it in mesh with the gear 528. A sleeve 535 secured on the rack 527 by means of a set screw 536 limits the downward movement of the rack if the latter is released.

The end plates 444 and 452 have two sets of aligned holes formed therein. A rod 537 having both ends threaded, passes through one of these sets and through a sleeve 538, and said threaded ends are engaged by nuts 539. A second rod 540 having threaded ends passes through the other set of holes and through a sleeve 541 between the end plates, and its threaded ends are also engaged by other nuts 539. When all of the nuts 539 are tightened, the end plates are thereby rigidly secured together.

*Turret*

A vertical shaft 542 is supported at its upper end by a ball bearing set in a cup-like holder 543 carried by the top plate 454, and the lower end of this shaft is carried by a ball bearing set in a cup-like holder 544 carried by the bottom plate 456. The shaft 542 has its lower end of reduced diameter, and a beveled gear 545 is keyed thereto for driving the shaft 542. Meshing with the gear 545 is a beveled gear 546 which is keyed on shaft 547 to presently be described. The shaft 542 carries a sleeve 548 secured thereon and upon which a gear 550 normally rests, and the hub 549 of this gear forms a clutch member having clutch teeth on the upper end thereof. A clutch member 552 on shaft 542 has teeth on the lower end thereof normally engaged with the teeth on 549. The clutch member 552 has a hub 551 with a hole 553 therein, elongated axially. A cross pin 554 in the shaft 542 extends through the elongated hole 553, so that when the shaft 542 is driven counter-clockwise, looking at its lower end, Figure 30 (or as seen in Figure 53), the gear 550 is driven thereby. When the shaft 542 is driven in the opposite direction, the teeth of the clutch member 552 ride up on the teeth on the hub 549 instead of driving the latter, so that the drive of the gear 550 is in one direction only.

The bottom plate 456 (Figure 30) has a cup-like holder 555 for a ball bearing, secured thereon in spaced relation to and to the right of the bearing holder 544, and a second bearing holder 556 spaced to the left from bearing holder 544. The top plate carries similar bearing holders 557 and 558 in axial alignment with the holders 555 and 556 respectively, and the bearings in said holders, respectively, support shafts 559 and 560. The shaft 559 has keyed thereon a spur gear 561, meshing with the gear 550, and the shaft 560 has keyed thereon a spur gear 562 meshing with the gear 550, so that as the gear 550 is driven, as described above, the shafts 559 and 560 are driven at equal speeds and both rotate in the same direction.

The shaft 559 has a portion 563 of its upper end, of reduced diameter, thereby forming a shoulder 564 upon which the hub 565 of a coin turret assembly 570 rests.

*Coin turrets*

The hub 565 of the turret has a slot 566 extending upwardly from the lower end thereof, and as the turret hub is positioned on the shaft portion 563, the slot slides over a lateral pin 567 in said shaft portion, whereby the turret and the shaft 559 move in unison.

Although the turret assembly 570 shown in Figures 8, 30, and 38 to 42 inclusive, are devised for pennies or "cents" the turret 570a is identical thereto in every respect, except that the coin tubes, cavities, etc., through which the coins pass are enlarged to accommodate nickels, so parts of the turret 570a shown herein are given the same numeral as the corresponding part in 570, followed by the letter "*a*."

The hub 565 has a portion 568 of smaller diameter, and a sleeve portion 569 extending upwardly therefrom. Positioned in the interior bore of the hub is a shaft 571, which abuts the upper (rounded) end of the shaft extension 563 when the lower end of the hub rests on the shoulder 564, and is secured in this relation by a cross pin 572. Secured on the shaft 571 in spaced apart relation to the hub 565, by means of a taper pin 573, is a hub 574 carrying a flange member 575. The flange member has five arcuate cutouts 576. The turret base 577 includes an upper disc member 578 which has five holes 579 in axial alignment with the cutouts 576. Each hole 579 has communicating therewith a slot 580, trailing with respect to the movement of the turret when the latter is giving change.

A coin tube 581 passes through each cutout 576 and into the hole 579 in the disc member 578 where it is secured, the length being in accordance with the number of coins which the tube is to contain. Each tube 581 has an extended portion 582 extending upward above the common level of the tubes. Also, each tube 581 has an elongated open slot 583 extending throughout its length, the slot 583 and the upwardly extending portion 582 of each tube being oppositely disposed, as may be seen in Figure 38, to facilitate the loading of the tube with coins. To further facilitate the loading, the upper end of each tube and of each extended portion is flared outwardly.

Formed integral with the hub 565 is a disc 584 upon which is secured a star wheel 585, the curved portions 586 of which have a radius similar in length to the radius of the coins used, and the straight portion of each of which is somewhat parallel to the adjacent slot 580 in the disc 578. It will be understood that the disc 578, the star wheel 585, and the disc 584 are secured together and contact one another. Secured to the lower surface of the plate 578 is a series of five lug members 587, each having an inner edge, a portion 588 of which is curved and portion 589 of which is straight, and is substantially parallel to the slot 580 in the disc 578, thus it will be seen that the lowest coin in a stack normally has almost half of its perimeter embraced by the curved surfaces 586 and 588, and it rests on the disc 584 and a member 590 which is secured to the lower surface of the lug member 587 and which has a concave surface 591 which is concentric with the disc 584, providing therebetween an arcuate passage 592 into which a coin picker 595 may extend. From Figure 42, it will be noted that the thickness of the lug members 587 is a little greater than the thickness of two coins 593, and that the picker 595 extends into the passage, containing the two lower coins a distance slightly less than the thickness of the lowest coin, and consequently cannot engage the second coin 593a, so only the bottom coin is ejected.

Secured on each coin tube 581 near the lower end thereof with its center aligned with the slot 580 is a U-shaped bracket 594 having aligned holes therein, the axes of which are parallel to the surface of the disc 578. A stud 596 extends through the aligned holes and is embraced by the body of a helical spring 597. One end 598 of the spring extends upwardly and contacts the wall of the tube 581, while the other end 599 extends through the slot 580 and just clears any coin 593 being ejected, and is consequently in the path of a coin 593a (on top of coin 593) and prevents such coin from being ejected in addition to the coin 593. I have found as a result of exhaustive tests that this arangement prevents two coins from being ejected from a single coin tube, even though the two (bottom coins) are stuck together, and, further, by this arrangement slightly bent coins which go through commercial scavengers and testers will be ejected as easily as if they were straight.

The above described turret is of such size to accommodate U. S. cents and give them out as change, as will be hereinafter described.

The turret elements carrying the same numerals followed by the letter "a," are made sufficiently larger to store and give out nickels, as will also be described herein.

I use five columns in each turret so that they all feed substantially uniformly, and besides, the maximum coins given by any turret is four, therefore, any single column has no chance to become exhausted before any other column.

Referring now to Figure 32 which is taken along the line 32—32 of Figure 30, a disc 600 has a hub 601 which is keyed on the shaft 560. The disc has a plurality of detents 605 formed therein. There are five detents and each is defined by a radial face 606 and a face 607 forming with the face 606, an angle of less than 90°. A bell crank 604 has an arm 608 with an upturned lug 609 on its extremity. The bell crank has a hub 613 which is journaled on a vertical shaft 602 supported in bearings in the top plate 454 and a depending bracket 603. Spring means 614 about the hub 613 and engaging the bracket 603 urges the bell crank in a clockwise direction as seen in Figure 32 so that the lug 609 is engaged with a detent 605.

The other arm 610 of the bell crank carries a stud 611 upon which a roller 612 is journaled.

A cam member 615 has a circular surface 616, an arm 617 having an upturned lug 618 thereon, a recessed surface 619 therebetween, and a flat surface 620 forming one edge of said arm. The cam has a hub 621 secured on shaft 542.

Referring now also to Figures 31, 33, 34 and 35, the gear 562 carries on its upper surface a series of five wedge cams 623 each of which has, as may be seen in Figure 30, a surface 624 inclined with respect to the surface of the gear 562, and a surface 625 which is 90° with respect to said surface.

Cooperating with the wedge cams 623 is a first lever 626 and a second lever 627. The lever 626 has a lateral tab 628 extending to the right as seen in Figure 31, and a second tab 629 extending to the left. The lever 627 has a lateral tab 630 extending to the right in spaced relation to the tab 628, and a second tab 631 extends to the left in spaced relation to the tab 629. The tabs 628 and 630 cooperate with the wedge cams 623 on the gear 562 and consequently control the movement of the nickels turret 570a. The levers 626 and 627 are journaled on the shaft 622 between bosses 632 and 633, and the tabs 629 and 631 cooperate with the teeth 634 of a ratchet wheel 635. The top plate 454 has a front depending flange 636 and a rear depending flange 637. A spring 638 is connected to the lever 626 and to the depending flange 637 for urging the lever in a counterclockwise direction as seen in Figure 33. Likewise a spring 639 is connected to said flange and to the lever 627 for urging the latter in a counterclockwise direction, with the result that, unless the levers are restrained the respective tabs cooperate with the wedge cams and with the teeth 634 of the escapement ratchet wheel 635.

A crank member 640 is journaled on the shaft 622 between the boss 633 and a boss 648, and on one end it has a lateral tab 641 which overlies the beveled ends of the levers 626 and 627, as shown at 626a in Figure 33, so that as the crank 640 is moved in a clockwise direction as seen in Figures 33 and 35, the levers 626 and 627 are also moved clockwise and the tabs 628 and 630 are disengaged from the wedge cams 623, and at the same time the tabs 629 and 631 are disengaged from the teeth 634 of the ratchet wheel 635.

The other end of the crank member is connected to a push bar 644 by a pivot pin 643. The lower end 645 of the push bar is twisted to a plane 90° with respect to the main plane of the bar, and it is actuated by a stud 647 carried in the shaft 547, a clearance hole 649 being provided in the main plate 175, through which the lower end of the bar extends. A stud 646 carried by the push bar limits its downward movement. The crank member and the associated push bar function to reset the nickel pawl means.

A bracket 650, secured to the top plate 454 extends downwardly therefrom and carries a journaled support 651 for the shaft 622. The other end of the shaft 622 extends through a bearing in the end plate 452 and carries a picker for quarters, which will presently be described.

*Nickel picker*

The nickel picker 652, Figures 31 and 36 includes a lever portion 654, the lower end of which has a vertical slot 655 therein which straddles the shaft 464. An upper lever portion 653 has an offset engaging end 661, the extremity of which has a curved portion 662, a hook portion 664, and a clearance portion 663. A stud 642 is adjacent to the clearance portion, and the straight portion of 653 rides up and down in a slot formed in the top plate 454. The portion 653 is adjustably carried on the portion 654 by means of bolts 659 passing through corresponding holes formed in both.

The lever portion 654 carries a stud 658 upon which a free roller 660 is journaled. A cam 656, having index points 657, is keyed on the shaft 464 adjacent to the nickel picker with the roller 660 thereon engaged by the periphery of the cam. Each time a high portion of the cam encounters the roller 660, the picker 652 is raised so that its hook 664 is directly in the path of the lower nickels in the coin tubes as the turret 570a is rotated.

Referring now to Figures 31 and 37, the shaft 464 carries a cam 665, the hub 672 of which is keyed to the shaft. The cam has an active (curved) surface 666, one terminus of which is bounded by a lug 667, which cooperates with a stud 668 carried by the end plate 452. A lever 670 has a hub 673 which is keyed on the shaft 622. The lever carries a stud 669 upon which a free roller 671 is carried, and it cooperates with the cam 665 in the delivery of change in quarters.

Referring now to Figures 31 and 34, a quarter change power lever 675 has a hub 674 which is keyed on the shaft 622. The upper end of lever 675 is pivotally connected to one end of a horizontal bar 677 by means of a shouldered screw 676. The other end 678 of this bar extends through a slot in the depending flange 636 of the top plate 454. The bar 677 carries a stud 679 which is actuated by the lug 618 on cam 615.

Quarter coin tube and picker therefor

A single coin tube 680 is provided to contain quarters to be given in change. The coin tube is mounted in a ring like member 683 which is secured on a bracket member 682. The tube and the ringlike member have a vertical slot 681 therein to facilitate the placing of stacks of quarters in the tube. Spanning the bottom end of the coin tube is a barrier 684 which is spaced apart from the lower edge of member 683 to provide a passage 685 which is slightly wider (from top to bottom) than the thickness of the coin. The barrier 684 has a clearance slot therein for the upper end of a coin picker 690. A bearing bushing 688 on the end plate 452 supports the left end of the shaft 622 (Figures 30 and 75) and secured on the shaft 622 beyond the bushing is the hub 689 of the picker 690. The picker includes a bar or lever 691, the lower end of which carries the hub 689, and the upper end 692 of which is 90° with respect to the vertical axis of said bar. A rectangular hole (not shown) is formed in the end 692, and extending through and forming a working fit in this hole is a second bar 693, the lower end of which carries a stud 702 thereon, and an elongated slot 820 in which the stud 702 rides is formed in the bar or lever 691. The upper end of the bar 693 has a rounded portion 699 and a hook portion 700 and a clearance portion 701. A spring post 821 is carried on the bar or lever 691, and a spring 822, connected to the stud 702 and to the post 821 urges the bar 693 upwardly and maintains the cross pin 687 in contact with the barrier 684, causing the hook 700 to travel on a horizontal line. A spring post 695 is mounted on the end plate 452 and a second spring post 694 is mounted on bar 691. A spring 696 is connected to these posts and urges the picker toward a stop boss 697 on the end plate 452, and in contact with shock absorbing material 698 mounted on the latter. A deflector plate 686 on the bracket 682, deflects the quarters as they are pushed out of the coin tubes by the picker to make sure they enter a change delivery channel (not shown). The normal position of this picker is forward.

Coin picker for cents turret

Referring to the right end of Figure 30 and to Figure 43, the cents picker 705 is reciprocally carried in aligned slots in the top and bottom plates 454 and 456 respectively, and is positioned adjacent to the end plate 453. A clearance slot 703 is formed in the main plate 175 to clear the lower end of the picker.

The picker has a stud 707 thereon, and spaced apart from this stud is a second stud 708, both of which are visible through a large hole 709 in the end plate 453 (Figure 43). The end plate carries a boss 710 in which a shaft 711 carried by a bell-crank 712 is journaled. The bell-crank has one arm 713 which carries a stud 714 upon which a free roller 715 is mounted. Cooperating with this roller is a cam 400 carried on the cents sensing device 410.

The bell-crank has a second arm 716, an offset portion 704 extending through the hole 709 to terminate in a tab 717 adjacent to the picker 705, and the tab 717 carries a stud 718. A spring 719, connected to the studs 708 and 718, urges the picker 705 upwardly and maintains the tab 717 and the stud 707 in engagement, so that the contour of the cam 400 causes the picker 705 to move upwardly and downwardly. When it moves upwardly, the hook 720 on the upper end 595 of the picker 705 is in the path of the bottom one cent pieces in the several coin tubes 581 and as the turret 570 rotates they are peeled off and ejected, the number of one cent coins to be delivered being determined by the cent sensing device 410, of which the cam 400 is a part. As the cam effects the lowering of the picker the hook portion 720 is brought out of the range of the coins.

Driving mechanism

Referring now to Figures 49 to 54 inclusive, the frame of the driving mechanism includes a horizontal top plate 721. A depending plate 722 is secured to the top plate, near the right end as seen in Figure 54, by means of an angled bracket 723. Spaced apart from the plate 722 is a depending plate 724 secured to the top plate by an angled bracket 725. A third depending plate 726 is secured to an end plate 727, positioned between it and the plate 724, and disposed 90° with respect to plates 724 and 726, by means of a bracket 728. The plate 727 is secured to the top plate by means of a bracket 729, and to plate 724 by a bracket 730.

A horizontal plate 731 is connected to plates 722 and 724 by means of brackets 732 and 733 respectively. The plate 731 has secured to its lower face, the mounting plate 734 of an electric motor 735. The shaft 736 of this motor extends through a hole in the plate 731 and carries a pinion 737 which meshes with a gear 738, carried on a stud shaft 739. This shaft has an extension 741 of smaller diameter. A ball bearing (not shown) is set into the gear 738 and its inner race engages the extension. A movable clutch member 743, having clutch teeth 742 and an annular groove 744 is keyed on and movable on the hub 745 of a worm 746 journaled on the extension 741. A shifter yoke 747 includes a straight arm 753 and an offset arm 754 joined together by a boss 755 which is journaled on a shaft 748 carried in aligned holes in a yoke member 749 secured on the plate 731. The arms 753 and 754 carry pins, such as the pin 756, engaging the groove 744. A spring post 750 is mounted on the arm 754, and a second spring post 750a is mounted on the yoke 749, and these posts are joined by a spring 752.

A shaft 757 has keyed thereto the hub 759 of a worm gear 758 carrying a cross pin 751, and a bearing holder 760 carried on the plate 724 has a ball bearing therein adjacent to said hub. An extension 762 of the shaft 757, of smaller diameter extends through the bearing and has secured thereto (Figure 50) the hub 763 of a crank disc 764.

The crank disc 764 carries a bearing bushing 767 in which a stud shaft 768, carried by a connecting rod 769, is journaled. A washer 770 is positioned on the stud shaft between the connecting rod and the crank disc. A second washer 771, on the stud shaft, contacts both the face of the bushing 767 and a snap ring 772 engaging a groove in the stud shaft.

The shaft 547 and a shaft 775, in axial alignment are coupled together and so secured by a sleeve 773. The shaft 775 has a portion 776 of its length of reduced diameter beginning at the right edge of the ball bearing holder 774, therefore the shoulder between the two sizes abuts the ball bearing therein. Between the ball bearing and the hub 778 of a gear 779, is a spacer sleeve 777. The shaft portion 776 extends through a clearance hole in the control panel plate 726. Mounted on the protruding end of 776 is a crank arm 782 having a hub 781 with a slot 783 formed therein. The shaft 776 carries a cross-pin 784 which extends into this slot.

As seen in Figure 50, the end plate 727 joins one end of the plate 724 and joins the control panel 726, and a plate 766 joins the other end of plate 724 and joins the control panel 726. These end plates form supports for bearings and other elements to be presently described.

Secured on end plates 766 and 727 are aligned ball bearings in holders 786 and 787 respectively carrying a shaft 788, a portion 788a of which is smaller in diameter with a shoulder 804 therebetween. (Figures 49 and 50.) Journaled on the shaft 788 are beveled pinions 789 and 790 having bushings 791 and 793 respectively. The bushing 791 has aligned slots 792 therein, and in the bushing 793 are aligned slots 794. Between these slots is a clutch member which will be presently described.

The beveled pinions face each other and mesh with a beveled gear 785 which has a hub 807. The beveled gear 785 is journaled on a shaft 808 which is carried in bearings 809 and 810. The large gear 780 has a hub 811 and is keyed on the shaft 808, below the shaft 775, as seen in Figure 50. A helical spring 815 has its inner end set into a radial slot (not shown) in the hub 807 of the beveled gear 785 and its outer end has a looped portion 816 which embraces the shank of a stud 817 mounted on the gear 780, thereby resiliently connecting the latter with the beveled gear 785. The clutch member 795, which may be best seen in Figure 49, forms a working fit on the shaft 788 and has tongues 818 on one end to cooperate with the aligned slots 792 in the bushing 791, and the other end has tongues 819 to cooperate with the aligned slots 794 in the bushing 793. The clutch member 795 has also aligned elongated slots 796 extending axially therein, and a cross-pin 803 in the shaft 788 extends into the slots and permits limited axial movement of the clutch member from a position where its tongues 819 engage the slots 794, to a position where the tongues 819 are disengaged from slots 794, and the tongues 818 engage the slots 792 in the bushing 791 of the pinion 789. As will be explained hereinafter, the last mentioned position places the shaft 788 in driven relation with the pinion 789, and this occurs when any one of the keystems 300 in the group numbers 31 to 60 is depressed. The relation is just as shown in Figure 49 if any of the key stems numbers 1 to 30 is depressed.

The clutch member 795 also has an annular groove 797 thereon formed between two spaced flanges thereon. A stud 798 carried by a lever 800 engages the groove 797, and this lever is fulcrumed on a stud 799 carried by a boss 801 on the panel 726. The lever is offset rearwardly at 802 as seen in Figure 49. A sprocket 805 is keyed on the shaft portion 788a and abuts the shoulder 804.

The gear 780, Figure 50, carries a stud shaft 761, and the connecting rod 769 carries a bushing 812, the interior bore of which is journaled on stud shaft 761. On this shaft, adjacent to the bushing, is a washer 814 which in turn is in contact with a snap ring 813 engaging a groove formed in the shaft 761.

The motor clutch shaft 825, Figures 50, 51 and 76 is positioned in aligned holes in the panel 726, and in the plate 724, and one end extends into a bearing bushing 829 carried on the rear plate 722. The other end extends through the front panel and has secured thereon a crank arm 824, having a hub 823. The crank arm 824 carries a spring post 826, and a spring 828 is connected to the post 826 and to a spring post 827 carried by the panel 726. A collar 830 secured to the shaft 825 abuts the bushing 829 and limits the depth of the shaft into the bushing.

Secured on the shaft is a crank arm 831, having a hub 832 and carrying a stud 834 upon which a bell crank 835 is journaled. One arm 836 of the bell crank carries a spring post 837 which is connected to a spring post 833, on crank arm 831, by means of a spring 838. The other arm 839 of the bell crank has an angular tab 840 thereon which effects the engagement of the clutch, as will hereinafter be explained.

The arm 753 of the shifter yoke 747 carries a lateral ear 841 having a slot 843 therein to accommodate a clutch lock bar 842. The lock bar has an elongated hole 844 therein and spaced apart from this hole is a spring post 845. Near its lower end, the lock bar has a slot 846 formed therein adapted to engage the tab 841 at the end of the slot 843 as will hereinafter be described. The lock bar also has a clearance notch 847 formed therein.

The lock bar 842 is supported on a stud 848 carried by a cradle 850, said stud extending through the elongated hole 844 in the lock bar and having one end of a spring 849 connected thereto, the other end of the spring being connected to spring post 845.

Referring also to Figure 77, a bracket 851 has a foot 852 secured to the top plate 721 in any suitable manner. This bracket has secured thereto a horizontal stud 853, upon which a bearing bushing 854, carried by the cradle 850 is journaled, thus the cradle is supported by the bracket 851. The cradle carries a shouldered stud 855 upon which a roller 856 is journaled.

A shaft 857 is journaled in a hole in the panel 726 and in a bearing bushing 858 carried in the plate 724. This shaft has a sleeve member 860 secured on the end thereof which projects through the panel 726, and the sleeve member has a slot 861 therein. The sleeve member has an arm 862 integral therewith which carries a stud shaft 863, upon which a pawl 875 is journaled. A spring post 864 carried by the pawl is connected, via a spring 866, to a spring post 865 carried by the arm on the sleeve member. Secured on the shaft 857 is a dog 867 having a hub 868. The dog carries a stud 870, to which the connecting bar 478 is connected. The dog also carries a roller 869 which is engaged by the perimeter of the crank disc 764, during the first 20° of each machine cycle. The other end of the shaft 857 is slotted and carries a tab 871 with which the cross-pin 751 in the worm gear 758 cooperates.

The shaft 857 (Figure 78) also carries hub 859 to which an extended arm 872 is secured. The hub 859 also carries an arm 873 having a tab 874 thereon which cooperates with a motor bar, to be presently described.

The mercury switch shaft 876 is journaled in a bearing bushing 880, Figures 49, 50 and 78 and has secured on its outer end a dog 877 having an outwardly extending tab 878 which cooperates with the pawl 875 as will hereinafter be explained. An arm on this dog, carrying the tab engages a stud 879 on the panel 726. Secured to the shaft 876 behind the panel is the hub 881a of a crank arm 881. The crank arm 881 carries a clevis pin 882 pivotally connecting it to a connecting rod 883 which is in turn connected to a clevis pin 886 carried by a crank arm 885 having a hub 884 keyed to the shaft 825, so that as the shaft 825 is moved, the switch shaft is moved, through the linkages described. A mercury switch 887 is mounted in a suitable holder carried on the inner end of the shaft 876.

A shaft 888 is journaled in the panel 726 and in the plate 724, and it carries, on its outer end, a cross-pin 889 to be engaged by corresponding slots in a hand crank (not shown) for the purpose of manually rotating the mechanism, when desired, in servicing the machine. The shaft 888 carries on its inner end a beveled gear 895 adapted to be meshed with a beveled gear 896 which is movable with the worm 746 (Figure 54). The beveled gear 895 is normally held out of engagement with the beveled gear 896 as follows: a collar 890 is keyed to the shaft 888, and between the collar 890 and the plate 724 are, a washer 891 abutting the collar, a spring 892 in contact with the washer 891, a second washer 894 in contact with the other end of the spring, and a sleeve 893 having one end in contact with the washer 894 and the other end against the plate 724. Thus the shaft 888 is urged to the left, as seen in Figure 50, and the hub of the beveled gear is thereby held in contact with the right face of the plate. Now when a crank is placed on the left end of the shaft 888 and the shaft is pushed endwise to the right and against the urge of the spring 892, the beveled gear 895 is brought into mesh with the beveled gear 896 and the mechanism can be rotated by rotating the crank.

A motor bar 900 is slidably carried in spaced slotted blocks 898 and 899 secured on the control panel by means of screws 897. The motor bar has a notch 901 formed therein. Spaced to the right of this notch, as seen in Figure 49 is a stud 902, and spaced from this stud is a spring post 935. To the left of the block 898 is a post 903 projecting forwardly and a second post 904 projecting rearwardly, and on the left end the bar has a notch 939 therein. Secured on the rear face of the motor bar by screws 907 (Figure 78) is a strip 905 having a right angled tab 906 formed integral therewith, adapted to cooperate with the tab 874.

An elongated horizontal slot 908 is formed in the panel 726. An arm 910, having an outwardly (as seen in Figure 50) extending tab 911, also has a rearwardly extending shaft 909 which forms a working fit in the slot, and carried on this shaft against the rear face of the panel (Figure 78) is a sleeve 912 which is retained on the shaft by means of a cotter pin 913. A spring 914 is secured to the eye of the cotter pin and to a spring post 915 mounted on the panel. This arrangement urges the tab end of the arm upwardly and thereby insures the engagement of the tab with the notch 901 in the motor bar.

A bell crank 936, which will presently be described, has one arm carrying a spring post 937, which is connected by a spring 938 to the spring post 935 on the motor bar 900.

The motor bar locking member 916, which may best be seen in Figure 78, has a bearing bushing 917 which is journaled on a stud shaft 918 carried on the panel 726. The locking member has a downwardly extending arm 919, carrying a stud 920 which forms a working fit in an elongated slot 922 formed in the bar 522, described above in connection with the engagement of pinions 470 and 494. A washer 921 is positioned on the stud 920 and a spring 923 connects to stud 920 and to a spring post 924 on the bar 522, and functions to hold the stud 920 in contact with the right end of the slot 922. The main panel has a hole 925 through which the stud 523 extends to engage the bar 510.

The bar 522 extends through a slot in a guide member 927 which is secured to the panel by means of screws 926. On the right end of the bar 522 is carried a spring post 928, and a spring 929 connected to this post and to a bracket supporting the main panel urges the bar to the right as seen in Figure 78, which is to the left as seen in Figure 49.

The locking member 916 has a lateral arm 930 having a right angled tab 931 thereon which cooperates with the notch 939 in the motor bar 900 for locking the latter.

A locking member also has an arcuate arm 932 which has a right angled tab 933 on the end thereof, which cooperates with the stud 950 on the locking drum assembly to be presently described. The arm 932 has rounded depression 934 formed therein.

The arm 872, Figure 78, carries a spring post 940, to one end of which a spring 941 is connected. The other end of this spring is connected to a spring post 942 on the panel 726.

The crank arm 782 is connected by means of a stud shaft 943 to one end of a bar 944. A bell crank 946 has a bushing 948 therein journaled on a stud shaft 947 carried by the panel 726, and has one arm 949 pivotally connected to the other end of the bar 944 by a pivot pin 945. The other arm 951 of this bell crank is connected to the bar 370 (which controls the counter bail 323) by means of a pivot pin 952.

A stud shaft 953, mounted on the panel, has a bushing 954 journaled thereon. The bushing is carried by a rocking dog 955 which has one arm carrying a stud 956 and a second arm carrying a stud 957. A bar 960 carries a stud 961 pivotally connecting it to the clutch shifting lever 800. The other end of the bar (Figure 49) is pivotally connected to the rocking dog 955, at a point substantially above the fulcrum of the latter, by means of a pivot stud 959. The rocking dog has a rearwardly extending spring post 958, which projects through an oval hole 962 in the panel. A fixed spring post 963 is mounted on the rear of the panel (Figure 78) and a spring 964, connected to posts 958 and 963, functions to retain the rocking dog in whichever position it is shifted to.

The bar 386, which is associated with the bail cooperating with the selector keys Nos. 31 to 60, extends downwardly and has formed integral therewith, and extending to the right, a foot portion 386a, the lower surface of which is inclined and which is adapted, when the bar is moved downwardly, to engage the stud 956 and rock the dog 955 in a clockwise direction in its fulcrum 953. This would result pulling in the bar 960 to the right (Figure 49), the swinging of the shifting lever 800 in a clockwise direction about its axis, and the shifting of the clutching sleeve 795 to the left into engagement with the beveled pinion 789 to cause the sprocket 805 to rotate in one direction, as will be explained in connection with the printing mechanism.

The bar 390, which is associated with the selector keys Nos. 1 to 60, also extends downwardly and has formed integral therewith and extending to the left, a foot portion 390a, the lower surface of which is inclined and adapted, when the bar 390 is moved downwardly, to engage the stud 957 and swing the dog rocker to the position shown in Figure 49, thereby causing the shaft 788 and the sprocket 805 to rotate thereon in the opposite direction. It will be understood that the rocking dog only has a possible two position, so when a key of the group 1 to 30 is depressed, the rocking dog 955 is shifted to the position shown in Figure 49, and the machine completes a cycle. At the end of such cycle the rocking dog remains in the position it was in during the cycle. Now, if in the next operation of the machine a key in the group 1 to 30 is depressed, the rocking dog is already in the position intended and will continue to remain in this position as long as keys in the group 1 to 30 are successively depressed. As soon as any key in the group 31 to 60 is depressed, the bar 386 effects the shifting of the rocking dog to its other position, etc.

Referring again to the bell crank 936, the spring post 937 thereon is carried on an upwardly extending arm 965 thereof, and the bell crank has a lateral arm 966. Parallel to and spaced apart from the arm 966 is a plate member 967. The bell crank and the plate member are rigidly joined together by a bushing 968. The bushing is journaled on a stud shaft 969 secured on the panel, so that the bell crank and the plate move in unison thereon and they have aligned holes therein to fit a clevis pin 970. The bars 386 and 390 have identical elongated slots 989 therein, and the clevis pin 970 extends through these slots, so that as either one of the bars moves down, the bell crank assembly 936 is moved in a counterclockwise direction on its axis 969. The bar 386 carries a spring post 971, and a spring 972 is connected to this post and to a flange portion 974 of a cover plate 975. The bar 390 carries a spring post 973, and a spring 976 is connected to this post and to the flange portion 974. These springs are sufficiently strong to balance the weight of the bars 386 and 390 respectively.

A link member 980 has a hole in its lower end forming a working fit on the clevis pin 970, so that as either one of the bars 386 or 390 moves downwardly, the link moves therewith without any lost motion.

The upper end of the link 980 has a hole therein engaging a pivot pin 977 carried by a lever 978. This lever has a bushing 979 journaled on a stud shaft 981 carried on the end plate 269 of the selector key bank; the lever on its left end carries a round boss 982 which normally engages the sprocket 283 between teeth, locking it against movement. A guide plate 983 for the lever 978 is secured on the end plate 269 by means of screws 984.

The bar 376, connected to the motor bail crank arm 375, has secured on its lower end, as seen in Figure 49, a selector key lock link 985, which has a depending locking arm 986, a lateral engageable face 988, and a camming ear 987. When a selector key is depressed, the arm 986 rests on the slot surface 861. As the motor bar 900 moves the left, as seen in Figure 49, the tab 911 engages the face 988 and moves the key lock link 985 to the left, so that the arm 986 is pushed off the slot surface 861 and down into the hollow of the tube 960. As it moves down, the tab 911 is thereby moved downwardly with it, and out of engagement with the notch 901 in the motor bar and between the face 988 and the left edge of the dog 877. Due to the fact that the tab is free of the notch 901, its spring 914 snaps it back to a point where stud 909 reaches the right end of the slot 908 in the panel 726. This movement causes the dog 877 to move rotatively in a clockwise direction until it is arrested by the stud 879. The shaft 876 on which the dog 877 is secured: (1) tilts the mercury switch to the "on" position, and (2) causes the clutch 740, 743 of the motor to engage in time with the starting up of the motor 735. The machine then functions to issue the ticket corresponding to the selector key depressed and to deliver with said ticket the difference, in change, between the value of the money inserted and the price of the ticket. Of course, if the exact amount of money is inserted, there will be no change delivered.

Near the end of the cycle, the stud 761 in the worm gear 758 engages the tab 871 in the end of the reset shaft 857, moving the latter rotatively. This results in the restoration of the motor bar ⅛" beyond its "at rest" position, thereby stretching the strong spring 938, because the bail 323 is held down by the lateral tab 307 on the depressed key stem, and the lateral tab on the latter is still locked by the bail 371 (see Figure 19). The sleeve 860 is thereby rotated below the end of the locking arm 986, and the latter moves over to be pushed up by the surface of 861. The pawl 875 drops into engagement with the tab 878 for restoring the dog 877 to its normal position. At the same time, the tab 931 on the motor bar locking member 916 engages the notch 939 in the motor bar 900 and locks the latter, so that the spring 938 pulls hard to release the depressed key, and so that the machine cannot be again operated until the locking drum is restored to its normal position after the depressed key is released and the tab 911 has re-entered the notch 901 in the motor bar.

Now, as the stud 861 on the worm gear 758 passes off of the tab 871 and releases it, the strong spring 941 rocks the shaft 857 back counterclockwise to its at rest position. During this motion, the key lock 986 was lifted by 861, releasing the depressed key stem tab 303 from the bail and allowing the depressed key to return to its normal position.

If the vendee holds the key in the depressed position, the tension of spring 938 holds constant until the key is released. When the key is released, the spring 195 in the locking drum assembly 182 restores the latter to zero. As the latter almost reaches the zero point on its return, the stud 950 carried thereon engages the tab 933, swings the motor bar locking member to a position where the tab 931 is disengaged from the notch 939 on the motor bar, releasing the latter so that spring 938 pulls the motor bar forward about ⅛" until pin 902 on the motor bar engages the bell crank arm 965.

The stud 950 described above is best seen in Figures 46, 47 and 48. The end plate carries a stud 993, upon which is journaled a tubular boss 992, which carries an arm 990. A cotter pin 994 extends through the tubular boss beyond the inner end of the stud 993, so that the arm with its tubular boss moves freely on the stud 993. A radial pin 996 is carried in the tubular boss and is normally in contact with a stop pin 995 carried by the end plate. The arm 990 has an angular extension 991. A spring post 997 is carried by the end plate, and a spring 998 has one end connected to this spring post and the other end connected to the "eye" of the cotter pin 994. In Figure 46, the arm 990 is shown in its normal position, and the stud 950 is in its normal position (on the vertical center line of the locking drum shaft). Now, when a vendee deposits coins in the machine, the coin counters integrate the total value of the coins and permit the weight 260 to rotate the locking drum in a counter-clockwise direction. This means that the stud 950, which is mounted on the gear 210 on the end of the locking drum shaft will reach a position (that shown in Figure 47) where the maximum amount acceptable by the machine has been deposited in the machine. It will be noted that when the arm is in that position, the angular end has been swung down into the hole 999 in the main plate 175. If the vendee deposits more money than that, the arm 990 assumes the position shown in Figure 48 with the angular end 991 of the arm 990 having been stopped by the edge of the hole 999 in the main plate 175, and the stud 950 is against the pin 996. When this occurs, the machine cannot be operated, but the vendee can get the money back by pushing the coin return button. The coin return will be presently described.

*Printing mechanism*

The printing mechanism not only includes mechanism driven by the shaft 547 (Figure 53) but also mechanism driven by a shaft 1000 which is coupled to the shaft 757, the junction of the two shafts being enclosed in the sleeve like hub 1002 of a beveled gear 1001. Meshing with the latter is a beveled gear 1003 which is mounted on a mutilated gear 1004. The mutilated gear has teeth 1005 thereon which are sufficient in number to rotate a mutilated pinion 1014 one-half revolution (180°), thereby functioning like a "Geneva" movement.

Secured to the pinion 1014, and offset upwardly, is a crank 1007. The pinion and crank are journaled on a shouldered screw 1006. A shouldered wrist pin screw 1008 is screwed into the arm of the crank 1007, and journaled on it is one end of a connecting rod 1009, which has its other end journaled on a shouldered screw 1010. The screw 1010 engages one end of a lever 1011, which is fulcrumed on a shouldered screw 1012 which, in turn, engages a base block 1013. The other end of the lever 1011 is operatively connected to a device which effects printing operations per se, which will be described.

Referring to Figure 54, the chain 295 engages the sprocket 283 on the selector key bank, the sprocket 805, a sprocket 806, and a sprocket 706 on a device for tightening the chain.

The sprocket 706 is journaled on a shaft 1015 which is supported in horizontal alignment with the shaft 284, supporting the sprocket 283, by means of a bifurcated yoke 1016. This yoke has aligned holes therein supporting the shaft 1015, and has a shank 1017 polygonal in form and reciprocally carried in a hole of the same form in a boss 1018 on a standard 1019. The standard 1019 has a foot portion 1020 which is secured on the main base plate 175. Secured to the ends of the shaft 1015 and to the upper end of the standard 1019 are springs 1021 (one of which is seen in Figure 54) which constantly and firmly urge the sprocket 706 to the right, thereby maintaining the chain 295 taut.

The sprocket 806 is secured on a shaft 1022 which carries the printing wheel 1025. This shaft is supported in a ball bearing 1023 mounted in a bearing holder 1024 secured to a sub-frame member 1026, Figures 53, 54 and 55. A second sub-frame member 1027 carries a ball bearing and holder 1028 which supports the other end of the shaft 1015. The sub-frame members 1026 and 1027 are secured in fixed spaced relation by means of bolts 1029 and spacer sleeves 1030 as shown, and the sub-frame members are provided with feet 1031 and 1032, respectively which are secured to the main plate 175 by means of screws or by any suitable means.

The printing wheel 1025 includes a rim 1033 having a plurality of slots 1034 which extend inwardly from the outer perimeter of said rim. These slots are equidistant angularly, from each other. Removably secured in each slot 1034 is a "type slug" 1035 comprising an element which will print upon the ticket, in a manner to be presently described, the name or designation to be printed on said ticket. The printing wheel shown carries sixty type slugs 1035 each corresponding to a different key in the selector bank 268.

The printing wheel has a hub 1036 which is detachably secured on the shaft 1022, and a web 1037 is formed integral with the hub and the rim and has a plurality of holes or openings 1038 symmetrically arranged and extending therethrough.

As seen in Figure 80 each type slug 1035 has a hole 1040 extending therethrough to accommodate a disc member 1041. The slug also has a cross-hole 1039 communicating with the hole 1040 and forming a clearance hole for a screw 1042 which threadedly engages a tapped cross-hole in the disc 1041. Each slot has a corresponding clearance hole therein at the bottom thereof extending through the inner periphery thereof, so that in mounting a slug in the printing wheel, a disc 1041 is positioned in the hole 1040 in a slug with the threaded hole therein coinciding with the hole 1039. Then the slug is positioned in the slot (1034) with its ends flush with the sides of the rim 1033, and then the screw 1042 is positioned in the through hole in the bottom of the slot in which the slug is positioned and engaged with the threaded hole in the disc, and then the screw is tightened, forcing the slug firmly against the bottom of the slot.

The web 1037 has a plurality of bosses 1043 formed therein and extending slightly beyond the plane of the right face of the wheel 1025, as seen in Figure 55. These bosses are counter faced to centralize a ring 1044 thereon, and the ring is secured to these bosses by means of flat head screws 1045 passing through countersunk holes in the ring and engaging threaded holes in each boss. The outer periphery of the ring has a plurality of teeth or detents 1046 formed therein, one detent for each slot 1034 in the printing wheel.

A lever 1047, fulcrumed on a shouldered stud 1048 mounted on the sub-frame member 1026, carries a stud 1049 upon which a free roller 1050 is journaled. The other end of the lever 1047 carries a stud 1051 to which one end of a spring 1052 is connected. The other end of the spring is connected to a stud 1056 secured on a vertical bar 1053 which is reciprocally carried on the sub-frame member 1026 by a plurality of studs 1054 mounted on the frame member and extending through elongated slots 1055 and carrying washers which are larger in diameter than the widths of said slots. The bar 1053 also carries a stud 1057, and spaced apart from it is a stud 1058 which extends through an elongated slot 1059 in the bar. A spring 1060, lighter than the spring 1052, is connected to the studs 1057 and 1058 and urges the bar 1053 upwardly. The bar also has an elongated slot 1061 through which the stud 1051 on the lever 1047 extends.

The bar 1053 has mounted on its upper end spaced lugs 1062 and 1063 with aligned holes therein to accommodate a shaft 1064 upon which a roller 1065 is journaled. The right end of the shaft 1000 is carried in a ball bearing in the holder 1067 carried on a standard 1066, secured to the main plate 175.

Secured on this shaft, near the right end thereof, is the hub 1068 of a cam 1069. The high portion of the periphery of the cam cooperates with the roller 1065 to lock the roller 1050 in engagement with the detent 1046 after the printing wheel is set to print a ticket. When the cam 1089 is in other positions, the roller 1050 freely rides over the detents under the urge of the spring 1052 and the printing wheel may be moved freely in either direction to position the type slug in position to print the name of the station corresponding to a depressed selector key as will be explained hereinafter.

Shear actuator

A shear actuating lever 1070 is pivotally carried on a shouldered screw 1071 which is screwed into a bracket 1074, which is secured to the lower surface of the main plate 175 by means of screws or in any other suitable manner. The lever 1070 has a notch 1072 formed in the right end thereof, as seen in Figure 54, and has a notch 1073 formed in the left end thereof. A bracket 1075 is also secured on the under surface of the main plate 175 and carries a shouldered screw 1076a (Figure 74) forming a fulcrum for a lever 1076, which carries a stud upon which a roller 1077, engaging the surface of the notch 1073, is mounted. The lever 1076 carries on its other end a suitable stud 1079 upon which a roller 1078, cooperating with a cam 1080 is mounted. The cam 1080 has a hub 1081 which is movably fixed on the shaft 1000.

Ticket stock feeder

A mutilated gear 1082 has a hub 1083 which is fixed on the shaft 1000, and meshing with this gear is a mutilated pinion 1084 which intermittently makes one revolution when engaged by the teeth of the mutilated gear 1082. The pinion has a hub 1085 which is fixed on a shaft 1088, and the shaft 1088 is supported in bearings 1086, carried on a standard 1087, and 1090 carried on a sub-frame member 1091. The standard 1087 is mounted on the frame member 1027, Figures 53, 63 and 64. A cam 1096 has a hub 1097 which is fixed on the shaft 1088. The shaft 1088 also has fixed thereon a gear 1094 having a hub 1095, and pressed on the end of the shaft is a knurled wheel 1100.

The sub-frame member 1091 carries a bearing bushing 1092, in which a shaft 1093 is journaled, and fixed on this shaft is the hub 1103 of a detent disc 1102. Meshing with the gear 1094 is a gear 1098 having a hub 1099 secured to a shaft 1137, to be presently described, and fixed on the shaft 1137 is a knurled wheel 1101.

Figure 90:
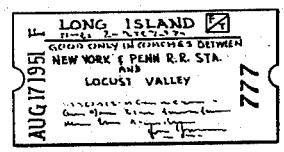

A cup like member 1110, over which the ticket stock 1135 is fed, has an end wall 1109 and an annular rim 1106 formed integral with each other. The length of the perimeter of the rim 1106 is exactly equal to the lengths of five ticket blanks. The stock has a hole therein which is cut in two when the ticket, Figure 90, is cut off from the stock so the ticket is rectangular in form with centrally located concavities in the form of semi-circles on each end. The cup-like member has five holes through the rim 1106 located centrally therein and equidistant from each other. Mounted in each hole is the shank of a bullet shaped tooth 1107, and the tooth is positively secured by means of a nut 1108 engaging threads on said shank. The strip of ticket stock 1135 passes over the rim 1106 with the teeth 1107 engaging the holes in the stock 1135.

The cup-like member 1110 is mounted on a boss member 1105 secured on the shaft 1093 and having a locating boss 1104 secured thereon by screws 1113. The wall 1109 of member 1110 has a central hole therein which forms a working fit on the locating boss, and has arcuate slots 1111 and 1112 through which screws 1114, with washers 1115 thereon, extend to engage threaded holes in the boss member 1105. By this arrangement, the cup-like member 1110 may be set so that it feeds the ticket stock to a knife which cuts off from the stock the printed ticket. The setting to be maintained should deliver the stock of the knife so that the latter cuts the ticket off, leaving exactly half of the hole in the stock remaining on the severed end of the web of stock 1135.

A bracket 1116 secured to the frame member 1091 in any suitable manner carries a stud 1117. A generally curved member 1118 of channeled cross-section has aligned holes in one end which are journaled on the stud 117. The inner surfaces of the member 1118 clear the surface of the member 1110 sufficiently to permit the ticket stock 1135 to very freely pass therebetween, in fact the main function of the member 1118 is to maintain the stock with the holes therein engaging the portions of the teeth of maximum diameter, thereby insuring proper registration with the knife.

The member 1118 carries a spring post 1119, to which one end of a spring 1120 is attached. A spring post 1121 mounted on the frame member 1091 has the other end of the spring secured to it, so that the spring 1120 urges the member 1118 away from the surface of the member 1110 for convenience in rethreading ticket stock into the device.

The member 1118 has a bifurcated rolled bracket 1122 secured adjacent to its lower end, as seen in Figure 55, and this bracket carries a pivot pin 1123 therethrough to which one shank end 1123, of an expansible link, is pivotally connected. The expansible link is comprised of the shank end 1124 and a second shank end 1133 having a spring 1132 positively secured to and forming an expandable connection with each.

A bracket 1125, secured to the frame member 1091 by means of screws 1126, has an angle portion 1129. This bracket carries a stud 1127 upon which a toggle member 1128 is pivoted, and this toggle member has a depending thumb tab 1130 thereon, and it also carries a stud 1131 to which the shank end 1133 is pivotally connected. The toggle member also has a tab 1134 which is adapted to engage an ear formed on the bracket part 1129. Now when the parts are in the relation shown in Figure 55, the ticket stock is maintained on the member 1110 with the teeth 1107 engaging the holes in the ticket stock. Whenever it is desired to move the member 1118 away from the surface of member 1110, the toggle member is swung about the stud 1127 in a counter-clockwise direction, thereby causing the spring 1120 to move the lower end of the member 1118 upwardly to a point where the clearance notch 1138 approaches the shaft 547.

The bracket 1116 has a horizontal portion 1136 forming a table or ledge along which the ticket stock 1135 is advanced to the printing wheel. This ledge has a clearance slot 1146 to clear the knurled wheel 1100. This knurled wheel has a cut away sector 1147, and cooperates with the knurled wheel 1101 to advance the ticket stock to the left, as seen in Fig. 55. The gears 1094 and 1098 mesh, so the relative movements of the knurled wheels is the same even though the latter may be disengaged by the interposition of the ticket stock between them.

The shaft 1137 (Figures 63 and 64) previously referred to as carrying the knurled wheel 1101 and the gear 1098, is journaled in a bushing 1139 which is mounted on a lever 1148. The knurled wheel 1101 is fixed on the shaft 1137, and the latter extends through bushing 1139 and through the gear 1098 and its hub 1099, the gear being secured on the shaft by a set screw (not shown).

The lever 1148, Figure 55, carries a bushing 1149 which is fulcrumed on a stud 1150 supported on the frame member 1091. The lever 1148 also carries a spring post 1151, and the foot 1032 carries a spring post 1152, and a spring 1153, secured to both these spring posts urges the lever 1148 in a counterclockwise direction about the fulcrum 1150, and consequently the knurled wheel 1101 is urged into contact with the knurled wheel 1100.

*Ticket registration*

Referring now to Figures 57 and 63, a boss 1145 carried on frame member 1091 has journaled therein a shaft 1144 supporting a detent lever 1140 which carries, on one end theerof, a roller 1141 which is journaled on a stud 1141a on the lever and cooperates with the cam 1096; and the lever carries, on the other end thereof, a stud 1143 upon which a roller 1142, cooperating with the detent cam 1102 is mounted. The lever carries a spring post 1154 to which one end of a spring 1156 is connected. The other end of this spring is connected to a tab 1155 on the frame member 1027 and thus the lever 1140 is constantly urged in a clockwise direction, as seen in Figure 57, thereby maintaining the roller 1142 in contact with the periphery of the detent cam 1102 until such time as the high portion of the cam 1096 acting against roller 1141, frees the roller 1142 from the cam 1102.

*Mask plate*

A mask plate 1160 has: a rectangular opening 1158 through which the station names carried by the type slugs 1035 are printed on the ticket stock; a rectangular opening 1159 through which the date, carried by a dater to be presently described, is printed; and a third opening 1157 through which an identification number or symbol is printed. Formed integral with the plate 1160 is an upright side 1161, and formed integral with the upper edge of the side 1161 is a laterally extending camming ledge 1162 which is actuated in a manner to be presently described. A Z-shaped arm 1163 has one end secured to the side 1161, and the other end thereof has a boss 1164 secured thereto. This boss is journaled on a stud shaft 1165 carried on the frame member 1091 and is retained thereon by a nut 1166 engaging a threaded end of the shaft and abutting a shouldered portion of the shaft.

*Ticket shearing device*

A shaft 1167 has a hexagonal head 1168 formed on one end. The other end has a portion 1169 of reduced diameter which extends through a hole in the main plate 175 with the shoulder thus abutting the lower surface of the main plate and secured in this relation by a nut 1170. A second shaft 1171 also has a hexagonal head 1172 formed on one end and a shoulder and a portion 1173 of reduced diameter on the other end. Said portion extends through a hole in the main plate 175, spaced apart from the shaft 1167, and secured therein by means of a nut 1174 with the shoulder hard against the lower surface of the plate, whereby the two shafts are parallel. A bridge member 1175 has holes in each end which fit the shafts, and this member rests on the heads 1168 and 1172. A rectangular frame 1180 is comprised of: a horizontal bar 1177 having spaced parallel bearing holes therein which form working fits on the shafts 1167 and 1171; a second horizontal bar 1178 having spaced parallel bearing holes which form working fits on the shafts 1167 and 1171; and vertical bars 1179 and 1181 which are secured to the ends of the bars 1177 and 1178 to form a rigid frame.

The bar 1178, intermediate its ends, carries a stud 1183, upon which a roller 1182 is journaled. This roller is engaged by the notched end 1072 of the knife actuating lever 1070. A block member 1185 is fixed on the shaft 1167 a predetermined distance below the main plate 175, and a second block member 1186 is fixed on the shaft 1171 the same distance below the main plate. Secured to the block members 1185 and 1186 are depending arms 1187 and 1188 respectively which form supports for the ends of spaced rollers 1189 and 1190. A spring 1191 is positioned on the shaft 1167 between the bar 1177 and the block member 1185, and a second spring 1192 is positioned on the shaft 1171 between the bar 1177 and the block member 1186 and constantly urge the frame member 1180 downwardly toward rubber buffers 1184 and 1176 carried on the shaft 1167 and 1171 respectively. A knife or shear blade 1193 is fixed to the block members 1185 and 1186, and a cooperating knife or shear blade 1194 is pivotally connected to the blade 1193 and is linked to and movable with the bar 1178.

As the shaft 1000, carrying cam 1080, rotates the lever 1076, which engages the notch 1073 in the knife actuating lever 1070, moves the latter in a counter-clockwise direction and it, acting against the roller 1182 raises the rectangular frame 1180 up from its normal position in contact with the buffers 1176 and 1184, to an elevated position where the shear blades 1193 and 1194 are open so that the ticket stock 1135 may pass between them. At the proper time in the operating cycle of the machine, the cam allows the rectangular frame 1180 to drop downwardly, as seen in Figure 54 under the urge of the springs 1191 and 1192, thereby closing the shear blades 1193 and 1194 and severing the printed ticket from the ticket stock strip 1135.

*Dating and coding means*

A dating device 1195, Figures 65, 66 and 67, is secured to the plate 1026 by means of a bracket 1214 which is secured to the end plate 1197 and to the plate 1026 in any suitable manner, and the bracket 1215, which is secured to the end plate 1198 and to the plate 1026. The dater includes: a "year" printing wheel 1199 which is secured on a shaft 1203 journaled in the end plate 1197 and in a sleeve shaft 1204. The shaft 1203 carries on its outer extremity a knob 1207 with indications of the years thereon. The sleeve shaft 1204 has a printing wheel 1200 carrying the "unit" dates thereon on one end thereof and has a knob 1208 on the other end indicating the unit dates. A sleeve 1205 has thereon a printing wheel 1201 carrying "tens" dates on one end and a corresponding knob 1209 on the other end. A sleeve 1206 has a printing wheel 1202 on one end for printing "months," and has a corresponding knob 1210 on the other end thereof. The dater includes a washer between the wheel 1202 and the end plate 1198 and a pawl, for each printing wheel, which engages ratchet teeth thereon. The dating plate 1196 has a depression or well 1211 therein in which a printing slug 1212 bearing identification data is positioned and secured therein by means of screws 1213.

*Printing pad*

Referring to Figures 58 to 61, the main base plate 175 has a rectangular hole 1216 formed therein. A shouldered stud 1224 has threaded shank (not shown) extending downwardly through a clearance hole in the main base plate adjacent to the left edge of the hole 1216, Figure 59, and is secured therein by a nut. However, before the nut is applied, the shank is passed through a clearance hole in a tab 1218, forming part of an end plate 1217, and is also passed through a cushioning washer 1223 which is positioned between said tab and the base plate. A second shouldered stud 1231 also has a threaded shank (not shown) which extends downwardly through a clearance hole in a tab 1228, forming part of an end plate 1225, through a cushioning washer 1230 and through a clearance hole formed in the base plate 175 adjacent to the other end of the rectangular hole 1216. The end plate 1217 has right angled ears 1219 and 1221, and the end plate 1225 has right angled ears 1226 and 1227. A side plate 1232 has one end spot welded to the ear 1219 and the other end spot welded to the ear 1226. An opposite side plate 1255 has one end spot welded to the ear 1221 and the other end spot welded to the ear 1227, thereby forming a rigid structure 1220, generally in the form of a hollow rectangle.

The side plate 1232 has a portion cut away extending upwardly from its bottom edge of rhomboidal form, leaving an angular camming surface 1233, a straight horizontal surface 1234 and a second angular camming surface 1235, all said surfaces being joined. The opposite side plate 1255 has its bottom edge formed in the same manner. The upper edge of the side plate 1232 has an inclined portion 1236, joining a depressed horizontal portion 1237 and joined by an inclined portion 1238. The upper edge of the side plate 1255 has identical portions which are individually in horizontal alignment with the surfaces 1236, 1237 and 1238.

The shouldered stud 1224 has a shank 1222 extending upwardly and its upper end is threaded. Likewise the shouldered stud 1231 has a shank 1229 extending upwardly and its upper end is threaded. A top plate 1240 has turned down edges 1241 and 1242 and beyond these edges at the ends thereof are: a tab 1243 with a clearance hole therein and positioned on the shank 1222 of shouldered stud 1224, and a tab 1244 with a clearance hole therein and positioned on the shank 1229 of the shouldered stud 1231. The turned down edges are identical (on both sides) and include edges such as the inclined edge 1245, the straight edge 1246 and the inclined edge 1247. The edges 1236, 1237, and 1238 are parallel to the edges 1245, 1246, and 1247, so that a roller, such as the roller 1256 may easily traverse the space between the oppositely positioned surfaces, and on the opposite side a roller 1258 may do likewise.

Positioned on the shank 1222 in contact with the end 1243 is a spring 1261 with a washer 1265 on top, and by means of lock nuts 1263 any desired pressure may be obtained by adjusting the nuts 1263 and they may be locked to retain such adjustment. Positioned on the shank 1229 of the shouldered stud 1231 is a spring 1262 with a washer 1265 on top, and by means of nuts 1264 a desired pressure may be adjusted for and the nuts may be locked to retain such adjustment.

The printing pad 1266 includes a body 1267 carrying a through shaft 1260 with extended ends 1268 and 1269 carrying grooves to accommodate snap rings. Journaled on the end 1268 is a roller 1256 having a flange 1257, Figure 60, and journaled on 1269 is a roller 1258 having a flange 1259. Also journaled on 1268 and 1269 are rollers 1270 and 1272 respectively which are retained on the respective shaft ends by means of snap rings 1271 and 1273. The purpose of the rollers 1270 and 1272 will be presently explained.

A shouldered stud 1248 has a shank 1249 which is riveted to the top plate 1240, and a shank 1250 extending upwardly and having its end threaded. An inverted U-shaped member 1251 has a central clearance hole through which the shank 1250 extends and the extremities extend through spaced slots in the top plate 1240. A spring 1252 positioned on the shank 1250 with a washer 1253 presses the member 1251 against the shoulder of stud 1248, and this pressure may be set as desired by means of nuts 1254 on the shank. The extremities of member 1251 cooperate with the rollers 1256 and 1258 in a manner to be presently explained.

The body 1267 of the printing pad has an arcuate surface 1274 the periphery of which is radial about the axis of the shaft 1260. The body includes angular surfaces 1275 and 1276 which join the surface 1274 with convex fillets therebetween, the included angle of surfaces 1275 and 1276 being about 84°. The body also includes a boss portion about the shaft and tangential surfaces joining surfaces 1275 and 1276. A pad 1277 of leather or any other suitable material spans the arcuate surface 1274 and has ends overlapping and secured to the angular surfaces 1275 and 1276.

A lateral stud 1278 is screwed into the body 1267 and secured with a locknut 1279. This stud cooperates with and cams on the surfaces 1233, 1234 and 1235.

The means for reciprocating the frame or structure 1220 carrying the printing pad includes the Geneva movement 1004, 1014, the crank 1007, the connecting rod 1009, and the lever 1011, which have already been described in connection with Figure 53. The lever 1011 is secured to a bearing boss 1239, and this boss is in turn secured to a second lever 1280, as may best be seen in Figures 59 and 58. The end of the lever 1280, as may be seen in Figure 58, has a slot 1281 formed therein, and a roller 1282 forms a working fit in the slot 1281. A member 1285, which may be seen in cross-section in Figure 62, has upwardly directed flanges 1287 and 1288 formed integral with a horizontal web therebetween. Secured to the flange 1287, by means of screws 1290, is an elongated vertical strip 1291 having a horizontal flange 1292 along a portion of its length. Secured to the flange 1288, by means of screws 1293, is an elongated strip 1294 having a horizontal flange 1295 along a portion of its length paralleling the flange 1292. The member 1285 on its right end, Figure 58, beyond the ends of the strips 1291 and 1294 is flat and has oppositely extending ears 1284 and 1286 formed thereon.

A stud shaft 1283, upon which the roller 1282 forms a working fit, is riveted or otherwise secured on the ear 1284. An elongated "way" strip 1296 has V-shaped edges 1297 and 1298 formed thereon. A block member 1299 has in its right edge, a V-shaped groove which matches and forms a working fit on the V-shaped edge 1297 of the strip 1296. The block member 1299 is secured to the member 1285 by means of filister head screws, one of which is shown at 1300, the heads of the screws being countersunk in the block member and the threaded shanks engaging threaded holes in the web 1289.

A block member 1301 has in its left edge, a V-shaped groove which matches and forms a working fit on the V-shaped edge 1298 of the strip 1296. In mounting the member 1285 and its assembled parts on the strip 1296, the block member 1299 is secured therein by means of the filister head screws 1300 first. The block member is then positioned with its groove in contact with the edge 1298. Then the assembly is applied with the groove in the block member 1299 engaging the edge 1297, following which flat head screws 1302 are caused to engage threaded holes in the block member 1301 and they are screwed in until their heads occupy the countersinks in the web 1289, thus the assembly may be reciprocated along the strip 1296.

The strip 1291 has a tab 1303 formed on the left end as seen in Figure 58, and a like tab 1304 is applied to reinforce the tab 1303. Likewise the strip 1294 has a tab 1305 formed on its left end and a like tab 1306 is applied to reinforce it, see Figures 59 and 60 also. These tabs all have aligned, elongated holes 1307 which are of diameters to accommodate the rollers 1270 and 1272, said holes being elongated to permit a predetermined rise and fall of the axis of the printing pad. Within the structure 1220 are two studs 1308 and 1309 which are spaced apart from each other and which are sequentially engaged by and arrest the printing pad as the latter reaches the end of its stroke in each direction.

In Figure 59 is shown one normal or at rest position of the printing pad, and the other normal or at rest position of the printing pad may be seen in Figures 55 and 57.

*Carbon paper strip*

Referring to Figure 55, a bracket 1310 has a vertical leg secured to the frame member 1027 by means of screws, one of which is shown at 1311. The horizontal leg of this bracket carries a vertical shaft 1312 which carries a friction disc 1313 which is engaged by a wire belt 1314, which also spans a grooved stud 1360 on the bracket 1310, the function of which is to impose friction on the disc and consequently on any roll of strip carbon placed on the shaft 1312. A drum like casing 1315 is provided, and a roll of strip carbon paper is placed on the shaft 1312 and is pressed downwardly until it seats in the casing. A guide member 1316 has a tab 1317 which is secured to the upright 1027, thereby rigidly positioning the exit of the guide member in registration with the lower end of a chute 1318 which has guide flanges 1319 and 1320 along opposite edges thereof. Midway the chute 1318 is a bridge portion 1321 which has a rectangular aperture (not shown) therein. In registration with this aperture is a second aperture formed in the body of the chute. A micro-switch 1322 is mounted on the underside of the chute and the actuating arm 1323 of this switch has a curved end 1324 which extends through the aperture in the chute and contacts the carbon paper strip 1325. This strip prevents the curved end 1324 from entering the aperture in the bridge portion 1321. However, when the supply of carbon paper runs out, said last mentioned aperture is uncovered, the curved end 1324 enters it and closes the contact members in the micro-switch, thereby setting up a signal indicating that the carbon paper is exhausted, as will be described in connection with the circuit diagram.

A curved guide member 1326 extends downwardly from the ledge 1136 and it has a tab 1327 which is secured on the frame 1027, and this guide member guides the carbon paper strip from the chute 1318 to a roller 1328 carried by the mask plate 1160. The carbon paper extends across the mask plate in contact with the upper surface thereof with the carbon carrying surface up. The ticket stock 1135 also extends across the mask plate face down and in contact with the carbon carrying surface of the carbon paper. The carbon paper passes over a roller 1329 on the other end of the mask plate. (The left end, Figure 55.) After the carbon paper leaves the roller 1329, it passes under the roller 1189 and over the roller 1190 to a take-up mechanism.

*Carbon take-up reel*

Referring now to Figures 74, 83 and 82, the carbon paper strip leaving the roller 1190 passes down to the hub 1331 of a take-up reel 1330. A support member 1333 has a foot piece 1334 which is secured to the main plate 175 by means of screws one of which is indicated at 1335 in Figure 82. A stud 1336 secured to the support member has formed integral therewith a shaft 1332 upon which a ratchet wheel 1337 is fixed. The hub 1331 of the take-up reel fits the shaft 1332 sufficiently tight to be driven by the shaft and yet to be removable therefrom when the reel becomes filled with carbon paper. A pivoted lock pawl 1338 is mounted on the support member adjacent to the ratchet wheel 1337 and a spring on the pawl shaft engages a stud 1339 and the pawl, thereby constantly urging the latter into engagement with the teeth of the ratchet wheel. A leverage member 1340 has one end journaled on a stud shaft 1341, carried by the support member, and has formed therein an elongated slot 1342 which normally is slightly inclined with respect to the horizontal. This leverage member also carries a stud shaft 1343 upon which a pawl 1344 is journaled. A spring 1358 embracing the hub of the pawl has one end engaging a pin 1357 and the other end partially embraces the pawl, urging it into engagement with the ratchet wheel 1337.

A shouldered screw 1356 extends through a clearance hole formed in the upper end of a connecting rod 1346 and engages a threaded hole 1347 in the knife actuating lever 1070. The lower end 1348 of the connecting rod is twisted to lie in a plane at a right angle to the plane of the main portion of the connecting rod, and extending through a hole in said lower end is a shouldered rivet 1349 extending through a corresponding hole in one leg 1351 of a Z-shaped member 1350. The leg 1351 is substantially vertical, and the member 1350 has, joining the leg 1351, a horizontally extending portion 1352 and a depending portion 1353. The portion 1353 carries a stud 1345 which extends into an cooperates with the elongated slot 1342, and also carries a stud shaft 1354 upon which a roller 1355 is journaled.

The roller 1355 bears against the carbon paper on the hub of the reel. Each time the knife actuating lever is oscillated by its cam 1080 actuating the lever 1076, the pawl 1344, Figure 83, advances the ratchet wheel and causes carbon paper to roll onto the hub 1331 of the reel. As the convolutions or turns of carbon paper build up on the reel hub, gradually increasing its diameter, the roller 1355, in contact therewith causes the member 1350 to move toward the left, as seen in Figure 83, gradually increasing the radius on which the leverage member swings, with the result that the movement of the ratchet wheel becomes less and less as the layers of carbon paper build up on the reel hub, thereby compensating for the constantly increasing radius of the carbon paper taken up on the takeup reel.

In Figure 55, the shaft 1150 carries a disc or wheel 1359 which centrally contacts the ticket stock along approximately its center axis, thereby keeping the ticket stock 1135 from rising and falling as it passes over the surface of the ledge 1136, so that a micro-switch like the switch 1322, for example, may be mounted so that the curved end, like end 1324 may normally contact the ticket stock passing over the surface of the ledge 1136, at a point adjacent to the disc 1359, and maintain the switch with its contacts constantly open. However, if the ticket stock is exhausted, it is no longer present to hold the contacts open, so they close and indicate to the service man that the ticket stock supply in the machine is exhausted.

The shaft 547 in Figure 53 has its right end extending into a bearing carried on a bracket 1362, secured to the under surface of the main plate 175 by means of screws 1363. The main plate has an elongated slot 1364 formed therein, and a spur gear 1365, having a hub 1366 is secured on the shaft 547. A portion of this gear extends through the slot 1364 and meshes with a gear 1361, Figure 8, in the locking drum resetting device 181.

The gear 1361 is mounted on a bushing 1367 which is journaled on the reset shaft 222. The gear 236 is also carried on the shaft 222 and meshes with an idler gear 1600 which in turn meshes with the spur gear 405 on the sensing shaft 404, the idler gear running freely on a stud 1601. Also fixedly secured on the bushing 1367 is the hub 1369 of a radial arm 1368. A hub 1370 is fixed on the reset shaft 222 by means of a taper pin 1371. This hub has fixed on one end thereof a radial arm 1372 and fixed on the other end is a like arm 1373. Conjointly supported in aligned holes in the arms 1372 and 1373 is a shaft 1374. The left end of the shaft 1374 extends into the path of the radial arm 1368, and the right end of the shaft 1374 extends beyond the arm 1373 and into the path of a radial arm 1375 which is mounted on a hub 1376 journaled on the shaft 222. Fixed on the hub 1376 is a pinion 1377 with which a rack 1378 is meshed. The rack is maintained in cooperative relation with the pinion 1377 by means of a flanged roller 1380 which is journaled on a stud shaft 1379 carried on the standard 242. The rack 1378 is operatively connected to coin return mechanism for resetting the locking drum 182 when the customer puts money in the machine and then decides he wants it returned. This will hereinafter be described in connection with Figures 68, 69, 70 and 71. The gear 1361, Figures 8, 16 and 17, carries headed shouldered studs 1381 upon which a cam plate 1382 is mounted. The studs extend through corresponding elongated slots 1383 and form working fits therewith. Springs 1384 connected to the gear and to the plate urge the plate 1382 downwardly so that the studs are adjacent to the upper ends of the slots 1383. The cam plate carries, near the upper end thereof, a stud 1385 upon which a roller 1386 is mounted. This roller is preferably a small ball bearing, and it is retained on the stud 1385 by a snap ring 1387 engaging an annular groove formed on the stud. A gear 1388 has a hub 1389 which is journaled on the shaft 222. Mounted on the hub 1389 is a five lobed cam 1390 with which the roller 1386 cooperates. Referring to Figure 14, the cam plate 1382 carries two spaced spring posts 1395. Mounted on the gear 1361 are two spaced spring posts 1396, and one of the springs 1384 is connected to one set of posts 1395, 1396, and the other spring is connected to the other set of posts 1395, 1396 their urges are along paths parallel to the path of movement of the cam plate. The elongated slot 1383 has a widened portion 1397 to clear the hub 1367 of the gear 1361. Meshing with the gear 1388 is an idler gear 1391 which has a hub 1392 journaled on a stud carried on a standard 1393. The standard 1393 has a foot portion 1394 which is secured to the main plate 175.

*Coin return mechanism*

The coin return mechanism 1400 is shown in Figures 68, 69, 70 and 71. It includes end plates 1401 and 1402 which are rigidly held in spaced relation by spacer rods, one of which is shown at 1403, engaged by screws 1404 passing through clearance holes in said end plates. The end plate 1401 has a foot portion 1405 and the end plate 1402 has a foot portion 1406 through which mounting screws pass to engage tapped holes in the main plate 175, to secure them in front of the coin counter and the locking rotor reset mechanism. The end plate 42 of the coin counter carries a bearing boss 1407 in which the shaft 1408 of a bell-crank 1410 is journaled. The bell-crank has one arm 1409 which carries a spring post 1414. A second spring post 1415 is mounted on the end plate 42, and a spring 1416 has its ends connected to these spring posts. A stop boss 1412 is secured on the end plate 42 by means of a screw 1413. The other arm 1411 of the bell-crank carries a stud shaft 1417, upon which a roller 1418 is journaled. Cooperating with the roller 1418 is an L bracket 1419 which is mounted on the end of the rack 1378, so that as the rack is pushed to the right, as seen in Figure 70, the bracket 1419, acting against the roller 1418 swings the bell crank 1410 in a counterclockwise direction, thereby tensioning the spring 1416, so that when the rack is released the spring urges it back to its normal position, which is the position shown in Figure 70. Journaled in a bearing bushing 1420 in the end plate 1401 and in a bearing bushing 1421 in the end plate 1402 is a shaft 1422 which has keyed on one end thereof the hub 1423 of a lever 1424 carrying a plunger 367 adapted to enter the lockout chain each time the coin return mechanism is operated. In Figure 68, a bracket has a downwardly extending tab portion 1425 secured to the end plate 1401. Joining this tab is a horizontal shelf portion 1426 having an elongated slot 1427 therein, and a vertical portion 1428 which has a right angled foot portion 1429 secured to the main base plate 175.

An L-shaped member 1430 has a horizontal portion 1431 which slides endwise along the surface of the shelf portion 1426 and which has spaced shouldered screws 1432 engaging it via the elongated slot 1427. The member 1430 also has a vertical portion 1433 which is somewhat rhomboidal in form. An elongated rectangular opening 1434 is formed in said vertical portion. The rack 1378 is secured to the horizontal portion, in spaced apart relation to the opening 1434, and carries an L shaped bracket 1435 which is secured on the left end of the rack and the function of its upstanding leg will presently be described.

A stud shaft 1436 mounted on the end plate 1401 and has journaled thereon the hub 1437 of a cam 1438. This cam carries a stud 1440 extending through one end of a link 1439 and the other end is pivotally connected to the rhomboidal portion 1433 by a pivot stud 1399. The cam 1438 carries a second stud 1441 which is pivotally connected to a line 1442 which has an elongated slot 1443 therein. A pivot pin 1444 journaled in the slot 1443 is fixed on an arm 1445 which is carried on the end of a square shaft 1446. The arm 1445 also carries a pivot shaft 1447 which is pivotally connected to one end of a curved arm 1448. This arm has a depending tab 1449 formed thereon and formed in the arm adjacent thereto is a notch 1450. An S shaped member 1452 has a portion cut away from its inner edge from its upper end down to and forming a ledge 1451, to accommodate the arm 1448 and allow the notch 1450 to engage the ledge 1451. The member 1452 is secured to a boss 1453 and the latter is secured to the end plate by means of a cap screw 1454, which may be loosened for setting the member 1452 and tightened to retain such setting.

A spring 1455 has several convolutions embracing the hub 1437 of the cam 1438, one end thereof being in engagement with a post 1456 on the end plate and the other end being engaged with a stud 1457 carried by the cam.

Secured on the shaft 1422 is an arm 1458 which carries a stud 1459. A link member 1460 has an elongated slot 1461 in one end thereof which forms a working fit on the stud 1459. The other end of this link member is connected to a stud shaft 1469 carried on a lever 1467, and a spring 1470 connected to the studs 1459 and 1469 urges the stud 1459 to the inner end of the elongated slot. The lever 1467 is journaled on a stud 1468 mounted on the end plate 1401. A roller 1471 is journaled on a shouldered screw 1472 carried on the left end of the lever, as seen in Figure 70, and this roller cooperates with the camming surface of the cam 1438. A spring 1475 having one end looped through a hole 1473 in the lever and the other end connected to a spring post 1474 on the end plate 1401 urges the roller into contact with the cam 1438.

A stud 1462, mounted on the vertical portion 1428, has journaled thereon a lever 1463 which has on its extremity an upstanding tab 1464. This lever carries a stud 1465, and a link 1466 has its lower end pivotally connected to the stud 1459 (in the upper left hand corner of Figures 70 and 71).

Secured on the square shaft 1446 by means of screws 1477, or in any other suitable manner, is a plate member 1476 having a plurality of slots 1479 formed in the lower edge thereof, Figure 68, leaving therebetween a series of webs or fingers 1480. Pivotally carried in the end plates 1401 and 1402 is a second square shaft 1481, to which a plate member 1482 is secured by means of screws 1477, for example. The lower edge of this plate is slotted like the plate 1476 except that they are shifted so that the slots in each plate are adapted to receive the webs or fingers of the other. In Figure 68 the fingers 1480 extend into slots formed in plate member 1482, and fingers 1483 extend into the slot in plate member 1476, so that together the plates 1476 and 1482 conjointly form a pocketed shelf to receive the coins from the chutes 118, 170, 171 and 172 and to retain them there until final disposition of such coins is determined, either by the vendee or by the machine.

Below the normally interlocked fingers are two funnel like compartments 1484 and 1485. The compartment 1484 delivers coins into a chute 1486 which in turn delivers the coins into a receptacle accessible to the vendee, while the chute 1487 delivers the coins into a coin box or receptacle inside the machine. Although no cabinet is shown enclosing the machine, it will be understood that the mechanism herein disclosed and described may be enclosed in a suitable cabinet, and that the tickets and the change will be delivered into a receptacle carried by said cabinet in a convenient location thereon. Mounted in the member 1430 is bar 1488 formed of any suitable material and conveniently positioned on the cabinet so that when the vendee wants his money back, the bar 1488 may be pushed inwardly to effect the return of the coins, and the chute 1486 is arranged to deliver the coins into the same receptacle mentioned above.

*Operation of coin return mechanism*

When the vendee pushes the coin return rod or button 1488, the link 1439 tends to move the cam 1438 in a counterclockwise direction, as seen in Figures 70 and 71, and the cam tends to rock the lever 1467 in a clockwise direction about its fulcrum 1468. As these parts move, the crank arm 1458 is moved in a counterclockwise direction, due to the fact that the spring 1470 is very strong, and thus the shaft 1422 and the lever 1458 thereon are also moved in a counterclockwise direction with the result that the plunger 367 is swung into the lock-out chain. If the lockout chain has already received one of the plungers 351 or 351a of any of the selector keys, the plunger 367 cannot enter the lockout chain, and the return of the coins cannot be effected, because the tab 1464 on the lever 1462 normally extends up into the rectangular opening 1434 and is engaged by the end 1434a of this opening thereby positively stopping any further movement of the member 1430 inwardly (to the right as seen in Figure 70). Another safety feature that will prevent the return of the coins is the curved arm 1448 which normally has its notch 1450 engaged with the ledge 1451 in the S-shaped member 1452. The only way this notch can be disengaged from the ledge 1451 is by the displacement of the tab 1449 by the bracket 1435, but the member 1430 to which the rack 1378 and the bracket 1435 is secured, is prevented from movement by the tab 1464 on the lever 1463 as pointed out above, so it is therefore impossible for the vendee to get his money returned after he has depressed a selector key for the destination and has consequently started the machine cycle.

If, on the other hand, the vendee had not yet depressed one of the selector keys and decided he wanted his coins returned, the pressing in of the coin return rod or button 1488 would effect the following operations: as the member 1430 moves to the right, the link 1439 moves the cam 1438 counterclockwise and the cam, in turn, causes the lever 1467 to move clockwise about its fulcrum 1468, thereby pulling the link member 1460 endwise. This causes the arm 1458 to move counter-clockwise, together with the shaft 1422 and the arm 1458 so that the plunger 367 tries to and enters the lockout chain (because no other plunger 351 or 351a has entered it already). As the plunger 367 enters the lockout chain, the arm 1458 moves the link 1466 downwardly, lowering the lever 1463 and its tab 1464 out of the path of the member 1430 so that it can continue to be pushed toward the right. As the member continues toward the right, the link 1439 continues to move the cam 1438 counterclockwise thereby increasing the tension of the spring 1455, while also tensioning the spring 1416, due to the action of bracket 1419, on the right end of the rack 1378, against the bell crank 1410. The plate 1476, which is one of the plates retaining the coins, remains in its normal position (shown in dotted lines in Figure 70) due to the elongated slot 1443 in the link 1442 until a point is reached immediately before the complete movement of member 1430 to the right has been effected.

It was pointed out above that the coins cannot be returned as long as the notch 1450 in the curved arm 1448 is engaged with the ledge 1451 on the S-shaped member 1452. This is due to the fact that the shaft 1446 carrying the plate 1476 carries an arm 1445 which is linked to the curved arm by the pivot 1447.

Now as the member 1430 approaches the end of its movement to the right, the bracket 1435 on the left end of the rack 1378 engages the depending tab 1449 on the curved arm 1448 and lifts the latter, thereby disengaging the notch 1450 from the ledge 1451 so that the elements assume the positions shown in Figure 71. It will be noted that as the curved arm was released, the plate 1476 has swung down to an almost vertical position, and, as seen in Figure 69, such a swing of the plate 1476 will allow the coins resting on 1476 and 1482 to enter the funnel-like compartment 1484 and pass via the chute 1485 to a receptacle provided for the returned coins.

*Mechanism for delivering money into coin box inside the machine*

Referring now to Figures 57 and 84, a spacer rod 1478 which is similar to the other spacer rods 1403, cooperates with the latter to hold the end plates 1401 and 1402 in spaced parallel relation, is also secured between the plates by means of screws 1404 passing through clearance holes in the end plates and engaging threaded holes in the ends of the spacer rod 1478, holding it in fixed relation to the plates. Fixed on the rod 1478 is a collar 1489. One end of a bushing or sleeve 1490 bears against this collar, and the other end is stepped and has secured thereto an arm 1491 which has a bearing hole therein in which a stud shaft 1501, carried by a plate member 1492, is journaled. A second sleeve 1493, substantially longer than the sleeve 1490 is journaled on the spacer rod 1478 and has in contact with its right end, as seen in Figure 84, a collar 1494. Keyed on the sleeve 1493 is the hub 1496 of a gear 1495. Fixed on the left end of the sleeve 1493 is an eccentric 1497 which is embraced by the hub of a crank arm 1500, so that as the sleeve 1493 is rotated, the crank arm moves up and down distances equal to the throw of the eccentric 1497. The crank arm 1500 carries a stud 1502 which extends into a slot 1503 formed in the plate member 1492 and which has a portion to which one end of a spring 1505 is secured. The other end of this spring is secured to a spring post 1504 mounted on the plate member 1492. Secured to opposite faces of the eccentric 1497 by means of screws 1512 are washer members 1507 and 1508 having eccentric holes thereon clearing the sleeve 1493 and retaining the crank arm 1500 on the eccentric.

A plate member 1509 has a lug 1510 thereon extending at a right angle with respect to the surface thereof. This lug has a bearing hole therein, into which a stud shaft 1506, carried by the plate member 1492 extends.

The gear 1495 meshes with and is consequently driven by the gear 1361 in the resetting mechanism 181. The ratio of these gears is such that the money dump operates three times during the reset cycle. As the sleeve 1493 is rotated by the gear 1495, the eccentric, which is fixed on the sleeve, rotates therewith and moves the crank arm 1500 up and down. The plate 1492 is fulcrumed on the stud 1501, and since the spring 1505 holds the stud 1502, on the crank arm, firmly against the upper end of the slot 1503 in the plate 1492, the plate is also moved up and down. This movement causes the stud shaft 1506 to move up and down also, this last movement being greater due to the increase through the leverages, and the plates 1509 and 1482 which are secured together swing straight downwardly about the axis of shaft 1481 and back to its normal position once during each revolution of the eccentric. The arm 1491 on the short sleeve 1490, which carries the fulcrum for the plate member 1492, is free to move to compensate for the curved path its stud shaft moves through as the plate 1482 moves down to the vertical position. The gear 1495 makes three revolutions during the reset cycle of the gear 1361 with which it meshes, for the reason that if all of the coins do not pass into the chute 1485, 1487 during the first rotation, they should during the second. The spring 1505 normally holds the stud 1502 against the end of the slot 1503, however if as the plate 1482 is returning to normal it engages a coin or coins between the fingers, the spring "gives" and prevents any of the elements from bending or breaking. When this occurs, it clears during the next or second revolution of the gear 1495.

Referring now to Figures 85 and 86, I show damping means for preventing the locking drum 182 from rebounding at the end of its resetting cycle. The pinion 526 is provided with a hub 1565 which has a portion 1566 of enlarged diameter. The internal bore 1567 clears the stud 524. Formed in the portion 1566 is an annular groove 1568 and mounted in this groove is an annular ring 1569. Although this ring may be formed of many different kinds of material, I have found that a ring of rubber having a spongy consistency produces excellent results.

A support plate 1570 is secured on to the standard 186 by means of screws 1571. This plate has an elongated hole 1572 formed therein. A stud shaft 1573 has a portion 1574 of reduced diameter and mounted on this portion is a roller 1575. I have found that a small ball bearing serves admirably as a roller. The stud shaft has a portion 1576 which extends through the elongated hole 1572 and has its outer end threaded to be engaged by a nut 1577. A washer 1578 is positioned between the nut 1577 and the plate 1570. Now due to the elongated hole, stud shaft 1573 and the roller 1575 carried thereby may be adjusted vertically so that by adjusting these elements up and down and thereby adjusting the depth of the engagement of the roller with the rubber ring 1569 a point will be reached where the locking drum will be prevented from rebounding even when it returns from its point or furthest movement from normal.

It will be understood that the damping described above is abetted by a fan vane 498 due to the fact that during the resetting the clutch members 468 and 472 are engaged.

*Electrical circuits in the machine*

Referring to Figure 87, which shows the circuits in the machine, switch contacts 1498 and 1499 are connected to a source of current, and when the switch is closed, forms an extension of one side of the source of current.

Likewise a conductor 1518, which is connected to the switch arm 1514 via a fuse 1519 and a jumper 1520, forms an extension of the other side of the source when the switch is closed.

A conductor 1521 is connected to 1517 and to one terminal of the motor 735, and the other terminal of the motor is connected via a wire 1522 to one terminal of the mercury switch 887. The other terminal of this switch is connected via a wire 1523 to the conductor 1518, so that when the mercury switch closes the motor will start running.

A coin slot 1534 via which coins are placed in the machine has a shutter 1527 which closes the slot 1534 at all times when a solenoid 1525 is not energized. The solenoid has a plunger 1526 which is connected to the shutter. One terminal of the solenoid is connected via a wire 1531 to a contact arm 1530. A second contact arm 1529 normally contacts contact arm 1530 and is connected to the conductor 1517 via a wire 1528.

The other terminal of the solenoid 1525 is connected via a wire 1532 to a contact arm 1533, and a contact arm 1534 is moved into contact therewith by the camming action of the end of the connecting rod 769, Figure 52. Contact arm 1534 is connected to the conductor 1518 via a wire 1535, thus completing a circuit through the solenoid 1525 when the connecting rod is in the right position. The cam is so timed that it closes the contacts 1534, 1533 just at the end of the reset cycle of the machine, so that the contacts remain closed while the machine is at rest.

A latching relay winding 1536 has one terminal connected via a wire 1537 to the wire 1535 and its other terminal is connected to a conductor 1538. A conductor 1539 is connected to the conductor 1517, and bridging the conductor 1538 and 1539 are several normally open micro-switches as follows:

A micro-switch 1544, which is closed when the ticket stock 1135 becomes exhausted and energizes the winding 1536. When the winding is thus energized, the depending leg of the bell crank 1540 is drawn toward the core and the horizontal leg raises the contact arm 1529, thereby interrupting the flow of current through the solenoid 1525 and allowing the shutter 1527 to close the coin slot 1524 so that thereafter, until a fresh supply of ticket stock is placed in the machine, it is impossible to insert any coins in the machine. When the bell crank is attracted as decribed above, the latch 1541 is drawn upwardly by the spring 1542 and latches the bell crank up and maintains contact arm 1529 in an "out of contact" relation with the contact arm 1530. When the service man has replaced the ticket stock, he manually resets the relay 1536 by unlatching the bell crank 1540.

A second micro-switch 1545 which functions in the same manner as that described above for the switch 1544, is closed when the supply of quarters change has become exhausted.

A micro-switch 1546, which functions in the same manner as that described above for the switch 1544, closes when the supply of nickels change has become exhausted.

A micro-switch 1547, which functions in the same manner as that described above for the switch 1544, closes when the supply of pennies change has become exhausted.

A micro-switch 1322, which closes when the supply of carbon paper strip 1325 has become exhausted.

A signal lamp 1550 has one terminal thereof connected via a wire 1548 to the conductor 1518 and the other terminal is connected via a wire 1549 to a switch arm 1551. A switch arm 1552 in cooperative relation with the switch arm 1551 but normally open is connected via a jumper 1553 to the conductor 1517. Now whenever the switch arm 1551 is moved into contact with the switch arm 1552, the signal light is supplied with current.

A relay winding 1555 has one terminal connected via a wire 1554 to the wire 1548. The other terminal of this winding is connected by a wire 1556 which is parallel to the extreme end portion of the conductor 1517. A plurality of normally open micro-switches bridge the wire 1556 and the conductor 1517 and when any one of these switches is closed, energy is supplied to the relay winding 1555 and it attracts the depending leg of the bell crank 1557 so that the horizontal leg raises the contact arm 1551 in contact with the arm 1552. As the depending leg of the bell crank is attracted, it is latched by the notch in the latch arm 1558 which is urged upwardly by the spring 1560. Once the bell crank is latched, it remains so until a service man manually releases the latch arm 1558.

The bridging switches referred to are as follows:

A micro-switch 1561 which closes when the supply of ticket stock reaches a predetermined low, so that a warning is given in sufficient time for the service man to replenish the supply thereby preventing the machine from being out of commission.

A micro-switch 1562 which closes when the supply of change in quarters reaches a predetermined low.

A micro-switch 1563 which closes when the supply of nickels reaches a predetermined low, and A switch 1564 which closes when the supply of pennies reaches a predetermined low.

*Phases of machine cycle*

Referring to the chart Figure 88, when a selector key 315 is depressed, tripping the motor switch 887 and the clutch 791, 795, or 793, 795, the cycle of the machine is started.

PHASE "0"

During the first 20° of the cycle, as indicated by "0" on the chart, the clutch 472, 468 that rotates the nickel change set-up is engaged and also the bevel gears 470 and 494 that drive the counter 502 recording money deposited in the money box are engaged.

PHASE "1"

The main rock shaft 775 of the machine starts to rotate and during the first 180° this will pick up the shaft 183 in the center of the locking drum assembly 182 and will reset this shaft to zero by the time the main rock shaft 775 has rotated 190°, which is 180° of the machine cycle. As this is happening, the locking drum 182, urged by the spring 195 inside the locking drum assembly, has also re-set to whatever extent is represented by the money deposited exceeding the price of the ticket. This difference is the change to be delivered in nickels and/or quarters and nickels, along with the ticket. While this was happening, the nickel change set-up clutch 468, 472 being engaged, the shaft 464 was rotated as many increments or steps as there are nickels to be delivered. Likewise, the counter 530 that records the change delivered has been rotated to indicate the amount of change in nickels and/or quarters. During this same time, the cent sensing shaft 410 has been rotated until it is arrested by the projection 303 on the key stem. At 180° of the machine cycle, the clutch 472, 468 on the nickel change shaft 464 has been disengaged and this shaft is free to return to the "at rest" position under the urge of the tension spring 1089 on the shaft 464. However, it is restrained from returning by two pawls 626 and 627 engaging the ratchet 635 under the nickel coin turret 570a.

PHASE "2"

During the first half of the machine cycle, the vertical shaft 542 of Figure 30 is rotated in a clockwise direction through gears 545 and 546, and while this shaft is moving in said direction the clutch members 552 and 549 slip by the member 552 moving up out of engagement with the elongated slot 553.

PHASE "2a"

During the second half of the machine cycle, the shaft 542 is rotated counter-clockwise, and the clutch members 552 and 549 cause the gear 550 to rotate. Since the gear 550 is meshed with gears 561 and 562, the coin turret shafts 571 and 571a are also rotated and the cents coin turret 570 and the nickel coin turret 570a are each rotated ⅘ of a revolution, so that four of the five coin tubes on these turrets pass the coin pickers 595 and 595a respectively. When the change set-up shaft 464 was rotated, if change was to be given, a cam 656 on this shaft lifted the nickel picker 595a. As the shaft 560 which supports and drives the nickel turret 570a is rotated, wedge cams 623 on the gear 562 on this shaft cause the lifting of the escapement pawls 626 and 527 as each coin tube 581a passes the picker 595a, thereby picking out as many nickels as would be represented by the position of the cam 656 which lifted the picker. On this cam there is a depression 657 at five nickels, or 25 cents. On the same shaft 464 with this cam is another cam 665 adapted to permit the quarter picker 690, which is normally forward, to drop back in the event that the change requires five or more nickels. This cam 665 causes the substitution of a quarter for the first five nickels. For example, if the change to be delivered is 35 cents, the nickel picker cam 656 will have rotated to a point where the picker roll 660 has dropped into the depression 657 and again been lifted. Therefore, two nickels change will be given during phase "1," the escapement operation of the cycle, at which time the picker roller 660 will drop into depression 657 in the cam, and meantime the quarter picker cam 665 will prevent any further movement of the shaft 464 on which these cams are mounted, so that the change delivered will be one quarter and two nickels. At the very end of the cycle, the quarter picker 690 is sent forward to eject one quarter and the escapement pawls 626, 627 on the nickel cam are lifted free by crank member 640, which is actuated by push bar 644 when the latter is moved by stud 647 on shaft 547 so that the shaft 464 can return to zero.

While this is happening, the cent turret 570 likewise is revolving and the cent sensing shaft 410 is being rotated backward to the restoring position in timed relation to the revolving of the cent coin turret 570. The number of cents picked out will correspond with the number of increments of movement of the cent sensing shaft 410 before it was arrested by the projection 303 on the stem of the depressed key.

PHASE "3"

When the selector key 300 has been depressed, if that key is any one in the group 1 to 30, it will have operated the motor bar 900 which would have engaged the clutch 795 with 790. On the other hand if the key depressed had been any one in the group 31 to 60, the clutch 795 would have been engaged with the pinion 789. The engaging of either one of these pinions with the clutch causes the printing wheel 1025 to be rotated under the urge of a spring 815 until the engageable member on the drive chain 295 engages the lug 294 in the first instance, or the engageable member 293 in the second instance, on the key stem 300 which has been depressed. This engagement causes the printing wheel 1025 to stop, with the type slug 1035 for the selected destination uppermost in position to print. All of this well occur somewhere between zero and 140°.

PHASE "4"

At 150° of the machine cycle, the Geneva movement 1004, 1014 picks up the drive to effect the printing of the ticket and this printing of the ticket is completed at 210°. (Drive crank of printer linkage is rotated 180°.)

PHASE "5"

A second Geneva movement 1082, 1084 picks up the drive at 210° of the machine cycle to cause the ticket to feed out. This is completed at 300° in the machine cycle.

PHASE "6"

At 320° of the machine cycle, the cam 1080 lifting the shear 1124 to chop the ticket reaches the drop off point and the printed ticket is chopped off from the ticket stock somewhere between 315 and 325° of the cycle.

PHASE "7"

When selector key has been depressed, its key stem is moved into zone of movement of the bail for its group, at approximately 40° after start of machine cycle. Pin 784 on shaft 776 picks up crank 782 through lost motion slot 783 operating bail 323 through crank 782, bar 944, bell crank 946, bar 370 and crank arm 368, thereby raising the lever 321, which was set by the depressed key, its extreme upward position, thereby causing the counter 337 for the city selected to add "1," and at the same time causing the total counter 338 which counts the total tickets sold, to add "1."

PHASE "8"

At approximately 330° of the machine cycle, a pin 761 on the worm gear 758 of the motor drive engages the tab 871 and operates shaft 857, which re-sets the motor bar 900 to its latched position and thereby applies the power of the heavy spring 938 to urge the restoring of the key which had been depressed. Also, the key lock 985 has been engaged at 861 on shaft 857. At about 355° the pin 761 on the worm gear passes the point where it releases shaft 857, which is restored under the urge of a heavy spring 938, and in the restoring the key lock 985 is released.

PHASE "9"

The shaft 857 is rotated counter-clockwise as seen in Figure 49, and the surface of slot 861, Figure 50, picks up locking arm 986, Figure 49, raising bar 376, the crank arm 375 and moving shaft 372 carrying bail 371, thereby moving the bail to an unlocked position so the depressed selector key returns to its normal position. The release of the locking arm 986 also allows the motor switch to snap to the "off" position. During this time, or if the motor coasts after being shut off, the same pin 761 on the worm gear 758 engages a roller 856 which disengages the main drive clutch 740, 742 and the machine comes to rest at approximately zero of the cycle.

PHASE "10"

If the key is still being held depressed by the ticket purchaser, the cycle of the machine will not repeat. When the key is released the plunger 270 on the bottom of the key stem is withdrawn from the cut out 206 of the locking drum disc. The spring 195 inside the locking drum restores the latter to zero and as it restores to zero a pin 950 of the locking drum gear 210 strikes a lever 916 which releases the latch 931, 939 on the motor bar 900 and disengages the bevel gears 470, 494 on the counter 502 which counts the amount of money in the money box.

The machine is now at rest, ready for another operation.

PHASE "11"

The nickel change set up clutch 472, 468 members are disengaged.

*Detailed description of the operation of the machine*

A traveler enters the Long Island railroad station in New York city and wishes to proceed to Little Neck, Long Island. As he approaches the ticket machine, he notes that the fare to Little Neck, including tax, is 53 cents. He finds that in coins he has two half dollars which he inserts in the coin slot. The two coins pass through the usual slug rejecting mechanisms in the machine and successively enter chute 172. As the coins pass down this chute, the first one actuates lever 169, permitting the ratchet wheel assembly 154 to rotate one step which is 90°. The second coin likewise causes another one step rotation of the assembly 154. This has resulted in the rotation of shaft 183 a distance of 120° which is equal to twenty (20) five cent increments, and the amount of $1.00 on the periphery of the drum 255 will be aligned with the pointer 265 which will indicate to him that the amount of $1.00 has been accepted by the machine. The disc 205 representing Little Neck on the locking drum assembly 182 has, by the insertion of these coins, been rotated to a point where the cutout 206 is so positioned that he may depress the key 315 representing Little Neck and the plunger 270 may enter the cutout so that the relation of the parts is somewhat like that shown in Figure 12. The depression of this key starts the operating cycle of the machine as follows:

The lateral tab 308 on the key stem 300, Figures 18 and 19, engages bail 388 rocking the sleeve shaft 382. (The print drum 1033 containing type slugs 1034 is arranged to move in either direction to avoid having to move almost a complete revolution to go from station 1 to station 60. Therefore, depressing any of the selector keys in the group 1 to 30 results in a clockwise rotation of the printing drum that would not exceed 180°, whereas depressing any of the selector keys in the group 31 to 60 results in a counter-clockwise rotation which likewise would not exceed 180°.)

When rocking shaft 382 is partially rotated, the lever 387 depresses the connecting link 390 which operates the bell crank 936 which by means of the spring 938, moves the motor bar 900 toward the left as in Figure 49. The notch 901 in the motor bar advances arm 910 stretching spring 914. As this arm moves to the left it strikes locking arm 986 and swings it to the left so that the camming ear 986 thereon engages the depression in 960. The camming ear 987 on the locking arm engages the tab 911 disengaging it from the notch 901 and before disengagement is effected, the lug at 910 drops in front of the top edge of mercury switch lever 877.

As 910 is completely released from notch 901, the spring 914 snaps 910 to the left as shown in Figure 78 and causes rotation of shaft 876, thereby tipping mercury switch 987 and starting the motor. The shaft 825 is rotated by means of connecting rod 883, pin 886, lever 859. The rotation of this shaft causes the movement of 831 in Figure 51 to advance contact pawl 840 to strike lever 842 and release the clutch arm 753 releasing clutch member so that its teeth 742 engage the clutch teeth 740. The motor 735 starts driving the machine.

During the first part of the cycle, the crank disc 764, Figure 52, starts rotating counter-clockwise and engages roller 869 on dog 867, drawing curved bar 478 to the right. This bar 478 rocks shaft 476 by means of crank arm 477 which rotates crank 479 and lifts bar 482 to cause engagement of clutch members 472 and 468, as shown in Figure 30. Crank 479 also lifts bar 510 operating lever 504 and causing bevel gears 494 and 470 to mesh. As this time the bar 510 latches to the crotch 519 of the bracket 520. As the crank disc 764 in Figure 52 continues to rotate, the connecting rod 769 causes the gear member 780 to swing in a clockwise direction, rotating gear 779 and the shaft 776 through 190°. The shaft 776 is interconnected with shaft 775 and shaft 547, as seen in Figure 50, hence they are in effect, a single shaft. On the right end of shaft 547 is mounted gear 1365 which engages gear 1361 mounted on shaft 222, Figure 57. In Figure 8 a socket 224 is formed where shaft 183 connects to shaft 222. The drive between 222 and 183 is effected by pulley 225 carrying a stud 217 which engages a hole in the arm 218.

Mounted on shaft 183 is a toothed tube 200 carrying the sixty lock discs 205 with spacers and therebetween also gear 210 which engages gear 469 through idler gear 526. As the operation of the machine continues tube 200, together with the discs thereon, is rotated in a resetting direction which is counter-clockwise, as seen in Figure 18 or clockwise as seen in Figure 49. When the reference edge 207 of the cutout portion 206 of the disc 205 comes in contact with key stem plunger 270, as shown in Figure 13, tube 200 is arrested but shaft 183 and shaft 222 continue in motion for half of the machine cycle, the grooved pulley 225 is latched to gear 236 by means of pawl 229 engaging a tooth 231, as shown in Figure 15. During this time spring 195 will wind in a direction to increase its tension, and stud 217 will move away from the reference edge 216 of arm 215. While tube 200 was rotating, it caused the rotation of gear 449 and shaft 450, 464.

The rotation of shaft 450, 464 resulted in rack 527 being raised to operate the counter 530 to record the amount of change given in nickels and/or quarters. It also caused the rotation of escapement ratchet wheel 635. Escapement pawls 626 and 627 drop in behind the teeth 634 on ratchet wheel 635 to hold the latter against movement.

At 180° of the machine cycle the clutch members 468 and 472 are disengaged. A torsion spring 1089 mounted on shaft 464 now urges the shaft to rotate in a clockwise direction as seen in Figure 33. In the beginning of this description, the traveler was said to have inserted two fifty cent coins to purchase a ticket priced at 53 cents, therefore, he should receive 47 cents in change. The tube 200 was rotated nine five cent increments before the reference edge 207 came in contact with the plunger 270 as seen in Figure 13. Therefore, the shaft 464 was likewise rotated nine five cent increments. Referring to Figure 38, there are only five coin tubes mounted on each of the change turrets, and the change turret shafts 559 or 571 are rotated only four increments during a machine cycle, so that the maximum number of five cent coins that can be delivered in change is four, but the traveler has nine five cent increments coming to him (plus two pennies). When shaft 464 is rotated five or more increments, the cam 665 in Figure 37 is rotated to a point where the roller 671 can drop down toward shaft 464, thereby partially rotating shaft 622. On the other end of shaft 622 is mounted picker 690 to pick a quarter from the quarter tube.

The cam 656, Figure 36, is also rotated to raise picker 662 into the path of five cent coins stored in tubes 581a, Figure 30. During the first half of the machine cycle, vertical shaft 542 of Figure 30 is rotated in a clockwise direction through gears 545, 546, and while it is so moving, the clutch members 552 and 549 slip since 552 because of slot 553 rises out of engagement with 549. During the second half of the machine cycle, shaft 542 is rotated counter-clockwise, Figure 30, and clutch members 552, 549 cause the rotation of gear 550 which, meshing with gears 561, 562 causes the rotation of the coin turret shafts 571, 571a.

On gear 562 there are five wedge cams 623. These engage the lateral tabs 628 and 630 of the escapement levers 626, 627 operating these levers and allowing the escapement wheel 635 to move under the urge of the torsion spring 1089 on shaft 464. Cam disc 656 had been rotated in a set up direction beyond the notch or index point 657. As shaft 464 continues to rotate in a reset direction, one nickel is picked from each coin tube 581a as each wedge cam 623 passes the escapement pawls, until cam 665 comes against roller 671, Figure 37, at which time roller 658, Figure 36 drops into depression 657. Gear 562 will continue rotating until the end of cycle, likewise wedge cam 623 will operate escapement levers 627, 626, but shaft 464 will cease rotating under the urge of the torsion spring.

Toward the end of the cycle, the lug 618, Figure 31, effects the partial rotation of shaft 622 which results in the ejection of a 25 cent coin. Also the partial rotation of shaft 622 moves roller 671 out of engagement with cam 665, as seen in Figure 37, and at the same time roller 671 is being raised the stud 647, Figure 35, is lifting push bar 644 which causes the disengaging of the escapement levers 626 and 627, permitting shaft 464 to be completely reset under the urge of the torsion spring 1089 after the last coin tube 581a has passed the station where picker 652 is located.

*Change in pennies.*—Slidably mounted on gear 1361, Figure 17, is a cam plate 1382, Figure 16, having elongated slots 1383 therein through which studs 1381 carried by the gear extend. This plate 1382 carries a roller 1386 and this roller and said plate are urged toward the center of the gear by means of springs 1384. Mounted on shaft 222 next to plate 1382 is a spur gear 236 the hub of which carries a five lobed cam 1390, Figure 16. This gear and cam 1390 are free on the shaft 222. As the gear 1361 rotates, the roller 1386 being firmly held in a depression between adjacent lobes of cam 1390 by means of springs 1384 causes the rotation of cam 1390 in any direction the gear 1361 is rotating.

Gear 236 drives gear 405 through the idler gear. Gear 405, shown in Figure 57, is mounted on shaft 404 which is coupled to said cents sensing shaft 398 on which are mounted a plurality of sensing fingers 407, each of which is positioned on the shaft according to the number of pennies change to be given in accordance with the price of the ticket which the associated selector key represents.

Since the coin counting mechanism will not accept pennies, the lock disc 205 is mounted to permit entry of plunger 270 at the nearest nickel above the price of the ticket. In the illustration of a traveler buying a ticket, to Little Neck, the fare and tax which amount to 53 cents, the cent sensing tab 407 associated with the selector key for Little Neck would be positioned on the cent sensing shaft 410 to give two cents change. During the first half of the machine cycle, shaft 410 is by the means just described rotated counter-clockwise until sensing tab 407 comes in contact with key stem projection 301 on the selector key for Little Neck which has been depressed. Upon the arresting of tab 407, the plate 1382 carrying roller 1386 continues rotation thereby causing the roller to ride up and down over the lobes of the cam 1390 until the completion of half of the machine cycle. In this instance, the roller would have rolled over three cam lobes.

At the right end of shaft 398, as shown in Figure 78, is mounted cam 400. As shaft 398 was rotated this cam displaces roller 715 to the right, as shown in Figure 43, thereby raising picker 595 into the path of the bottom coins in coin tubes 581. On the left end of shaft 398 there is a cam 402 which effects the lifting of rack 425 to enter into counter 424, Figure 30, the number of pennies to be given in change, in this instance two cents. During the second half of the cycle, the direction of rotation of gear 361, gear 405 and the shaft 398 is reversed. Roller 1386 causes the rotation of shaft 398 until a pin on gear 236 engages the reset stop after which roller 1386 will roll over the cam lobes until the machine comes to rest; in this instance, it would ride over three lobes.

The number of increments that shaft 398 had been rotated in the first half of the cycle determines how long cam 400 will keep picker 595 in the path of the coins in tubes 581 during the second half of the cycle. Four of the tubes 581 will pass the picker stand during each cycle of the machine but picker 595 may not be raised at all or will be raised for only as many coins as are required in the change which in the present instance is two coins.

When the selector key for Little Neck was first depressed, the lever 316 was pushed down by stud 309 on the key stem causing the opposite end of the lever 316 indicated as 321 on Figure 18 to rise within the zone through which bail 323 will move. As during the first half of the machine cycle, crank arm 782 in Figure 49 will operate bell crank 946 through bar 944, and bell crank 946 will raise bar 370, thereby operating crank arm 368, partially rotating shaft 324, causing bail 323 thereon to raise 321 and to operate the counter 337, on the panel 335, representing Little Neck, thereby recording the fact that one ticket has been issued for Little Neck. At the same time 321 picks up bail rod 326 on levers 325 which operate the pull rod 342 to add one in a total count or 338, which records the total number of tickets sold.

Toward the end of the cycle, the stud 761 on worm gear 758, Figure 50, contacts and moves the tab 871 on the right end of shaft 857 causing it and the sleeve member 860 thereon to rotate clockwise. Referring to Figure 49, when the sleeve is rotated approximately 60° clockwise, locking arm 986 is urged to the right by means of a spring and 986 comes over surface of the slot 861 as shown in Figure 50. The arm 862 attached to sleeve member 860 is also rotated clockwise carrying pawl 875 and causing the projecting lug on this pawl to come in front of tab 878 on dog 877. Referring to Figure 78, toward the right end of shaft 857 but behind plate 726 is the arm 873 which engages the tab 906 and the motor bar 900 and pushes motor bar to the left as in Figure 78 or to the right as seen in Figure 29. Under the urge of spring 929 through bar 522, motor bar locking member is rotated counter-clockwise, as seen in Figure 78, causing tab 931 to engage notch 939 on motor bar 900 locking the motor bar in the extreme reset position and stretching spring 938, as shown in Figure 49.

Referring again to Figure 78, spring 941 is stretched when arm 873 is rotated counter-clockwise to reset motor bar. As stud 761 releases tab 871 the shaft 857 is thereby released and under the urge of spring 941 the shaft is rotated clockwise until arm 873 comes against stop pin. When shaft 857 is rotated as seen in Figure 78 or counter-clockwise as seen in Figure 49, the surface 861, Figure 50, picks up 986, Figure 49, raising bar 376, moving crank arm 375 on bail shaft 372 carrying bail 371. Figure 19 shows bail 371 locking the projection 304 on selector key stem down. As this bail is moved to unlock 304, spring 938, Figure 49, is held stretched, due to the fact that the tab 931 is still engaged with the notch 939 on the motor bar 900 holding the latter in an extreme right hand position as seen in Figure 49. When the key stem is released by bail 371, the arm 965 is free to raise the bar 390 and operate crank arm 387, rocking sleeve 382 and causing the portion 383 to lift the tab 308 on key stem to restore the selector key to its normal position. Selector key is thereafter held in said position by spring 317, arm 316 of the bell crank 310 and stud 309.

When selector key 315 is so restored, the plunger 270, as seen in Figure 180, is withdrawn from the cutout 206 in the lock disc 205, thereby permitting spring 195 which is under tension to rotate tube 200 and gear 210 to their reset position. The rotation of gear 210 likewise causes the rotation of gear 469 and bevel gear 470 thereon which rotates the engaging beveled gear 494 to operate the counter 502. During that portion of the rotation of gear 210 in the early part of the cycle while set up of change was occurring, part of the sum deposited in the coin slot was registered in counter 502. Now then in the further operation of gear 210, additional entry into this counter of the amount that had been deposited in the coin slot which, in this instance, was $1.00, causes it to accumulate a record of the total sum accepted by the machine and deposited in the money box.

When gear 210 has been rotated to its normal or rest position, which is zero, the stud 950 on this gear, as shown in Figure 29, engages the tab 931 and moves the motor bar locking member 916, 932 and moves the lever 930. Referring to Figure 78, the movement of this member first released the latch on the motor bar 931, 939 permitting the motor bar to move approximately one-eighth inch so that the post 903 thereon, as shown in Figure 49, comes in contact with the arm 965 of bell crank 936. This one-eighth inch movement of the motor bar prevents a relatching at 931, 939 when money is again deposited in the coin slot, and stud 950 permits the lateral arm 930 to move counter-clockwise, as shown in Figure 78. When this arm was moved clockwise it moved bar 522 to the left, causing stud 523 to move bar 510 out of engagement with the crotch 519, Figure 49, thereby resulting in the disengagement of bevel gear 494 from 470.

Latch 931, 939, as shown in Figure 78, has another important safety feature. Should there be any failure to reset the machine or to restore the locking drum 182, 931 and 939 will remain latched and the machine cannot again be operated until after adjustment by a service man. This latch also serves as protection in the case of an attempted fraud as follows:

For example, if vendee had deposited a sum sufficient to operate a selector key for say an 85 cent ticket, and while the machine was operating the vendee (assuming he had some knowledge of mechanics and wished to defraud the machine by taking advantage of the inertia of relocking) by pressing hard on another selector key of say 70 cents when toward the end of the cycle the original key for 85 cents would be released. In this instance the key he is pressing for 70 cents would immediately release and operate. However, because the motor bar remains latched at 931, 939, the machine would not go through a second cycle and he would not obtain a second ticket or any additional change. In fact, no harm whatever would be done, and when he became tired of holding the 70 cent key and released it, the locking drum would then restore as previously described under the urge of its internal spring 195 and complete the operation of the machine as described.

When a selector key has been depressed, any key in the group 1 to 30 presses down the bar 390 on the bottom of which is a projection 390a which contacts a stud 957

(Figure 49) which causes the rocking dog 955 to rotate to the left, moving bar 960 which moves lever 800 to cause clutch tooth 819 to engage at 974. If a selector key 31 to 60 is depressed then bar 386 is pushed downward, the projection 386a thereon contacts pin 956 and causes the rocking dog 955 to rotate to the right, effecting the engagement of clutch tooth 818 with 791.

If in the first instance a selector key 1 to 30 has been operated and the next selector key operated also is in the group 1 to 30, then there is no movement of 955 and the associated clutches. They stay engaged until such time as a key in the alternative group is operated. 791 is welded to gear 789, and likewise 793 is welded to gear 790. These two companion gears are free on shaft 792. Clutch member 795 is keyed to the shaft by pin 803; therefore, the pinion 790 will drive shaft 792 in one direction when the clutch member 819 is engaged with 793. Likewise, pinion 789 will drive shaft 792 in the opposite direction if clutch 818 is engaged with 791. The beveled gear 785, with which the pinions 789 and 790, are meshed, is driven by a spring 815, Figure 50, one end of which is anchored to gear member 780 and the other end of which is connected to the hub of gear 785. When the machine is operated, the rotation of beveled gear 785 is counter-clockwise, as seen in Figure 49, and will drive pinion 790, shaft 792 and sprocket 805 thereon also in a counter-clockwise direction, as seen in Figure 49, or a clockwise direction, as seen in Figure 54.

If the clutch 816 is engaged with 791, by the depression of a selector key in the group 31 to 60, the shaft 792 and the sprocket 805 are driven in a counter-clockwise direction, as seen in Figure 54, moving the chain 295 and engaging member 293 thereon toward the left, until the member 293 is arrested by a tab 302 on a depressed key in the group 31 to 60. In Figure 54 a depressed key 31 is shown in dotted lines, and the member 293 arrested thereby is also shown in dotted lines. Now, since the chain 295 also drives the sprocket 806 and the printing wheel 1025, which are both on shaft 1022, so the arresting of the chain by the engagement of the engaging member 293 with the tab on the stem of the depressed key also arrests the printing wheel in a position to print the name of the destination represented by the depressed key.

Returning to the description of the operation, the key representing Little Neck was assumed to be key #30, and the depression of that key caused the chain 295, and the engaging members 293 and 294 thereon, to move toward the right, as seen in Figure 54, until the engaging member 294 is arrested by the tab 302 on the depressed key.

Referring for the moment to Figure 19, the rotation of sprocket 805 has caused the rotation of the printing wheel 1033, and when 294 is arrested as described, the type slug 1034 representing the station to be printed as of the thirtieth selector key will be at rest in position to print. The spring 815 thereafter will stretch until the machine completes half of the cycle. As the worm gear 758 and the shafts 757 and 1000 rotate, the beveled gears 1001, 1003 drive the Geneva movement 1005, 1114 (Figure 53) which operates the crank 1007 associated with mutilated pinion 1014 through connecting rod 1009 and lever 1011, 1280 to move printing pad carriage in one direction in one machine cycle, and in the opposite direction in the next cycle repetitively.

A carbon paper tape is positioned between the ticket stock and the type slug, and the movement of this printing pad carriage rocks the printing pad over the rear face of the ticket stock and thereby effects printing. Further rotation of shaft 1000 causes Geneva movement 1082, 1084 to drive shaft 1088, as seen in Figure 74, which feeds the ticket, through the medium of a knurled wheel 1100 and its matching knurled wheel 1101. The perimeter of the knurled wheel 1100 exceeds the length of the ticket by 3/32 inch so that the ticket stock is fed out 3/32 inch beyond a point where it will cut off. Then the roller 1143, as seen in Figure 57, drops into a notch in the detent disc 1102 to index the ticket exactly at the cutoff point after the knurled wheel 1100 has discontinued feeding and released the ticket. When the printing pad carrier reaches the end of its stroke in either direction, a lateral stud thereon 1278 engages the ledge 1162, lifting mask plate 1160 and the ticket and the carbon free from the printing wheel and type.

When the printing pad carriage was actuated, it caused printing of the code 1212 via the aperture 1157, the date via the aperture 1159 and the station of destination via aperture 1158. Incidentally, the code is printed on the succeeding ticket at the same time the date and station of destination is printed on the ticket to be issued. While printing was occurring, the rotation of shaft 1000 also rotated cam 1080 to depress the knife actuating the lever 1070 and thereby raise the ticket shearing blade 1194 from engagement with its mating shear 1193. Shortly after the ticket feeding has been completed, cam 1080 reaches a point where the roller 1078 drops suddenly, thereby permitting a chopping or shearing action between the blades 1193 and 1194 to cut a ticket from the ticket strip, leaving the succeeding ticket, with the code printed thereon, at rest in the printing position.

During the second half cycle of the machine, while ticket feeding, etc. are occurring, the gear 785 and sprocket 805 have reversed their direction restoring the printing wheel to its at rest position and moving the engaging members 293 and 294 on the chain 295 to their normal at rest positions.

Referring to Figure 49, a spring 1579 is connected to the bar 376 and to the plate and urges the bar toward the right.

Referring to Figure 74, cam 1080 has an elongated slot 1580 formed in its hub 1081 and a pin 1581 is mounted in the shaft 1000 and extends into said slot so that during one phase of the revolution of the cam, it can be suddenly displaced. The function of this slot is as follows: As the cam rotates in a counter-clockwise direction, as seen in Figure 74, it raises the roller 1078 and, consequently, the end of the lever 1076 which carries the roller, and the lever acts against the shear actuating lever 1070. The lever 1070, in turn, acts against the roller 1182 and as the roller 1077 is advanced higher and higher by the surface of the cam, rectangular frame 1180 is raised, thereby compressing the powerful springs 1191 and 1192. As the apex of the cam 1080 reaches the roller 1077, the roller drops off, toward the axis 1000 and the cam is over driven thereby a distance limited by the slot 1580, with the result that the roller is free to fall on to the lower surface of the cam, and the movable knife member carried in frame 1180 is dropped with a snap thereby the ticket is cut off from the ticket stock substantially instantaneously.

Referring to Figure 52, a pair of contact arms 1533 and 1534 are positioned in the path of the upper end of the connecting rod 769 and the lower contact arm 1534 carries a buffer which is engaged and held into engagement with the contact arm 1533 by said upper end of the connecting rod 769 which is "at rest" position of the connecting rod 769; therefore, the contact arms 1533 and 1534 are held in contact with each other at all times that the machine is not being operated.

Referring to Figure 89, a prospective view of the machine is shown to indicate the location of the selector key bank 315, the coin slot 1524, the window 265 through which the rim of the drum 255 may be seen and the coin return button 1488. Figure 89 also shows the cup or depression 1582 which receives the ticket together with the change (if any) and which also receives the coins placed in the machine by the vendee and returned to him by the pressing in of the coin return button 1488.

Figure 90 shows a ticket upon which is printed the code or number of the machine, the name of the destination and the date. The code or machine number, by the printing mechanism disclosed herein, is impressed upon the succeeding ticket thereby shortening the range of and the relation of the several legends relative to each other.

In Figures 70 and 71, the hole in the lever 1467 to which the spring 1475 is attached, may be utilized to receive one end of a rod or wire attached to a coin testing and scavenging device such as is commonly employed in many types of vending machines, in which case the spring 1475 may be omitted.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a coin controlled device for accepting nickels, dimes, quarters, and/or half-dollars and for dispensing change equal to the difference between the value of the coins accepted and the price of a selected item, a group of selector keys corresponding to said items and the prices thereof, said keys being arranged in a bank and each carrying a tab, a penny change initiating means in cooperative relation with said keys and partially rotated during each transaction, positionable means adjacent to said keys and rotated through a number of increments corresponding to the value of the coins accepted and carrying one unlocking means for each key comprising a disk having a cut out sector adapted to be moved into alignment with the stem of its key and adapted to unlock its key when the value of the coins accepted is not less than the value represented by its key, permitting the latter to be displaced, said cutout being substantially wider than the thickness of said stem to permit said stem to enter when the coins accepted amount to substantially more than the price of the article, the stem on the displaced key engaging the penny change initiating means, penny change making mechanism set by said initiating means, and other means set by the rotation of said positionable means in the opposite direction taking up the slack between the then trailing edge of the cut out sector in the unlocking means and the stem of the displaced key for effecting the delivery of change other than pennies determined by the number of increments moved by said positionable means in taking up said slack.

2. In a coin controlled device, coin counting means arranged to accept coins of several different denominations, a positionable member termed "locking drum" constantly urged in one direction and advanced in a definite ratio with the values of coins accepted by said counting means, a bank of keys, each having a value position, a penny sensing device comprising a rotatable shaft spanning the stems of said keys and having a tab set for each key and representing the number of pennies above the nearest nickel to the values of the keys, means rotating said penny sensing device during a portion of an operating cycle, means on each key to engage and arrest its corresponding tab, change making means, gearing between said change making means and said locking drum including a clutch, for determining and effecting the delivery of change other than pennies, and penny change making means interconnected with and set by said penny sensing means as the latter is arrested by a depressed key for delivering the required pennies of change.

3. In a coin controlled machine for accepting coins of greater values than pennies and for dispensing change including pennies, said change being equal to the difference between the value of the coins accepted and the price of a selected item, a group of selector keys each representing a different item and the price thereof, each of said keys carrying a lateral tab, a penny sensing shaft alongside said keys carrying a plurality of engageable tabs, one for each key, said last tabs having been pre-set in accordance with the difference in pennies between the price represented by its key and the next highest nickel, said penny sensing shaft being moved during a portion of each machine cycle, so that a lateral tab on a depressed key may engage and arrest the corresponding engageable tab on said shaft, positionable means comprising a series of discs on a common rotatable support, one disk for each key, each disk having a cut-out sector which advances relative to the stem of its key and each disk being set on said support in accordance with the price of the given article, said positionable means being rotatively moved in increments in accordance with the value of the coins accepted, whereby a key representing a value not less than said last value may be depressed, penny change mechanism controlled by said sensing shaft for delivering the required pennies in change, and other positionable means in said device for determining and delivering the rest of the change required.

4. In a coin controlled machine, coin counting means to receive coins of a plurality of denominations, a positionable member rotated by said means in increments in accordance with the value of coins accepted thereby, said positionable member being comprised of a plurality of spaced disc members on a common support, each having a cut out sector and each disc being set thereon in accordance with the prices of the articles to be vended, a shaft carrying said support, resilient connections between the two, and a plurality of normally locked selector means comprising a key for each disc member, each key being locked against displacement by the solid portion of the periphery of its disc, each key representing a different price and adapted to be unlocked by the cooperating disc on said positionable member when the latter is moved to a corresponding value position with the cut out sector aligned with the stem of its key, thereby enabling one of said keys to be displaced, so long as the key in question has a value not greater than the total value of the coins accepted by said coin counting means, a main rock shaft in said machine adapted to engage said first shaft and reset the latter during the first half cycle of movement of said rock shaft, said resilient connections allowing movement of said first shaft even while said support is at rest.

5. In a coin controlled device, rotative coin counting means to receive coins of a plurality of denominations, rotatable positionable means rotated by said coin counting means and advanced in accordance with the value of the coins received by said coin counting means, said positionable means including a plurality of spaced discs on a common support and each having a sector cut out to form a socket, said positionable means being advanced in increments corresponding to the values of the coins received, a shaft carrying said common support, resilient connections between said shaft and the common support, a plurality of selector keys having individual stems each positioned in cooperative relation with the sector in a different disc, each of said keys having a position value and each being adapted to have its stem depressed into engagement with one of said sockets when the latter has advanced under the urge of a plurality of coins, the value of which is at least equal thereto, said resilient connections between said shaft and said common support allowing movement of said shaft even while said common support is held against movement.

6. In a coin controlled device, coin counting means to receive coins of a plurality of denominations, positionable means rotatably urged in one direction and having its movement in said direction controlled by escapement means on said coin counting means and advanced in accordance with the value of the coins received by said coin counting means, said positionable means including advancing socket means having a reference edge, change making means, a plurality of selector keys each having a position value and each having a stem adapted to be depressed into said advancing socket means when said reference edge has advanced under the urge of a plurality of coins the total value of which is not less than the position value of the key to be depressed, and mechanism between said positionable means and said change making means operable when said positionable means is moving in an opposite direction and controlled by the space between the reference edge of said socket means and the stem of the depressed key to cause the change making means to deliver change represented by said space between said stem and said reference edge.

7. In a coin controlled vending machine, a plurality of selector keys for selecting a desired commodity, each key representing a different value, a positionable member in cooperative relation with all of said keys and having advancing socket means therein, said socket means having a reference edge, for clearing the stems of said keys during the first half of an operative cycle, a coin counter adapted to receive and be rotated by coins of a plurality of denominations and adapted to rotate said positionable member in accordance with the total value of coins received by it during a single transaction, whereby a key representing a value in the neighborhood of but not more than the value of said coins may be depressed into said socket means, other cooperative means under control of the depressed key for dispensing the commodity represented thereby, change making means effective during the movement of said positionable member in an opposite direction during the next half cycle of a vending operation and controlled by the space between said reference edge and the stem of the depressed key, and mechanism between said positionable member and the change making means to effect the delivery of change represented by the space between the stem of the depressed key and said reference edge.

8. In a coin controlled device, a plurality of selector keys for selecting a commodity desired, each key having a different value and representing a different commodity, a positionable member in cooperative relation with all of said keys and having advancing socket means therein, said socket means having a reference edge which is adapted to clear the stem of at least one of said keys as said positionable member moves during the first half cycle of an operation, a coin counter adapted to receive coins of values down to a nickel minimum, said coin control including differential integrating means adapted to move said positionable member in accordance with the integrated value of all the coins received by it during a single transaction, thereby causing said advancing socket means to advance to a position adjacent to the stem of a key having a value in the neighborhood of but not more than the integrated value of the coins so that said key may be depressed, change making means operable while said positionable member is moving in an opposite direction during the last half cycle of said operation, said change making means having a plurality of sections adapted to deliver coins of several different denominations as change, and mechanism connected to said positionable member and to said change making means and adapted to effect the delivery of change represented by the space between the stem of said depressed key and said reference edge.

9. In a coin counter, a plurality of sets of cooperative members carried on a common shaft journaled in spaced apart bearings on a rigid support, each set comprising a grooved follow cam escapement wheel journaled on said shaft, a reed-like lever pivoted on said support and having a finger extending into the groove of said follow cam, spring means urging said lever toward its normal position, a coin chute having a tab portion on its lower end forming a limit for the downward movement of said lever, differential gear means serially disposed between said sets, each differential gear means between the follow cam for coins of one value and the follow cam for coins of the next highest value being comprised of a beveled gear secured to one of said follow cams, a second beveled gear secured to the other of said follow cams, the teeth on said gears facing one another, and a spider journaled on said shaft and carrying radial shafts with beveled pinions thereon meshing with said beveled gears, and a positionable member conjointly moved by said sets.

References Cited in the file of this patent

UNITED STATES PATENTS

| | | |
|---|---|---|
| 160,628 | Tullock | Mar. 9, 1875 |
| 533,197 | Jaeger | Jan. 29, 1895 |
| 1,068,307 | Brandt | July 22, 1913 |
| 1,090,846 | Greindl | Mar. 24, 1914 |
| 1,118,106 | Church | Nov. 24, 1914 |
| 1,179,858 | Menier | Apr. 18, 1916 |
| 2,159,603 | Rowe | May 23, 1939 |
| 2,193,164 | Cochran | Mar. 12, 1940 |
| 2,217,845 | Mueller | Oct. 15, 1940 |
| 2,279,664 | Du Grenier | Apr. 14, 1942 |
| 2,333,176 | Hoban | Nov. 2, 1943 |
| 2,526,749 | Hokanson | Oct. 24, 1950 |
| 2,542,034 | Keefe | Feb. 20, 1951 |
| 2,565,143 | McKinley | Aug. 21, 1951 |